US012676717B2

(12) United States Patent (10) Patent No.: US 12,676,717 B2
Park et al. (45) Date of Patent: Jul. 7, 2026

(54) DEVICE AND METHOD FOR TRANSMITTING AND RECEIVING CONTROL INFORMATION AND DATA IN COMMUNICATION SYSTEM

(71) Applicant: Samsung Electronics Co., Ltd., Suwon-si (KR)

(72) Inventors: Sungjin Park, Suwon-si (KR); Youngbum Kim, Suwon-si (KR); Seho Myung, Suwon-si (KR); Hyunseok Ryu, Suwon-si (KR); Jeongho Yeo, Suwon-si (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 313 days.

(21) Appl. No.: 18/016,580

(22) PCT Filed: Jul. 19, 2021

(86) PCT No.: PCT/KR2021/009284
§ 371 (c)(1),
(2) Date: Jan. 17, 2023

(87) PCT Pub. No.: WO2022/015123
PCT Pub. Date: Jan. 20, 2022

(65) Prior Publication Data
US 2023/0283429 A1    Sep. 7, 2023

(30) Foreign Application Priority Data

Jul. 17, 2020    (KR) ........................ 10-2020-0089182
Jul. 23, 2020    (KR) ........................ 10-2020-0091954
Oct. 16, 2020    (KR) ........................ 10-2020-0134692

(51) Int. Cl.
*H04L 5/00*    (2006.01)
*H04L 1/00*    (2006.01)
(Continued)

(52) U.S. Cl.
CPC .......... *H04L 5/0051* (2013.01); *H04L 1/0003* (2013.01)

(58) Field of Classification Search
CPC ............................ H04L 5/0051; H04L 1/0003
(Continued)

(56) References Cited

U.S. PATENT DOCUMENTS 10,484,072 B1    11/2019    Nammi
2019/0109749 A1    4/2019    Bai et al.
(Continued)

FOREIGN PATENT DOCUMENTS

CN    108632005 A    10/2018
CN    109327296 A    2/2019
(Continued)

OTHER PUBLICATIONS

3rd Generation Partnership Project; Technical Specification Group Radio Access Network; NR; 'Physical layer procedures for data (Release 16)', 3GPP TS 38.214 V16.1.0, Apr. 3, 2020.
(Continued)

*Primary Examiner* — Xuan Lu
(74) *Attorney, Agent, or Firm* — Jefferson IP Law, LLP

(57) ABSTRACT

The present disclosure relates to a 5G or pre-5G communication system for supporting a data transmission rate higher than that of a 4G communication system such as LTE. A method for transmitting information in a wireless communication system, according to an embodiment of the present disclosure, includes a CQI table configuration method, an MCS table configuration method, and an LBRM, PT-RS, and processing time determination method related thereto. A (Continued)

method by which a user equipment (UE) receives a phase tracking reference signal (PT-RS) in a wireless communication system, according to an embodiment of the present disclosure, comprises the step of confirming whether both a first parameter related to the time density of a PT-RS and a second parameter related to the frequency density of the PT-RS are set by the UE through upper layer signaling.

13 Claims, 13 Drawing Sheets

(51) Int. Cl.
| | |
|---|---|
| *H04L 1/1822* | (2023.01) |
| *H04L 1/1829* | (2023.01) |
| *H04L 27/34* | (2006.01) |

(58) Field of Classification Search
USPC ......................................................... 370/329
See application file for complete search history.

(56) References Cited

U.S. PATENT DOCUMENTS

| | | | |
|---|---|---|---|
| 2019/0166615 | A1 | 5/2019 | Nimbalker et al. |
| 2019/0182001 | A1 | 6/2019 | Lee et al. |
| 2019/0182091 | A1 | 6/2019 | Bai et al. |
| 2019/0215118 | A1 | 7/2019 | Cases et al. |
| 2019/0296877 | A1 | 9/2019 | Zhang et al. |
| 2019/0305908 | A1 | 10/2019 | Lee et al. |
| 2019/0356515 | A1 | 11/2019 | Murakami et al. |
| 2020/0008270 | A1* | 1/2020 | Zhang ................... H04L 5/0091 |
| 2020/0021470 | A1 | 1/2020 | Sun et al. |
| 2020/0045653 | A1 | 2/2020 | Hunukumbure et al. |
| 2020/0067628 | A1* | 2/2020 | Xu ......................... H04L 1/0004 |
| 2020/0092032 | A1* | 3/2020 | Zhang ................... H04W 72/23 |
| 2020/0153585 | A1 | 5/2020 | Wu et al. |
| 2020/0162303 | A1 | 5/2020 | Kim et al. |
| 2020/0280412 | A1 | 9/2020 | Qi et al. |
| 2022/0078826 | A1 | 3/2022 | Lee et al. |

FOREIGN PATENT DOCUMENTS

| | | |
|---|---|---|
| CN | 109565429 A | 4/2019 |
| CN | 110537343 A | 12/2019 |
| CN | 110771086 A | 2/2020 |
| KR | 10-2018-0135850 A | 12/2018 |
| KR | 10-2019-0126766 A | 11/2019 |
| KR | 10-2020-0075898 A | 6/2020 |
| KR | 10-2020-0081451 A | 7/2020 |
| KR | 10-2021-0126479 A | 10/2021 |
| WO | 2019/153195 A1 | 8/2019 |
| WO | 2019-216677 A1 | 11/2019 |
| WO | 2020/130753 A1 | 6/2020 |
| WO | 2020-146275 A1 | 7/2020 |

OTHER PUBLICATIONS

Intel Corporation, 'Introduction of DL 1024QAM for NR in Rel-16 Agenda item: 9.8', RP-182458, 3GPP TSG RAN Meeting #82, Sorrento, Italy, Dec. 3, 2018.
Ericsson, 1024-QAM for NR DL, R1-2101564, 3GPP TSG RAN WG1 #104-e, e-Meeting, Jan. 19, 2021.
Extended European Search Report dated Nov. 15, 2023, issued in European Patent Application No. 21842486.9.
ETSI, Technical Specification, 5G, NR, Physical layer procedures for data, 3GPP TS 38.214 version 15.3.0 Release 15, ETSI TS 138 214 V15.3.0, Oct. 1, 2018.
Examination Report dated Apr. 23, 2025, issued in KoreanPatent Application No. 10-2020-0134692.
Examination Report dated May 1, 2025, issued in Chinese Patent Application No. 202180060070.4.
European Office Action dated Oct. 1, 2025, issued in European Patent Application No. 21842486.9.
Chinese Notice of Allowance dated Nov. 6, 2025, issued in Chinese Patent Application No. 202180060070.4.

* cited by examiner

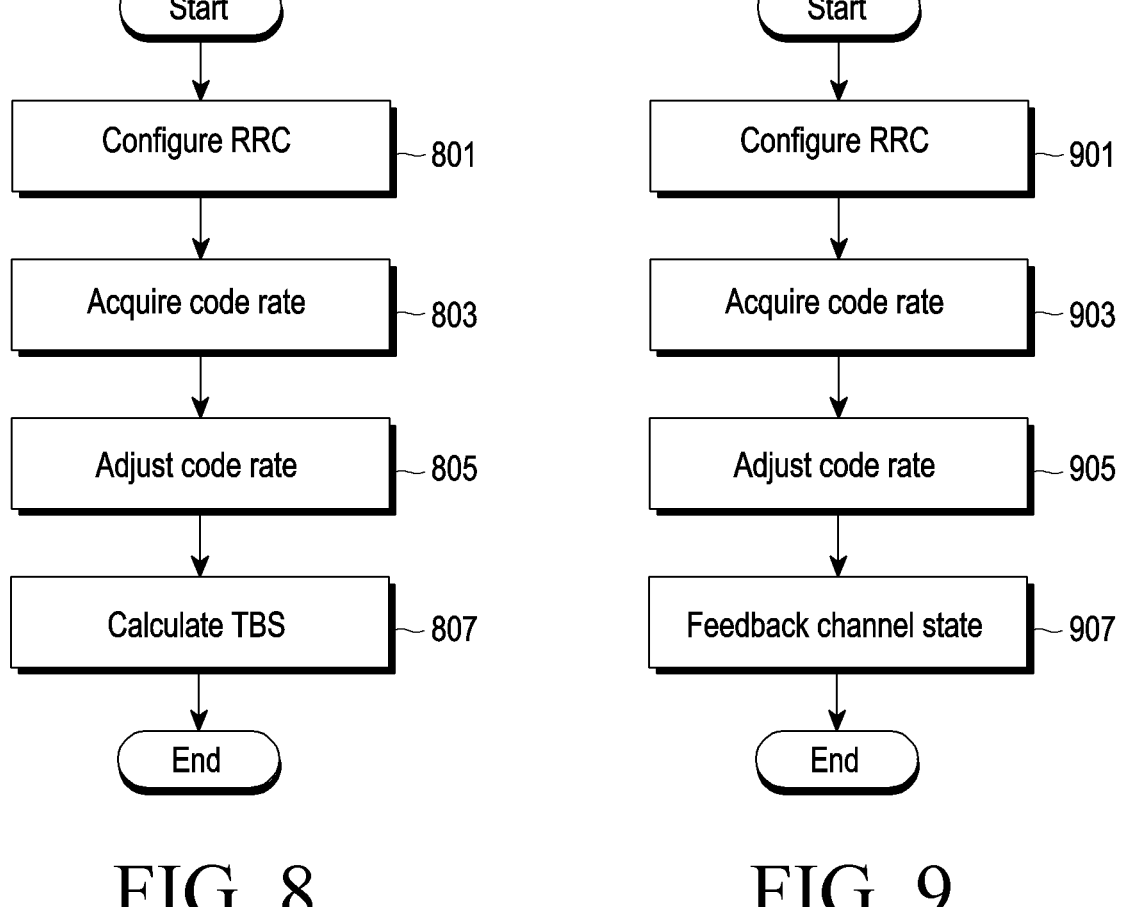
FIG. 8                 FIG. 9

DEVICE AND METHOD FOR TRANSMITTING AND RECEIVING CONTROL INFORMATION AND DATA IN COMMUNICATION SYSTEM

TECHNICAL FIELD

The disclosure relates to a communication or broadcast system and, more specifically, to a device and a method for transmitting and receiving control information in a communication or broadcast system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "beyond 4G network" communication system or a "post LTE" system. The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems. In addition, in 5G communication systems, development for system network improvement is under way based on advanced small cells, cloud radio access networks (cloud RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have also been developed.

New radio (NR) which refers to a new 5G communication scheme is designed to enable free multiplexing of various services in time and frequency resources. Accordingly, waveforms/numerologies, reference signals, and the like may be dynamically or freely allocated according to needs of the corresponding services. In order to provide an optimal service to a terminal in communication, it is important to provide optimized data transmission through measurements of a channel quality and an interference amount, and accordingly it is essential to accurately measure a channel state. However, unlike the 4G communication in which channel and interference characteristics do not greatly vary according to frequency resources, a 5G channel has channel and interference characteristics greatly varying according to services, and thus there is a need to support subsets in terms of frequency resource group (FRG) that enable separate measurements of channel and interference characteristics. The types of services supported in the NR system may be categorized into enhanced mobile broadband (eMBB), massive machine type communications (mMTC), and ultra-reliable and low-latency communications (URLLC). The eMBB may be considered a service that targets high-speed transmission of high-capacity data, the mMTC may be considered a service that targets minimized power consumption for a terminal and access of multiple terminals, and the URLLC may be considered a service that targets high reliability and low latency. Different requirements may be applied depending on the type of service applied to a terminal.

As described above, a plurality of services may be provided to a user in a communication system, and in order to provide a plurality of services to a user, there is a need for a method for providing each service according to the characteristics thereof and an apparatus using the same.

DETAILED DESCRIPTION OF THE INVENTION

Technical Problem

The disclosure provides a device and a method for generating (or configuring) a channel quality indicator (CQI) and a modulation and coding scheme (MCS) table in a communication system requiring various target block error rates (BLERs).

In case that support of 1024 Quadrature Amplitude Modulation (QAM) is allowed in a communication system, the disclosure provides a method for determining related limited buffer rate matching (LBRM), phase tracking reference signal (PT-RS), and processing time.

Technical Solution

A method for receiving phase tracking reference signal (PT-RS) by a user equipment (UE) in a wireless communication system according to an embodiment of the disclosure includes identifying whether at least one of a first parameter related to a time density of a PT-RS and a second parameter related to a frequency density of the PT-RS is configured for the UE through higher layer signaling, identifying a first value corresponding to the time density or whether the PT-RS is transmitted, based on the first parameter and a scheduled modulation and coding scheme (MCS) in case that the first parameter is configured through the higher layer signaling and identifying a second value corresponding to the frequency density or whether the PT-RS is transmitted, based on the second parameter and a scheduled bandwidth in case that the second parameter is configured through the higher layer signaling, receiving the PT-RS from a base station, based on at least one of the first value and the second value in case of determining that the PT-RS is transmitted, and determining that the base station does not transmit the PT-RS in case that both the first parameter and the second parameter are not configured for the UE, 1024 QAM is applied to the wireless communication system, and the scheduled MCS is smaller than the smallest index value among indexes corresponding to modulation order 4 in a MCS table.

According to an embodiment, the method for receiving a PT-RS by a UE may further include receiving PT-RS downlink configuration (PTRS-DownlinkConfig) information including the first parameter and the second parameter through the higher layer signaling from the base station.

According to an embodiment, the PT-RS downlink configuration information may include multiple parameters related to the time density of the PT-RS. In case that the MCS table corresponding to the 1024 QAM is configured, each of the multiple parameters may be configured to be an integer value from 0 to 27.

According to an embodiment, in case that the MCS table corresponding to the 1024 QAM is configured, one parameter related to the time density may be configured to be a predetermined value of 27.

According to an embodiment, the first parameter may indicate a threshold value for the MCS and the second parameter may indicate a threshold value for a bandwidth. In case that the MCS scheduled based on the first parameter belongs to a first range, the first value corresponding to the first range may be determined, and the bandwidth scheduled based on the second parameter belongs to a second range, the second value corresponding to the second range may be determined.

According to an embodiment, the MCS table corresponding to the 1024 QAM may include modulation and code rate combinations of (1024QAM, 805.5/1024), (1024QAM, 853/1024), (1024QAM, 900.5/1024), (1024QAM, 948/1024).

According to an embodiment, the method for receiving a PT-RS by a UE may further include identifying a third value corresponding to a predetermined time density and a fourth value corresponding to a predetermined frequency density in case that the first parameter and the second parameter are not configured for the UE, and receiving the PT-RS from the base station based on at least one of the third value and the fourth value.

A method for transmitting a phase tracking reference signal (PT-RS) by a base station in a wireless communication system according to an embodiment of the disclosure includes determining whether to configure at least one of a first parameter related to a time density of a PT-RS and a second parameter related to a frequency density of the PT-RS for a user equipment (UE) through higher layer signaling, and transmitting the PT-RS to the UE based on at least one of a first value corresponding to the time density or whether the PT-RS is transmitted, which are determined by using the first parameter and a scheduled modulation and coding scheme (MCS) and a second value corresponding to the frequency density or whether the PT-RS is transmitted, which are determined by using the second parameter and a scheduled bandwidth. In case that neither the first parameter nor the second parameter is configured for the UE, 1024 QAM is applied to the wireless communication system, and the scheduled MCS is smaller than the smallest index value among indexes corresponding to modulation order 4 in the MCS table, the base station may not transmit the PT-RS.

A user equipment (UE) configured to receive a phase tracking reference signal (PT-RS) in a wireless communication system according to an embodiment of the disclosure includes a transceiver and a controller connected to the transceiver and configured to control the transceiver. The controller may identify whether at least one of a first parameter related to a time density of a PT-RS and a second parameter related to a frequency density of the PT-RS is configured for the UE through higher layer signaling, identify a first value corresponding to the time density or whether the PT-RS is transmitted, based on the first parameter and a scheduled modulation and coding scheme (MCS) in case that the first parameter is configured through the higher layer signaling and identify a second value corresponding to the frequency density or whether the PT-RS is transmitted, based on the second parameter and a scheduled bandwidth in case that the second parameter is configured through the higher layer signaling, control to receive the PT-RS from a base station, based on at least one of the first value and the second value in case of determining that the PT-RS is transmitted, and determine that the base station does not transmit the PT-RS in case that both the first parameter and the second parameter are not configured for the UE, 1024 QAM is applied to the wireless communication system, and the scheduled MCS is smaller than a smallest index value among indexes corresponding to modulation order 4 in a MCS table.

A base station configured to transmit a phase tracking reference signal (PT-RS) in a wireless communication system according to an embodiment of the disclosure includes a transceiver and a controller connected to the transceiver and configured to control the transceiver. The controller may determine whether to configure at least one of a first parameter related to a time density of a PT-RS and a second parameter related to a frequency density of the PT-RS for a user equipment (UE) through higher layer signaling, and transmit the PT-RS to the UE based on at least one of a first value corresponding to the time density or whether the PT-RS is transmitted, which are determined by using the first parameter and a scheduled modulation and coding scheme (MCS) and a second value corresponding to the frequency density or whether the PT-RS is transmitted, which are determined by using the second parameter and a scheduled bandwidth. In case that neither the first parameter nor the second parameter is configured for the UE, 1024 QAM is applied to the wireless communication system, and the scheduled MCS is smaller than a smallest index value among indexes corresponding to modulation order 4 in the MCS table, the base station may not transmit the PT-RS.

Advantageous Effects

According to an embodiment of the disclosure, in case of performing communication between a base station and a terminal, more efficient communication may be achieved by using an appropriate CQI table or an MCS table according to a required target BLER.

According to an embodiment of the disclosure, in case of performing communication between a base station and a terminal, more efficient communication may be achieved by supporting 1024 quadrature amplitude modulation (QAM).

Advantageous effects obtainable from the disclosure may not be limited to the above mentioned effects, and other effects which are not mentioned may be clearly understood, through the following descriptions, by those skilled in the art to which the disclosure pertains.

BRIEF DESCRIPTION OF DRAWINGS

FIG. 8 illustrates a flowchart of a method for a terminal to calculate a TBS by using a CQI and an MCS table according to an embodiment of the disclosure.

FIG. 9 illustrates a flowchart of another method for a terminal to calculate a TBS by using a CQI and an MCS table according to an embodiment of the disclosure.

MODE FOR CARRYING OUT THE INVENTION

Figure 1:
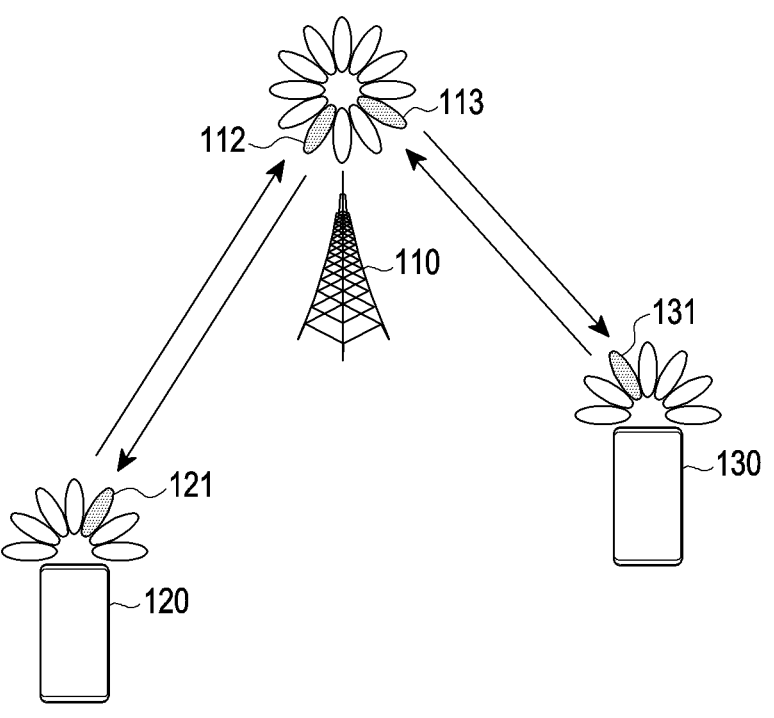
FIG. 1 illustrates a wireless communication system according to an embodiment of the disclosure.

Hereinafter, exemplary embodiments of the disclosure will be described in detail with reference to the accompanying drawings. In describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

Based on determinations by those skilled in the art, the main idea of the disclosure may also be applied to other communication systems having similar technical backgrounds through some modifications without significantly departing from the scope of the disclosure. For reference, the term "communication system" generally covers the meaning of a broadcast system, but in the disclosure, a communication system that provides a broadcast service as the main service may be more clearly referred to as a broadcast system.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Hereinafter, various embodiments of the disclosure will be described based on an approach of hardware. However, various embodiments of the disclosure include a technology that uses both hardware and software, and thus the various embodiments of the disclosure may not exclude the perspective of software.

The disclosure relates to an apparatus and method for transmitting/receiving control information in a communication system. Specifically, in the disclosure, a technology for transmitting/receiving control information based on channel quality indicator (CQI) and modulation coding scheme (MCS) tables will be described.

In the following description, terms referring to signals, terms referring to channels, terms referring to control information, terms referring to network entities, terms referring to device elements, and the like are illustratively used for the convenience of description. Therefore, the disclosure is not limited by the terms as used below, and other terms referring to subjects having equivalent technical meanings may be used.

In the following description, various embodiments of the disclosure will be described using terms and names employed in some communication standards (e.g., 3rd generation partnership project (3GPP)), but they are merely for the sake of illustration. Various embodiments of the disclosure may be easily modified and applied to other communication systems.

FIG. 1 illustrates a wireless communication system according to an embodiment of the disclosure.

FIG. 1 illustrates a base station 110, a terminal 120, and a terminal 130 as a part of nodes using a wireless channel in a wireless communication system. FIG. 1 shows only one base station, other base stations identical to or similar to the base station 110 may be further included.

The base station 110 corresponds to a network infrastructure for providing wireless access to the terminals 120 and 130. The base station 110 has a coverage defined as a predetermined geographic area based on a distance in which a signal may be transmitted.

The base station 110 may be referred to as "access point (AP)", "eNodeB (eNB)", "5th-Generation (5G) node", a "wireless point", "transmission/reception point (TRP)", or another term having an equivalent technical meaning, in addition to a "base station".

Each of the terminal 120 and the terminal 130 is a device used by a user and performs communication with the base station 110 through a wireless channel. In some cases, at least one of the terminal 120 and the terminal 130 may be operated without involvement of a user. For example, in case that at least one of the terminal 120 and the terminal 130 is a device for performing machine type communication (MTC), and may not be carried by the user. Each of the terminal 120 and the terminal 130 may be referred to as "a user equipment (UE)", "a mobile station", "a subscriber station", "a remote terminal", "a wireless terminal", "an electronic device", "a user device", or another term having a technical meaning equivalent thereto, in addition to a terminal.

The base station 110, the terminal 120, and the terminal 130 may transmit and receive radio signals in millimeter wave (mmWave) bands (e.g., 28 GHz, 30 GHz, 38 GHz, and 60 GHz). In this case, in order to improve the channel gain, the base station 110, the terminal 120, and the terminal 130 may perform beamforming. Here, the beamforming may include transmission beamforming and reception beamforming.

That is, the base station 110, the terminal 120, and the terminal 130 may assign directivity to a transmission signal or a reception signal. To this end, the base station 110, and the terminals 120 and 130 may select serving beams 112, 113, 121, and 131 through a beam search or beam management procedure. After the serving beams 112, 113, 121, and 131 are selected, communication may be performed through a resource having a quasi co-located (QCL) relationship with a resource transmitting the serving beams 112, 113, 121, and 131.

In case that large-scale characteristics of a channel carrying a symbol on a first antenna port may be inferred from a channel carrying a symbol on a second antenna port, the first antenna port and the second antenna port may be evaluated as having a QCL relationship.

For example, the large-scale characteristics may include at least one of a delay spread, a Doppler spread, a Doppler shift, an average gain, an average delay, and a spatial receive parameter.

Figure 2:
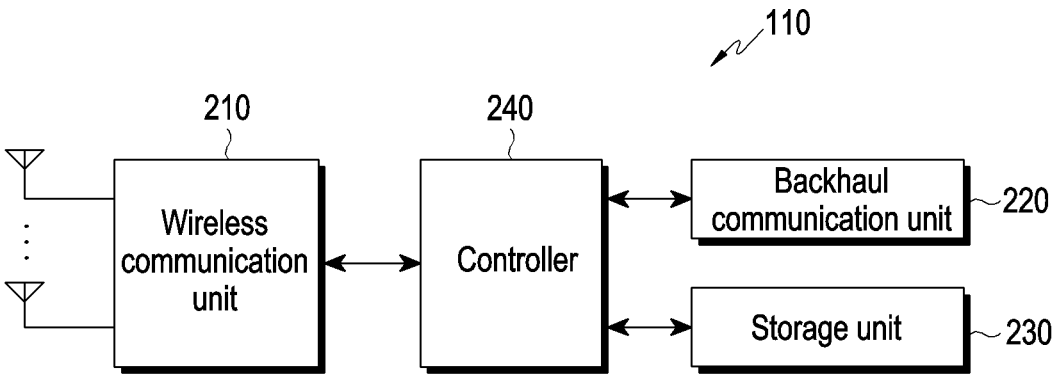
FIG. 2 illustrates a configuration of a base station in a wireless communication system according to an embodiment of the disclosure.

FIG. 2 illustrates a configuration of a base station in a wireless communication system according to an embodiment of the disclosure.

The configuration illustrated in FIG. 2 may be understood as a configuration of the base station 110. Terms such as " . . . unit", " . . . part" or the like used below refers to a unit that processes at least one function or operation, and may be implemented by hardware, software, or a combination of hardware and software.

Referring to FIG. 2, the base station includes a wireless communication unit 210, a backhaul communication unit 220, a storage 230, and a controller 240.

The wireless communication unit 210 performs a function for transmitting or receiving a signal through a wireless channel. For example, the wireless communication unit 210 may perform a conversion function between a baseband signal and a bit string according to a physical layer standard of a system. For example, in case of transmitting data, the wireless communication unit 210 may generate complex symbols by coding and modulating a transmission bit stream. In addition, in case of receiving data, the processor 210 may restore a bit stream through demodulating and decoding a baseband signal.

In addition, the wireless communication unit 210 up-converts the baseband signal into a radio frequency (RF) band signal and transmits the RF band signal through an antenna, and down-converts the RF band signal received through the antenna into a baseband signal. To this end, the wireless communication unit 210 may include a transmission filter, a reception filter, an amplifier, a mixer, an oscillator, a digital to analog converter (DAC), an analog to digital converter (ADC), and the like. In addition, the wireless communication unit 210 may include multiple transmission/reception paths. Furthermore, the wireless communication unit 210 may include at least one antenna array composed of multiple antenna elements.

In terms of hardware, the wireless communication unit 210 may include a digital unit and an analog unit, and the analog unit may include multiple sub-units according to operating power, operating frequency, and the like. The digital unit may be implemented as at least one processor (e.g., a digital signal processor (DSP)).

The wireless communication unit 210 transmits and receives signals as described above. Accordingly, all or a portion of the wireless communication unit 210 may be referred to as a "transmitter", "receiver", or "transceiver". In addition, in the following description, transmission and reception performed through a wireless channel are used as a meaning including performing the above-described processing by the wireless communication unit 210. In some embodiments, the wireless communication unit 210 may perform a function for transmitting or receiving a signal by using wired communication.

The backhaul communication unit 220 may provide an interface for performing communication with other nodes in the network. That is, the backhaul communication unit 220 may convert a bit string transmitted from a base station to another node, for example, another access node, another base station, an upper node, and a core network, and converts a physical signal received from another node into a bit string.

The storage 230 may store data such as a basic program, an application program, and configuration information for an operation of the base station. The storage 230 may be configured as a volatile memory, a nonvolatile memory, or a combination of a volatile memory and a nonvolatile memory. In addition, the storage 230 may provide stored data according to a request of the controller 240.

The controller 240 may control overall operations of the base station. For example, the controller 240 transmits and receives a signal through the wireless communication unit 210 or the backhaul communication unit 220. In addition, the controller 240 records and reads data in the storage 230. The controller 240 may perform functions of a protocol stack required by a communication standard. According to another embodiment, the protocol stack may be included in the wireless communication unit 210. To this end, the controller 240 may include at least one processor.

According to embodiments, the controller 240 may transmit or receive control information to or from the terminal 120. For example, the controller 240 may control the base station to perform operations according to embodiments (embodiment 1 to embodiment 9).

Figure 3:
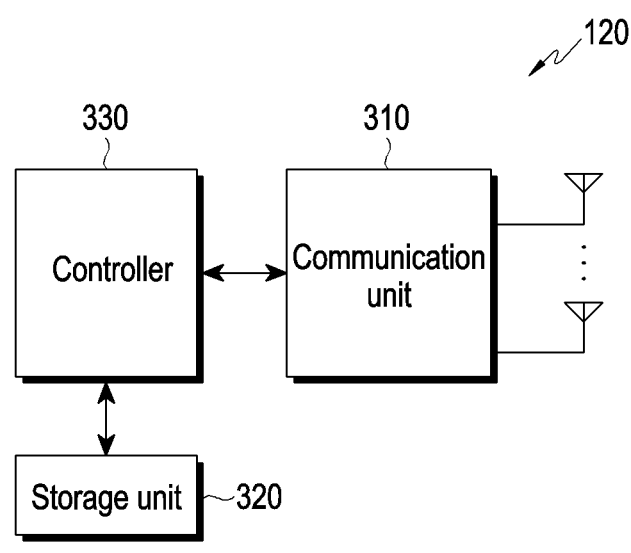
FIG. 3 illustrates a configuration of a terminal in a wireless communication system according to an embodiment of the disclosure.

FIG. 3 illustrates a configuration of a UE in a wireless communication system according to an embodiment of the disclosure. The configuration illustrated in FIG. 3 may be understood as a configuration of the terminal 120. Terms such as " . . . unit", " . . . part" or the like used below refers to a unit that processes at least one function or operation, and may be implemented by hardware, software, or a combination of hardware and software.

Referring to FIG. 3, the terminal 120 includes a communication unit 310, a storage 320, and a controller 330.

The communication unit 310 performs a function for transmitting or receiving a signal through a wireless channel. For example, the communication unit 310 may perform a conversion function between a baseband signal and a bit string according to a physical layer standard of a system. For example, in case of transmitting data, the communication unit 310 may generate complex symbols by coding and modulating a transmission bit stream. In addition, in case of receiving data, the communication unit 310 may restore a bit stream through demodulating and decoding a baseband signal. In addition, the communication unit 310 up-converts the baseband signal into a RF band signal and transmits the RF band signal through an antenna, and down-converts the RF band signal received through the antenna into a baseband signal. For example, the communication unit 310 may include a transmission filter, a reception filter, an amplifier, a mixer, an oscillator, a DAC, an ADC, and the like.

In addition, the communication unit 310 may include multiple transmission/reception paths. Furthermore, the communication unit 310 may include at least one antenna array including multiple antenna elements. In terms of hardware, the communication unit 310 may include a digital circuit and an analog circuit (e.g., radio frequency integrated circuit (RFIC)). Here, the digital circuit and the analog circuit may be implemented as a single package. In addition, the communication unit 310 may include multiple RF chains. Furthermore, the communication unit 310 may perform beamforming.

In addition, the communication unit 310 may include different communication modules to process signals of different frequency bands. Furthermore, the communication unit 310 may include multiple communication modules to support different wireless access technologies. For example, the different wireless access technologies may include Bluetooth low energy (BLE), Wireless Fidelity (Wi-Fi), WiFi Gigabyte (WiGig), cellular networks (e.g., Long-Term Evolution (LTE)), and the like. The different frequency bands may include a super high frequency (SHF) (e.g., 2.5 GHz and 5 GHz) band and a millimeter wave (e.g., 60 GHz) band.

The communication unit 310 transmits and receives signals as described above. Accordingly, all or a portion of the communication unit 310 may be referred to as a "transmitter", "receiver", or "transceiver". In addition, in the following description, transmission and reception performed through a wireless channel are used as a meaning including performing the above-described processing by the communication unit 310. In some embodiments, the communication unit 310 may perform a function for transmitting or receiving a signal by using wired communication.

The storage 320 may store data such as a basic program, an application program, and configuration information for an operation of the terminal. The storage 320 may be configured as a volatile memory, a nonvolatile memory, or a combination of a volatile memory and a nonvolatile memory. In addition, the storage 320 may provide stored data according to a request of the controller 330.

The controller 330 may control overall operations of the terminal. For example, the controller 330 transmits and receives a signal through the communication unit 310. In addition, the controller 330 records and reads data in the storage 320. The controller 330 may perform functions of a protocol stack required by a communication standard. To this end, the controller 330 may include at least one processor or a micro-processor, or may be a part of the processor. In addition, a part of the communication unit 310 and the controller 330 may be referred to a communication processor (CP).

According to embodiments, the controller 330 may transmit or receive control information to or from the base station 110. For example, the controller 330 may control the terminal to perform operations according to embodiments (embodiment 1 to embodiment 9).

Figure 4A:
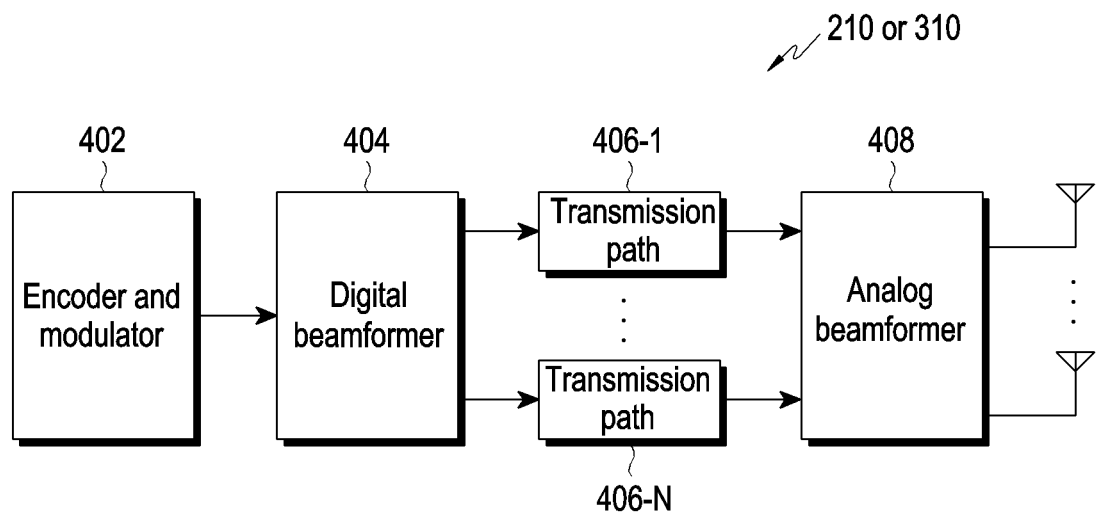
FIG. 4A illustrates a configuration of a communication unit in a wireless communication system according to an embodiment of the disclosure.
Figure 4B:
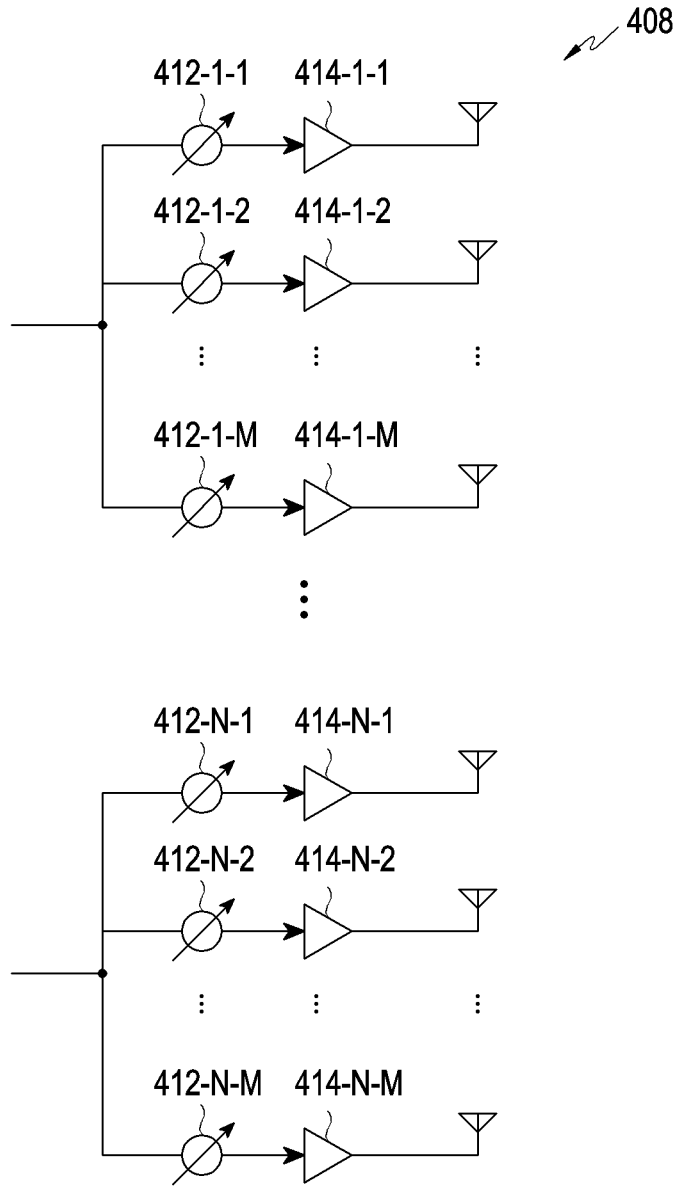
FIG. 4B illustrates an example of a configuration of an analog beamforming unit of a communication unit in a wireless communication system according to an embodiment of the disclosure.
Figure 4C:
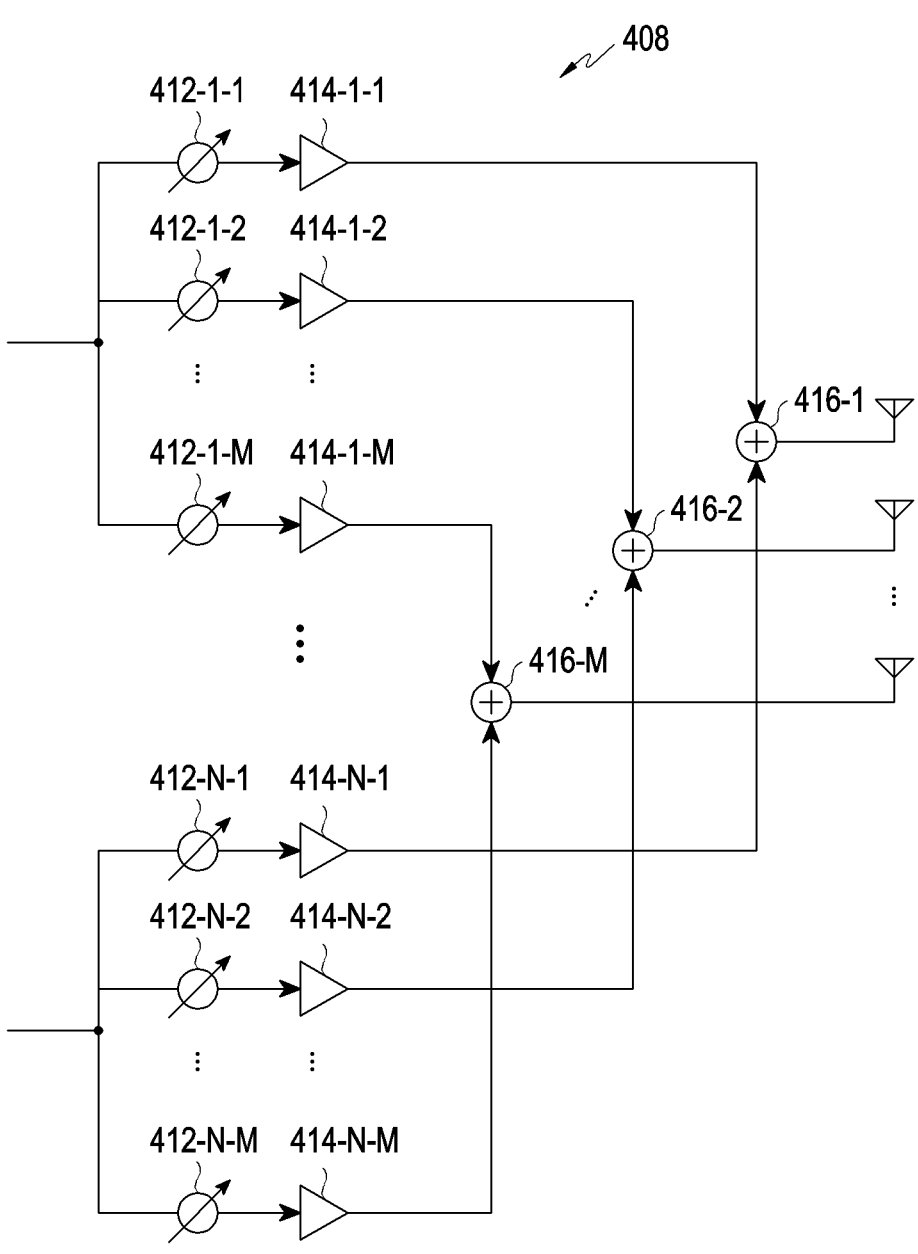
FIG. 4C illustrates another example of a configuration of an analog beamforming unit of a communication unit in a wireless communication system according to an embodiment of the disclosure.

FIG. 4A to FIG. 4C illustrate a configuration of a communication unit in a wireless communication system according to an embodiment of the disclosure.

FIG. 4A to FIG. 4C illustrate an example of a detailed configuration of the wireless communication unit 210 in FIG. 2 or the communication unit 310 in FIG. 3. Specifically, FIG. 4A to FIG. 4C illustrate components for performing beamforming as a portion of the wireless communication unit 210 in FIG. 2 or the communication unit 310 in FIG. 3.

Referring to FIG. 4A, the wireless communication unit 210 or the communication unit 310 includes an encoding and modulation unit 402, a digital beamforming unit 404, multiple transmission paths 406-1 to 406-N, and an analog beamforming unit 408.

The encoding and modulation unit 402 performs channel encoding. For channel encoding, at least one of a low-density parity check (LDPC) code, a convolution code, and a polar code may be used. The encoding and modulation unit 402 generates modulation symbols by performing constellation mapping.

The digital beamforming unit 404 performs beamforming with respect to a digital signal (e.g., modulation symbols). To this end, the digital beamforming unit 404 multiplies modulation symbols by beamforming weights. Here, the beamforming weights are used to change a magnitude and phase of a signal, and may be referred to as a precoding matrix, a pre-coder, or the like. The digital beamforming unit 404 may output digital beamformed modulation symbols to the multiple transmission paths 406-1 to 406-N. In this case, according to a multiple input multiple output (MIMO) transmission scheme, modulation symbols may be multiplexed or the same modulation symbols may be provided to multiple transmission paths 406-1 to 406-N.

The multiple transmission paths 406-1 to 406-N may convert a digital beamformed digital signal into an analog signal. To this end, each of the multiple transmission paths 406-1 to 406-N may include an inverse fast fourier transform (IFFT) operation unit, a cyclic prefix (CP) insertion unit, a DAC, and an up-conversion unit. The CP insertion unit is for an orthogonal frequency division multiplexing (OFDM) scheme, and may be excluded in case that another physical layer scheme (e.g., filter bank multi-carrier (FBMC)) is applied. That is, the multiple transmission paths 406-1 to 406-N may provide an independent signal processing process for multiple streams generated through digital beamforming. However, depending on an implementation manner, a portion of the components of the multiple transmission paths 406-1 to 406-N may be used in common.

The analog beamforming unit 408 may perform beamforming with respect to an analog signal. To this end, the digital beamforming unit 404 multiplies analog signals by beamforming weights. Here, the beamforming weights are used to change a magnitude and phase of a signal. Specifically, according to multiple transmission paths 406-1 to 406-N and a connection structure between antennas, the analog beamforming unit 408 may be configured as FIG. 4B or FIG. 4C.

Referring to FIG. 4B, signals input to the analog beamforming unit 408 are transmitted to antenna via phase/magnitude conversion and amplification operation. Here, signals of respective paths are transmitted through different antenna groups, that is, antenna arrays. Referring to processing of signals input through a first path, the signals are converted into signal sequences having different phases/magnitudes or the same phase/magnitude by phase/magnitude converters 412-1-1 to 412-1-M, are amplified by the amplifiers 414-1-1 to 414-1-M, and then are transmitted through the antennas.

Referring to FIG. 4C, signals input to the analog beamforming unit 408 are transmitted to antenna via phase/magnitude conversion and amplification operation. Here, signals of respective paths are transmitted through the same antenna set, that is, the same antenna array. Referring to processing of signals input through the first path, the signals are converted into signal sequences having different phases/magnitudes or the same phase/magnitude by the phase/magnitude converters 412-1-1 to 412-1-M, and are amplified by the amplifiers 414-1-1 to 414-1-M. For transmission through a single antenna array, the amplified signals are combined based on antenna elements by combiners 416-1-1 to 416-1-M, and then transmitted through the antennas.

FIG. 4B shows an example in which an independent antenna array is used for each transmission path, and FIG. 4C shows an example in which transmission paths share a single antenna array. However, according to another embodiment, some transmission paths may use an independent array, and the remaining paths may share a single antenna array. Further, according to another embodiment, a structure adaptively changeable depending on a situation may be available by applying a structure switchable between transmission paths and antenna arrays.

In an LTE system, which is a representative example of the broadband wireless communication system, a downlink (DL) adopts an orthogonal frequency division multiplexing (OFDM) scheme, and an uplink (UL) adopts a single carrier frequency division multiple access (SC-FDMA) scheme. In the multi-access scheme as described above, time-frequency resources, in which the data or control information is transmitted to each user, are assigned and operated so as not to overlap each other, that is, to establish orthogonality, thereby distinguishing the data or control information for each user.

Figure 5:
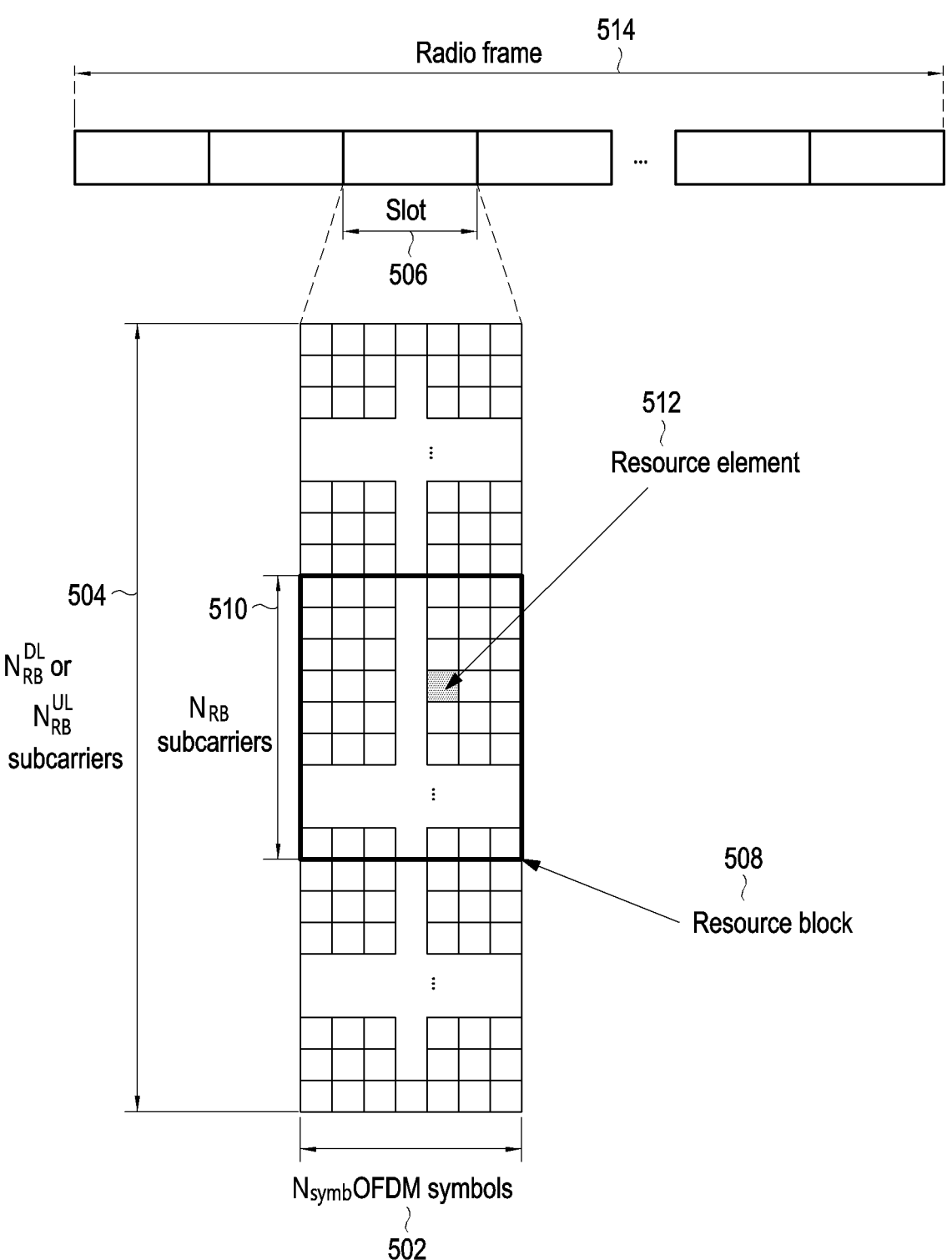
FIG. 5 illustrates a resource structure of a time-frequency domain in a wireless communication system according to an embodiment of the disclosure.

FIG. 5 illustrates a resource structure of a time-frequency domain in a wireless communication system according to an embodiment of the disclosure. FIG. 5 illustrates a basic structure of a time-frequency domain that is a radio resource area in which data or a control channel is transmitted in downlink or uplink.

In FIG. 5, a horizontal axis indicates a time domain and a vertical axis indicates a frequency domain. A minimum transmission unit in the time domain is an OFDM symbol, and $N_{symb}$ OFDM symbols 502 are gathered to constitute one slot 506. A length of a subframe is defined to be 1.0 ms, and a length of a radio frame 514 is defined to be 10 ms. A minimum transmission unit in the frequency domain is a subcarrier, and a bandwidth of the entire system transmission bandwidth may include a total of $N_{BW}$ subcarriers 504. Specific values of $N_{symb}$, $N_{BW}$, etc. may be variably applied depending on the system.

A basic unit of a resource in the time-frequency domain is a resource element (hereinafter, "RE") 512, and may be indicated by an OFDM symbol index and a subcarrier index. A resource block (RB or physical resource block, hereinafter, "PRB") 508 is defined as $N_{symb}$ consecutive OFDM symbols 502 in the time domain and $N_{RB}$ consecutive subcarriers 510 in the frequency domain. Therefore, one RB 508 includes $N_{symb} \times N_{RB}$ REs 512. In general, a minimum transmission unit of data is RB.

In the NR system, in general, $N_{symb}=14$, $N_{RB}=12$, and $N_{BW}$ and $N_{RB}$ are proportional to a bandwidth of a system transmission band. A data rate may increase in proportion to the number of RBs scheduled for a terminal. In the NR system, in a case of a frequency division duplex (FDD) system that performs operation by dividing a downlink and an uplink according to frequency, a downlink transmission bandwidth and an uplink transmission bandwidth may be different. A channel bandwidth indicates a radio frequency (RF) bandwidth corresponding to a system transmission bandwidth.

Table 1 and Table 2 show parts of correspondence relationships between a channel bandwidth, subcarrier spacing (SCS), and a system transmission bandwidth defined in the NR system in a frequency band lower than 6 GHz and a frequency band higher than 6 GHz. For example, in the NR system having a channel bandwidth of 100 MHz with a subcarrier spacing of 30 kHz, a transmission bandwidth includes 273 RBs. In Table 1 and Table 2, N/A may be a bandwidth-subcarrier combination that is not supported by the NR system.

TABLE 1

| | | Channel bandwidth [MHz] | | | | | |
|---|---|---|---|---|---|---|---|
| | SCS | 5 | 10 | 20 | 50 | 80 | 100 |
| Transmission bandwidth configuration ($N_{RB}$) | 15 kHz | 25 | 52 | 106 | 207 | N/A | N/A |
| | 30 kHz | 11 | 24 | 51 | 133 | 217 | 273 |
| | 60 kHz | N/A | 11 | 24 | 65 | 107 | 135 |

TABLE 2

| | | Channel bandwidth [MHz] | | | |
|---|---|---|---|---|---|
| | SCS | 50 | 100 | 200 | 400 |
| Transmission bandwidth configuration (NRB) | 60 kHz | 66 | 132 | 264 | N/A |
| | 120 kHz | 32 | 66 | 132 | 264 |

In the NR system, scheduling information on downlink data or uplink data is transferred from a base station to a terminal via downlink control information ("DCI"). DCI is defined in various formats, and it may be determined according to each format whether DCI is an uplink grant that is scheduling information for uplink data or a downlink grant that is scheduling information for downlink data, whether DCI is compact DCI having a small size of control information, whether spatial multiplexing using a multi-antenna is applied, whether DCI is for power control, and the like.

For example, DCI format 1-1 which is scheduling control information for downlink data may include at least one of items shown in Table 3 below.

TABLE 3

| Items | Contents |
|---|---|
| Carrier indicator | Indicating a frequency carrier in which transmission is performed |
| DCI format indicator | An indicator for distinguishing whether corresponding DCI is for downlink or uplink |
| Bandwidth part (BWP) indicator | Indicating a BWP in which transmission is performed |
| Frequency domain resource allocation | Indicating an RB in a frequency domain allocated for data transmission. A resource to be represented is determined according to a system bandwidth and a resource allocation scheme. |
| Time domain resource allocation | Indicating an OFDM symbol of a slot, in which a data-related channel is to be transmitted |
| VRB-to-PRB mapping | Indicating a scheme by which a virtual RB (VRB) index and a physical RB (PRB) index are to be mapped |

TABLE 3-continued

| Items | Contents |
|---|---|
| Modulation and coding scheme (MCS) | Indicating a modulation scheme and a coding rate used for data transmission. That is, a coding rate value that may inform of TBS and channel coding information along with information on whether the modulation scheme is QPSK, 16 QAM, 64 QAM, or 256 QAM (or 1024QAM or 4096QAM) may be indicated. |
| Codeblock group (CBG) transmission information | In case that CBG retransmission is configured, indicating information on a CBG to be transmitted |
| HARQ process number | Indicating a process number of HARQ |
| New data indicator (NDI) | Indicating whether transmission is HARQ initial transmission or retransmission |
| Redundancy version (RV) | Indicating a redundancy version of HARQ |
| Transmit power control command (TPC) for physical uplink control channel (PUCCH) | Indicating a transmit power control command for a PUCCH that is an uplink control channel |

In Table 3, in case of PDSCH transmission, time domain resource allocation may be expressed by information on a slot in which the PDSCH is transmitted, a start symbol position S at the slot, and the number L of symbols to which the PDSCH is mapped. Here, S may be a relative position from the start of the slot, L may be the number of consecutive OFDM symbols, and S and L may be determined based on a start and length indicator value (SLIV) defined as follows.

```
if (L−1)≤7 then
    SLIV=14·(L−1)+S
else
    SLIV=14·(14−L+11)+(14−1−S)
where 0<L≤14−S
```

In the NR system, generally via a radio resource control (RRC) configuration, information on a correspondence relationship between a SLIV value, a PDSCH or a physical uplink shared channel (PUSCH) mapping type, and information on a slot in which a PDSCH or a PUSCH is transmitted may be configured in one row. Then, by using time domain resource allocation of DCI, an index value defined in the configured correspondence relationship is indicated, so that the base station may transfer, to the terminal, the SLIV value, the PDSCH or PUSCH mapping type, and information on the slot in which the PDSCH or PUSCH is transmitted.

In case of the NR system, the PDSCH or PUSCH mapping types are defined as type A and type B. In a case of PDSCH or PUSCH mapping type A, a demodulation reference signal (DMRS) symbol starts in a second or a third OFDM symbol in a slot. In a case of PDSCH or PUSCH mapping type B, a DMRS symbol starts in a first OFDM symbol of a time domain resource allocated for PUSCH transmission.

DCI may be transmitted in a physical downlink control channel (PDCCH) that is a downlink control channel via channel coding and modulation. A PDCCH may be used to refer to control information itself rather than a channel. In general, DCI is independently scrambled for each terminal by using a specific radio network temporary identifier (RNTI) or terminal identifier, and after adding of a cyclic redundancy check (CRC) and channel coding, the DCI is configured for each independent PDCCH so as to be transmitted. The PDCCH is mapped to a control resource set (CORESET) configured for the terminal.

Downlink data may be transmitted in a PDSCH that is a physical channel for downlink data transmission. The PDSCH may be transmitted after a control channel transmission interval, and scheduling information, such as a specific mapping position and a modulation scheme in the frequency domain, is indicated by DCI transmitted through the PDCCH. Via an MCS in control information constituting the DCI, the base station notifies the terminal of a size (e.g., transport block size (TBS)) of data to be transmitted or a target coding rate and a modulation scheme applied to the PDSCH to be transmitted. In an embodiment, the MCS may include five bits, or more or fewer than 5 bits. The TBS corresponds to a size of a transport block (TB) before channel coding for error correction is applied to a data TB to be transmitted by the base station.

In the disclosure, a transport block (TB) may include a medium access control (MAC) header, a MAC control element (MAC CE), one or more MAC service data unit (SDU), and padding bits. Alternatively, the TB may indicate a MAC protocol data unit (PDU) or a unit of data to be sent down from a MAC layer to a physical layer.

Modulation schemes supported by the NR system are quadrature phase shift keying (QPSK), 16 quadrature amplitude modulation (QAM), 64 QAM, and 256 QAM, and each modulation order (Qm) may be 2, 4, 6 or 8, respectively. That is, 2 bits, 4 bits, 6 bits, 8 bits may be transmitted in each symbol in cases of QPSK, 16 QAM, 64 QAM, and 256 QAM, respectively, and in case of 1024 QAM is supported, 10 bits may be mapped and transmitted in each symbol of 1024 QAM.

Figure 6A:
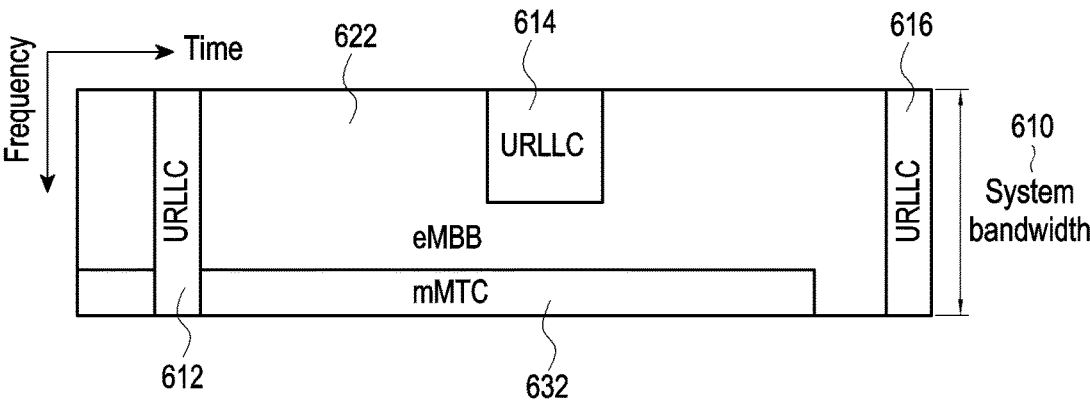
FIG. 6A illustrates an example of allocation of data for each service to a frequency-time resource in a wireless communication system according to an embodiment of the disclosure.
Figure 6B:
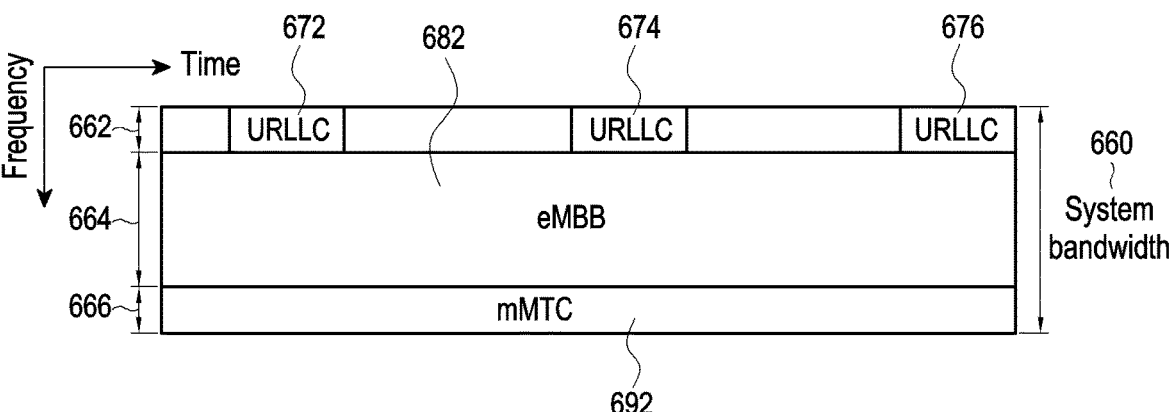
FIG. 6B illustrates another example of allocation of data for each service to a frequency-time resource in a wireless communication system according to an embodiment of the disclosure.

In terms of services, the NR system is being designed so that various services are freely multiplexed in time and frequency resources, and accordingly waveform/numerology, a reference signal, etc. may be dynamically or freely adjusted as required. In order to provide an optimal service to a terminal in wireless communication, optimized data transmission via measurement of an interference amount and a channel quality is important, and therefore accurate channel state measurement is essential. However, unlike 4G communication in which channel and interference characteristics do not change significantly according to frequency resources, in case of a 5G channel, channel and interference characteristics vary significantly depending on services, and it is thus necessary to support a subset of a frequency resource group (FRG) level, which enables measurement by division. In the NR system, types of supported services may be divided into enhanced mobile broadband (eMBB), massive machine type communications (MMTC), and ultra-reliable and low-latency communications (URLLC). The eMBB is a service aiming for high-speed transmission of high-capacity data, the mMTC is a service aiming for minimizing terminal power and accessing multiple terminals, and the URLLC is a service aiming for high reliability and low latency. Different requirements may be applied depending on types of services applied to the terminal. Examples of resource distribution for each service are as shown in FIG. 6A and FIG. 6B below. Referring to FIG. 6A and FIG. 6B below, a scheme in which frequency and time resources are allocated for information transmission in each system is identified.

FIG. 6A illustrates an example of allocation of data for each service to a frequency-time resource in a wireless communication system according to an embodiment of the disclosure.

Referring to FIG. 6A, resources are allocated for eMBB 622, URLLC 612, 614, and 616, and mMTC 632 in the entire system frequency band 610. In case that URLLC 612, 614, and 616 data is generated while eMBB 622 data and mMTC 632 data are being allocated and transmitted in a specific frequency band, the URLLC 612, 614, and 616 data may be transmitted without emptying a part having already been allocated for the eMBB 622 and the mMTC 632, or without transmitting the eMBB 622 data and mMTC 632 data. The URLLC requires reduction of a delay time, and thus resources for transmitting the URLLC 612, 614, and 616 data may be allocated to a part of resources allocated to the eMBB 622. Of course, in case that the URLLC 612, 614, and 616 is additionally allocated and transmitted in the resources to which the eMBB 622 is allocated, the eMBB 622 data may not be transmitted in an overlapping frequency-time resource, and therefore transmission performance of the eMBB 622 data may be lowered. That is, in this case, a transmission failure of the eMBB 622 data may occur due to allocation of resources for the URLLC 612, 614, and 616. The scheme shown in FIG. 6A may be referred to as a preemption scheme.

FIG. 6B illustrates another example of allocation of data for each service to a frequency-time resource in a wireless communication system according to an embodiment of the disclosure.

FIG. 6B illustrates an example in which each service is provided in each of sub-bands 662, 664, and 666 obtained by dividing the entire system frequency band 660. Specifically, the sub-band 662 is used for transmission of URLLC 672, 674, and 576 data, the sub-band 664 is used for transmission of eMBB 682 data, and the sub-band 666 is used for transmission of mMTC 692 data. Information related to configurations of the sub-bands 662, 664, and 666 may be predetermined, and the information may be transmitted from a base station to a terminal via higher level signaling. Alternatively, without separate transmission of sub-band configuration information to the terminal, the information related to the sub-bands 662, 664, and 666 may be arbitrarily divided by the base station or a network node to provide services.

According to an embodiment, a length of a transmission time interval (TTI) used for URLLC transmission may be shorter than a length of a TTI used for eMBB or mMTC transmission. In addition, a response of URLLC-related information may be transmitted faster than eMBB or mMTC, and therefore a terminal using a URLLC service may transmit or receive information with a low delay. Structures of physical layer channels used for respective types for transmission of the aforementioned three services or data may be different from each other. For example, at least one of TTI lengths, allocation units of frequency resources, structures of control channels, and data mapping methods may be different from each other. Although three services and three data types have been described above, more kinds of services and corresponding data types may exist. Even in this case, various embodiments to be described later may be implemented.

Figure 6C:
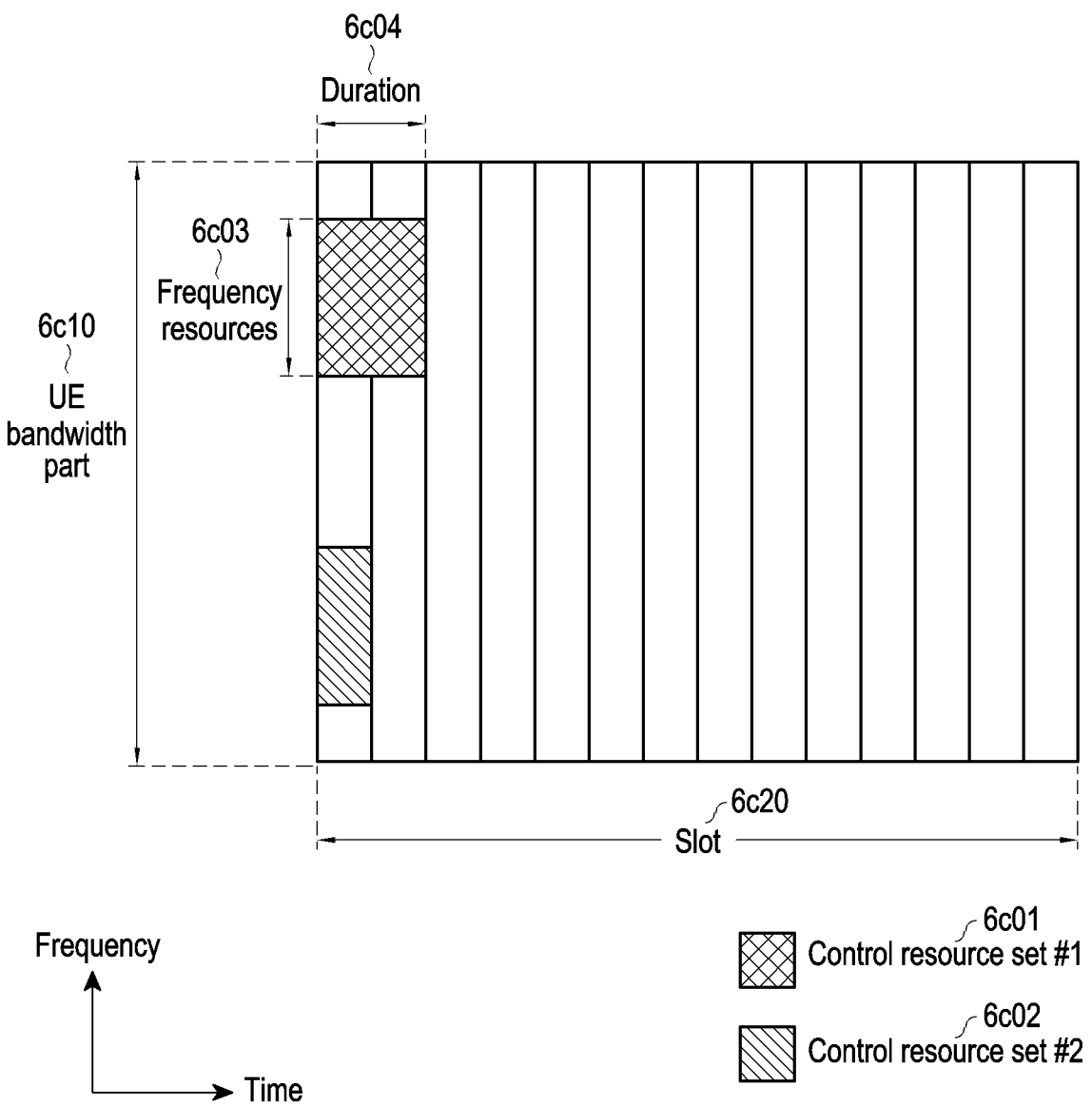
FIG. 6C illustrates an example of a control resource set (CORESET) through which a downlink control channel is transmitted in a wireless communication system according to an embodiment of the disclosure.

FIG. 6C illustrates an example of a control resource set (CORESET) through which a downlink control channel is transmitted in a wireless communication system according to an embodiment of the disclosure. FIG. 6C a diagram illustrating an example in which a terminal bandwidth part (UE bandwidth part) 6c10 is configured on a frequency axis, and two control resource sets (control resource set #1 6c01 and control resource set #2 6c02) are configured within one slot 6c20 on a time axis. The control resource sets 6c01 and

6c02 may be configured in a specific frequency resource 6c03 within the entire terminal bandwidth part 6c10 on the frequency axis. One or more OFDM symbols may be configured on the time axis and may be defined as a control resource set duration 6c04. Referring to the example illustrated in FIG. 6C, control resource set #1 6c01 may be configured to be a control resource set duration of 2 symbols, and control resource set #2 6c02 may be configured to be a control resource set duration of 1 symbol.

The aforementioned control resource set in 5G may be configured for the terminal by the base station via higher layer signaling (e.g., system information, a master information block (MIB), and radio resource control (RRC) signaling). Configuring a control resource set for a terminal refers to providing information, such as an identity of the control resource set, a frequency position of the control resource set, and a symbol length of the control resource set. For example, information provided to configure a control resource set is as follows.

```
ControlResourceSet ::=              SEQUENCE {
    -- Corresponds to L1 parameter 'CORESET-ID'
    controlResourceSetId            ControlResourceSetId,
    (Control resource set identity)
    frequency DomainResources       BIT STRING (SIZE (45)),
    (Frequency axis resource assignment information)
    duration                        INTEGER (1..maxCoReSetDuration),
    (Time axis resource assignment information)
    cce-REG-MappingType             CHOICE {
    (CCE-to-REG mapping scheme)
        interleaved                 SEQUENCE {
            reg-BundleSize          ENUMERATED {n2, n3, n6},
        (RGB bundle size)
            precoderGranularity     ENUMERATED {sameAsREG-
        bundle, allContiguousRBs},
            interleaverSize         ENUMERATED {n2, n3, n6}
            (Interleaver size)
            shiftIndex
            INTEGER(0..maxNrofPhysicalResourceBlocks-1)
                OPTIONAL
            (: Interleaver Shift)
        },
        nonInterleaved              NULL
    },
    tci-StatesPDCCH                 SEQUENCE(SIZE (1..
        maxNrofTCI-StatesPDCCH)) OF TCI-StateId    OPTIONAL,
    (QCL configuration information)
    tci-PresentInDCI                ENUMERATED {enabled}
}                                   OPTIONAL, -- Need S
```

In 5G, a control resource set may include $N_{RB}^{CORESET}$ RBs in the frequency domain, and may include $N_{symb}^{CORESET} \in \{1,2,3\}$ symbols on the time axis. One CCE may include six REGs, and an REG may be defined to be one RB during one OFDM symbol. In one control resource set, REGs may be indexed in a time-first order, starting with REG index 0 from a first OFDM symbol, a lowest RB, of the control resource set.

In 5G, an interleaved scheme and a non-interleaved scheme as a method for transmitting a PDCCH are supported. The base station may configure, for the terminal via higher layer signaling, whether to perform interleaved or non-interleaved transmission for each control resource set. Interleaving may be performed in units of REG bundles. An REG bundle may be defined to be a set of one or multiple REGs. The terminal may determine a CCE-to-REG mapping scheme in a corresponding control resource set according to the following manner, depending on whether interleaved or non-interleaved transmission configured from the base station.

Figure 6D:
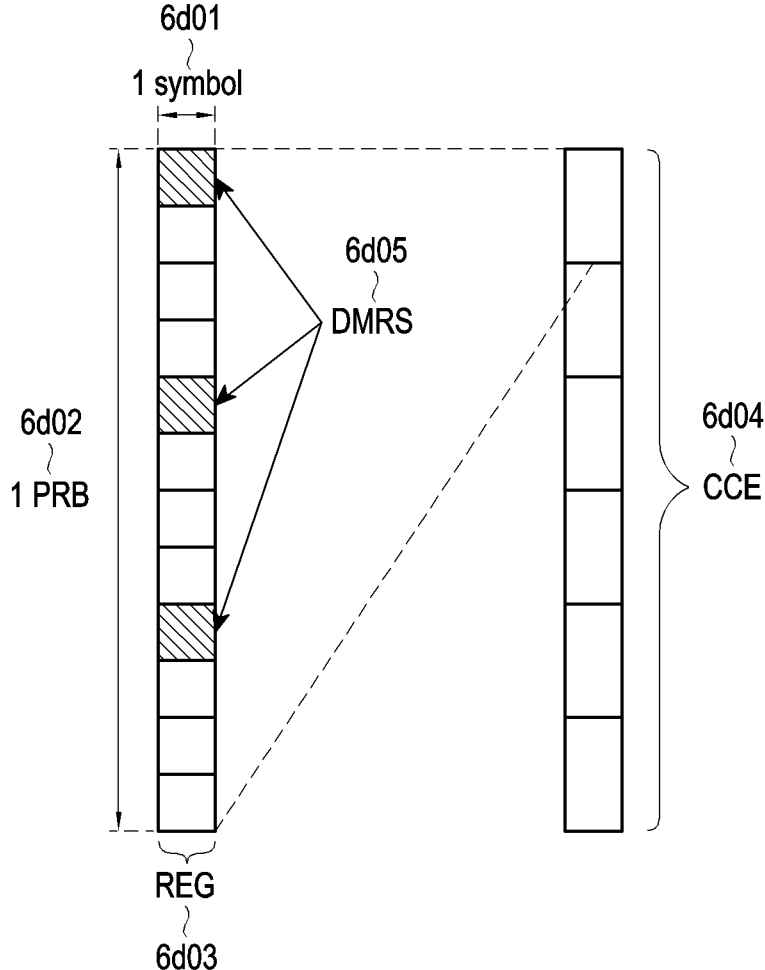
FIG. 6D illustrates an example in which a basic unit REG 6*d*03 of a downlink control channel includes both REs to which DCI is mapped and an area to which a DMRS 6*d*05 that is a reference signal for decoding the REs are mapped, according to an embodiment of the disclosure.

The basic unit REG 6d03 of a downlink control channel shown in FIG. 6D may include both REs to which DCI is mapped and an area to which a DMRS 6d05 that is a reference signal for decoding the REs are mapped. As shown in FIG. 6D, three DMRSs 6d05 may be transmitted within one REG 6d03. The number of CCEs required to transmit a PDCCH may be 1, 2, 4, 8, or 16 depending on an aggregation level (AL), and different numbers of CCEs may be used to implement link adaptation of the downlink control channel. For example, in case that AL=L, a single downlink control channel may be transmitted via L CCEs. The terminal needs to detect a signal without knowing information on the downlink control channel, wherein a search space representing a set of CCEs is defined for blind decoding. The search space is a set of downlink control channel candidates including CCEs, for which the terminal needs to attempt decoding on a given aggregation level, and since there are various aggregation levels that make one bundle with 1, 2, 4, 8, or 16 CCEs, the terminal may have multiple search spaces. The search space set may be defined to be a set of search spaces at all configured aggregation levels.

The search space may include a common search space and a terminal-specific (UE-specific) search space. A certain group of terminals or all terminals may monitor a common search space of a PDCCH in order to receive cell-common control information, such as a paging message or dynamic scheduling for system information. For example, PDSCH scheduling allocation information for transmission of an SIB including cell operator information, etc. may be received by monitoring the common search space of the PDCCH. Since a certain group of terminals or all terminals need to receive the PDCCH, the common search space may be defined as a set of predetermined CCEs. Scheduling allocation information for a terminal-specific PDSCH or PUSCH may be received by monitoring a terminal-specific search space of the PDCCH. The terminal-specific search, space may be defined terminal-specifically, based on an identity of the terminal and functions of various system parameters.

In 5G, a parameter for a search space for a PDCCH may be configured for the terminal by the base station via higher layer signaling (e.g., an SIB, an MIB, and RRC signaling). For example, the base station may configure, for the terminal, the number of PDCCH candidates of each aggregation level L, a monitoring periodicity for a search space, a monitoring occasion in units of symbols in a slot for the search space, a search space type (common search space or terminal-specific search space), a combination of an RNTI and a DCI format, which is to be monitored in the search space, a control resource set index for monitoring of the search space, etc. For example, the parameter for the PDCCH search space may include the following information.

```
SearchSpace ::=                        SEQUENCE {
    -- Identity of the search space. SearchSpaceId = 0 identifies the
    SearchSpace configured via PBCH (MIB) or
        ServingCellConfigCommon.
        searchSpaceId                  SearchSpaceId,
    (Search space identifier)
        controlResourceSetId           ControlResourceSetId,
    (Control resource set identity)
        monitoringSlotPeriodicityAndOffset CHOICE {
    (Monitoring slot level period)
            sl1                        NULL,
            sl2                        INTEGER (0..1),
            sl4                        INTEGER (0..3),
            sl5                        INTEGER (0..4),
            sl8                        INTEGER (0..7),
```

-continued

```
            sl10                       INTEGER (0..9),
            sl16                       INTEGER (0..15),
            sl20                       INTEGER (0..19),
            sl40                       INTEGER (0..39),
            sl80                   INTEGER (0..79),
            sl160                  INTEGER (0..159),
            sl320                  INTEGER (0..319),
            sl640                  INTEGER (0..639),
            sl1280                 INTEGER (0..1279),
            sl2560                 INTEGER (0..2559)
        }
                                       OPTIONAL,
    duration(Monitoring duration)      INTEGER (2..2559)
        monitoringSymbolsWithinSlot    BIT STRING (SIZE (14))
                                       OPTIONAL,
    (Monitoring symbol in slot)
        nrofCandidates                 SEQUENCE {
    (The number of PDCCH candidates for each aggregation level)
            aggregationLevel1          ENUMERATED {n0, n1, n2, n3,
            n4, n5, n6, n8},
            aggregationLevel2          ENUMERATED {n0, n1, n2, n3,
            n4, n5, n6, n8},
            aggregationLevel4          ENUMERATED {n0, n1, n2, n3,
            n4, n5, n6, n8},
            aggregationLevel8          ENUMERATED {n0, n1, n2, n3,
            n4, n5, n6, n8},
            aggregationLevel16         ENUMERATED {n0, n1, n2, n3,
            n4, n5, n6, n8}
        },
        searchSpace Type               CHOICE {
    (Search space type)
            -- Configures this search space as common search space (CSS)
            and DCI formats to monitor.
            common                     SEQUENCE {
        (Common search space)
            }
            ue-Specific                SEQUENCE {
        (UE-specific search space)
                -- Indicates whether the UE monitors in this USS for DCI
            formats 0-0 and 1-0 or for formats 0-1 and 1-1.
                formats                ENUMERATED
            formats0-0-And-1-0, formats0-1-And-1-1},
            ...
        }
```

According to configuration information, the base station may configure one or more search space sets for the terminal. According to some embodiments, the base station may configure search space set 1 and search space set 2 for the terminal. The terminal may be configured to monitor DCI format A scrambled with an X-RNTI in the common search space in search space set 1, and may be configured to monitor DCI format B scrambled with a Y-RNTI in the terminal-specific search space in search space set 2.

According to the configuration information, one or multiple search space sets may exist in the common search space or the terminal-specific search space. For example, search space set #1 and search space set #2 may be configured to be a common search space, and search space set #3 and search space set #4 may be configured to be a terminal-specific search space.

In the common search space, the following combinations of DCI formats and RNTIs may be monitored. Of course, the disclosure is not limited to the following examples.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI DCI format 2_4 with CRC scrambled by CI-RNTI DCI format 2_5 with CRC scrambled by AI-RNTI DCI format 2_6 with CRC scrambled by PS-RNTI In the terminal-specific search space, the following combinations of DCI formats and RNTIs may be monitored. Of course, the disclosure is not limited to the following examples.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The specified RNTIs may follow the definitions and uses below.

Cell RNTI (C-RNTI): For terminal-specific PDSCH scheduling

Temporary cell RNTI (TC-RNTI): For terminal-specific PDSCH scheduling

Configured scheduling RNTI (CS-RNTI): For semi-statically configured terminal-specific PDSCH scheduling Random-Access RNTI (RA-RNTI): For PDSCH scheduling during random-access Paging RNTI (P-RNTI): For scheduling PDSCH on which paging is transmitted System Information RNTI (SI-RNTI): For scheduling PDSCH on which system information is transmitted Interruption RNTI (INT-RNTI): For indicating whether to puncture PDSCH Transmit power control for PUSCH RNTI (TPC-PUSCH-RNTI): For indicating power control command for PUSCH Transmit power control for PUCCH RNTI (TPC-PUCCH-RNTI): For indicating power control command for PUCCH Transmit power control for SRS RNTI (TPC-SRS-RNTI): For indicating power control command for SRS Cancellation Indicator RNTI (CI-RNTI): For indicating PUSCH transmission cancellation Availability Indicator RNTI (AI-RNTI): For indicating availability of soft resources Power saving RNTI (PS-RNTI): For indicating commands for reducing power consumption in a DRX inactive interval The specified DCI formats described above may conform to the following definition in Table 4 below.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) there UE may assume no transmission is intended for the UE. |
| 2_2 | Transmission of TPC commands for PUCCH and PUSCH |
| 2_3 | Transmission of a group of TPC commands for SRS transmissions by one or more UEs |
| 2_4 | Notifying the PRB(s) and OFDM symbol(s) where UE cancels the corresponding UL transmission from the UE |
| 2_5 | Notifying the availability of soft resources |
| 2_6 | Notifying the power saving information outside DRX Active Time for one or more UEs |

In 5G, control resource set p and a search space of aggregation level L in control resource set s may be expressed as Equation below.

$$L \cdot \left\{ \left( Y_{p,n_{s,f}^{\mu}} + \left\lfloor \frac{m_{s,n_{CI}} \cdot N_{CCE,p}}{L \cdot M_{p,s,max}^{(L)}} \right\rfloor + n_{CI} \right) \bmod \left\lfloor N_{CCE,p}/L \right\rfloor \right\} + i$$

L: aggregation level $n_{CI}$: carrier index $N_{CCE,p}$: a total number of CCEs existing in control resource set p $n_{s,f}^{\mu}$: slot index $M_{p,s,max}^{(L)}$: the number of PDCCH candidates of aggregation level L $m_{s,n_{CI}}=0, \ldots, M_{p,s,max}^{(L)}-1$: PDCCH candidate index of aggregation level L $i=0, \ldots, L-1$ $$Y_{p,n_{s,f}^{\mu}} = \left( A_p \cdot Y_{p,n_{s,f}^{\mu}-1} \right) \bmod D, \; Y_{p,-1} = n_{RNTI} \neq 0,$$

$A_0=39827, A_1=39829, A_2=39839, D=65537$ $n_{RNTI}$: terminal identity

A value of $Y\_(p,n_{s,f}^{\mu})$ may correspond to 0 in the common search space.

In the terminal-specific search space, a value of $Y\_(p,n_{s,f}^{\mu})$ may correspond to a value that varies depending on a time index and the identity (ID configured for the terminal by the base station or C-RNTI) of the terminal.

Hereinafter, a time domain resource allocation method for a data channel in the 5G communication system will be described.

The base station may configure, for the terminal via higher layer signaling (e.g., RRC signaling), a table for time domain resource allocation information on a downlink data channel (physical downlink shared channel (PDSCH)) and an uplink data channel (physical uplink shared channel (PUSCH)). A table including up to 16 entries (maxNrofDL-Allocations=16) may be configured for the PDSCH, and a table including up to 16 entries (maxNrofUL-Allocations=16) may be configured for the PUSCH. The time domain resource allocation information may include, for example, a PDCCH-to-PDSCH slot timing (corresponding to a time interval in units of slots between a time point at which a PDCCH is received and a time point at which a PDSCH scheduled by the received PDCCH is transmitted, and denoted as K0), a PDCCH-to-PUSCH slot timing (corresponding to a time interval in units of slots between a time point at which a PDCCH is received and a time point at which a PUSCH scheduled by the received PDCCH is transmitted, and denoted as K2), information on a position and length of a start symbol in which the PDSCH or PUSCH is scheduled within a slot, a mapping type of the PDSCH or PUSCH, or the like. For example, the base station may notify the terminal of information described.

| PDSCH-TimeDomainResourceAllocationList information element |
|---|

```
PDSCH-TimeDomainResourceAllocationList     ::=     SEQUENCE
(SIZE(1..maxNrofDL-Allocations)) OF PDSCH-
TimeDomainResourceAllocation
PDSCH-TimeDomainResourceAllocation ::= SEQUENCE
   k0                                    INTEGER(0..32)
OPTIONAL, -- Need S
   (PDCCH-to-PDSCH timing, slot unit)
      mappingType              ENUMERATED {typeA, typeB},
   (PDSCH mapping type)
      startSymbolAndLength         INTEGER (0..127)
      (PDSCH start symbol and length)
```

-continued

| PDSCH-TimeDomainResourceAllocationList information element |
| --- |
| }<br>PUSCH-TimeDomainResourceAllocationList ::= SEQUENCE<br>(SIZE(1..maxNrofUL-Allocations)) OF PUSCH-<br>TimeDomainResourceAllocation<br>PUSCH-TimeDomainResourceAllocation ::= SEQUENCE {<br>   k2                INTEGER(0..32)    OPTIONAL, -- Need S<br>   (PDCCH-to-PUSCH timing, slot unit)<br>   mapping Type           ENUMERATED {typeA, typeB},<br>   (PUSCH mapping type)<br>   startSymbolAndLength       INTEGER (0..127)<br>   (PUSCH start symbol and length)<br>} |

The base station may notify of one among the entries in the tables for the time domain resource allocation information to the terminal via L1 signaling (e.g., DCI) (e.g., the entry may be indicated by a "time domain resource allocation" field in the DCI). The terminal may acquire the time domain resource allocation information for the PDSCH or PUSCH, based on the DCI received from the base station.

Hereinafter, a frequency domain resource allocation method for a data channel in the 5G communication system will be described.

In 5G, as a method for indicating frequency domain resource allocation information for a downlink data channel (physical downlink shared channel (PDSCH)) and an uplink data channel (physical uplink shared channel (PUSCH)), two types of resource allocation type 0 and resource allocation type 1 are supported.

Resource allocation type 0

The base station may notify the terminal of RB allocation information in a form of a bitmap for a resource block group (RBG). In this case, the RBG may include a set of consecutive virtual RBs (VRBs), and size P of the RBG may be determined based on a value configured as a higher layer parameter (rbg-Size) and a size value of a bandwidth part defined in Table 5 below (Nominal RBG size P).

TABLE 5

| Nominal RBG size P | | |
| --- | --- | --- |
| Bandwidth Part Size | Configuration 1 | Configuration 2 |
| 1-36 | 2 | 4 |
| 37-72 | 4 | 8 |
| 73-144 | 8 | 16 |
| 145-275 | 16 | 16 |

A total number ($N_{RBC}$) of RBG of bandwidth part i with size $$N_{BWP}^{size},$$

i may be defined as follows.

$$N_{RBG} = \left\lceil \left( N_{BWP,i}^{size} + \left( N_{BWP,i}^{start} \bmod P \right) \right) / P \right\rceil,$$

where
the size of the first RBG is $$RBG_0^{size} = P - N_{BWP,i}^{start} \bmod P,$$

the size of last RBG is $$RBG_{last}^{size} = \left( N_{BWP,i}^{start} + N_{BWP,i}^{size} \right) \bmod P \text{ if } \left( N_{BWP,i}^{start} + N_{BWP,i}^{size} \right) \bmod P > 0$$

and P otherwise,
the size of all other RBGs is P.

Each bit of a bitmap having a size of $N_{RBG}$ bits may correspond to each RBG. RBGs may be indexed in the order of increasing frequency, starting from the lowest frequency position of the bandwidth part. With respect to $N_{RBG}$ RBGs in the bandwidth part, RBG #0 to RBG #($N_{RBG}$-1) may be mapped from an MSB to an LSB of an RBG bitmap. In case that a specific bit value in the bitmap is 1, the terminal may determine that an RBG corresponding to the bit value has been allocated, and in case that the specific bit value in the bitmap is 0, the terminal may determine that an RBG corresponding to the bit value has not been allocated.

Resource Allocation Type 1

The base station may notify the terminal of RB allocation information, as information on start positions and lengths for consecutively allocated VRBs. Here, interleaving or non-interleaving may be additionally applied to the consecutively allocated VRBs. A resource allocation field of resource allocation type 1 may include a resource indication value (RIV), and the RIV may include a start point ($RB_{start}$) of a VRB and a length of consecutively allocated RBs ($L_{RBs}$). More specifically, the RIV in a bandwidth part having a size, of $$N_{BWP}^{size}$$

may be defined as follows.

if $(L_{RBs} - 1) \le \left\lfloor N_{BWP}^{size}/2 \right\rfloor$ then else $RIV = N_{BWP}^{size}(L_{RBs} - 1) + RB_{start}$ $$RIV = N_{BWP}^{size}\left( N_{BWP}^{size} - L_{RBs} + 1 \right) + \left( N_{BWP}^{size} - 1 - RB_{start} \right)$$

where $L_{RBs} \ge 1$ and shall not exceed $N_{BWP}^{size} - RB_{start}$.

A method for measuring and reporting a channel state in a 5G communication system will be described below in detail.

Channel state information (CSI) may include a channel quality information (CQI), a precoding matrix indicator (PMI), a CSI-RS resource indicator (CRI), an SS/PBCH block resource indicator (SSBRI), a layer indicator (LI), a rank indicator (RI), L1-reference signal received power (RSRP), and/or the like. The base station may control time and frequency resources for the above-described CSI measurement and reporting of the terminal.

For the above-described CSI measurement and reporting, the terminal may be configured with a configuration of N (≥1) pieces of CSI report setting information (CSI-Report-Config), M (≥1) pieces of RS transmission resource configuration information (CSI-ResourceConfig), and one or two pieces of trigger states list information (CSI-AperiodicTriggerStateList and CSI-SemiPersistentOnPUSCH-TriggerStateList), via higher-layer signaling.

With respect to the CSI report setting (CSI-ReportConfig), each report setting of CSI-ReportConfig, may be associated with one downlink (DL) bandwidth part identified by a higher-layer parameter bandwidth part identity (bwp-id) provided via CSI resource configuration (CSI-ResourceConfig) associated with the corresponding CSI report setting. Aperiodic, semi-persistent, and periodic types are supported for a time domain reporting operation regarding each reporting setting of CSI-ReportConfig, and may be configured by the base station for the terminal via a reportConfigType parameter configured from a higher-layer. A semi-persistent CSI reporting method supports "PUCCH-based semi-persistent (semi-PersistentOnPUCCH)" and "PUSCH-based semi-persistent (semi-PersistentOnPUSCH)" reporting methods. In a periodic or semi-persistent CSI reporting method, the terminal may be configured with a PUCCH or PUSCH resource for transmitting the CSI from the base station via higher layer signaling. A periodicity and a slot offset of the PUCCH or PUSCH resource for transmitting the CSI may be provided via numerology of an uplink (UL) bandwidth part configured to transmit CSI reporting. In an aperiodic CSI reporting method, the PUSCH resource for transmitting the CSI may be scheduled to the terminal via L1 signaling (DCI format 0_1 described above) by the base station.

With respect to the CSI resource setting (CSI-ResourceConfig), each CSI resource setting (CSI-Reperiodic or semi-persistent CSI resource setting, the number of CSI-RS resource sets may be limited to S=1, and a configured period and a slot offset may be provided via numerology of the downlink bandwidth part identified by bwp-id. The terminal may be configured with, by the base station, one or more CSI resource settings for channel or interference measurement via higher layer signaling, and for example, may include the following CSI resources.

CSI-IM resource for interference measurement

NZP CSI-RS resource for interference measurement

NZP CSI-RS resource for channel measurement

With respect to the CSI-RS resource sets associated with resource setting in which the higher-layer parameter resourceType is configured to be "aperiodic," "periodic," or "semi-persistent," a trigger state for the CSI report setting in which the reportType is configured to be "aperiodic" and a resource setting for channel or interference measurement for one or multiple component cells (CCs) may be configured through higher-layer parameter CSI-AperiodicTriggerStateeList.

The aperiodic CSI reporting of the terminal may use a PUSCH, the periodic CSI reporting may use a PUCCH, and the semi-persistent CSI reporting may use a PUSCH when triggered or activated by DCI and may use a PUCCH after being activated by an MAC control element (MAC CE). As described above, the CSI resource setting may also be configured to be aperiodic, periodic, or semi-persistent. Combinations between the CSI report setting and the CSI resource configuration may be supported based on Table 6 below.

TABLE 6

Triggering/Activation of CSI Reporting for the possible CSI-RS Configurations.

| CSI-RS Configuration | Periodic CSI Reporting | Semi-Persistent CSI Reporting | Aperiodic CSI Reporting |
|---|---|---|---|
| Periodic CSI-RS | No dynamic triggering/ activation | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5 2.1.5.1. |
| Semi-Persistent CSI-RS | Not Supported | For reporting on PUCCH, the UE receives an activation command [10, TS 38.321]; for reporting on PUSCH, the UE receives triggering on DCI | Triggered by DCI; additionally activation command [10, TS 38.321] possible as defined in Subclause 5.2.1.5.1. |
| Aperiodic CSI-RS | Not Supported | Not Supported | Triggered by DCI; additionally, activation command [10, TS 38.321] possible as defined in Subclause 5.2.1.5.1. | sourceConfig) may include S (($\geq$1) CSI resource sets (provided as a higher-layer parameter csi-RS-ResourceSetList). A CSI resource set list may include a non-zero power (NZP) CSI-RS resource set and a SS/PBCH block set or may include a CSI-interference measurement (CSI-IM) resource set. Each CSI resource setting may be positioned at a downlink (DL) bandwidth part identified by the higher-layer parameter bwp-id, and the CSI resource setting may be connected to a CSI report setting at the same downlink bandwidth part. A time domain operation of a CSI-RS resource in the CSI resource setting may be configured to be one of aperiodic, periodic, or semi-persistent scheme from a higher-layer parameter resourceType. With respect to the The aperiodic CSI reporting may be triggered by a "CSI request" field of aforementioned DCI format 0_1 corresponding to scheduling DCI for a PUSCH. The terminal may monitor a PDCCH, obtain DCI format 0_1, and obtain scheduling information for the PUSCH and a CSI request indicator. The CSI request indicator may be configured in $N_{TS}$ (=0, 1, 2, 3, 4, 5, or 6) bits and may be determined by a higher layer signaling reportTriggerSize. From among one or multiple aperiodic CSI reporting trigger states that may be configured via the higher-layer signaling (CSI-Aperiodic-TriggerStateList), one trigger state may be triggered by the CSI request indicator.

If all bits in a CSI request field are 0, this may indicate that CSI reporting is not requested.

If the number M of configured CSI trigger states in CSI-AperiodicTriggerStateLite is larger than 2NTs-1, M CSI trigger states may be mapped to 2NTs-1 trigger states according to a predefined mapping relation, and one trigger state among the 2NTs-1 trigger states may be indicated by a CSI request field.

If the number M of configured CSI trigger states in CSI-AperiodicTriggerStateLite is smaller than or equal to 2NTs-1, one of the M CSI trigger states may be indicated by a CSI request field.

Table 7 below shows an example of the relationship between a CSI request indicator and a CSI trigger state which may be indicated by a corresponding indicator.

TABLE 7

| CSI request field | CSI trigger state | CSI-ReportConfigId | CSI-ResourceConfigId |
|---|---|---|---|
| 00 | no CSI request | N/A | N/A |
| 01 | CSI trigger state#1 | CSI report#1<br>CSI report#2 | CSI resource#1<br>CSI resource#2 |
| 10 | CST trigger state#2 | CSI report#3 | CSI resource#3 |
| 11 | CSI trigger state#3 | CSI report#4 | CST resource#4 |

A terminal may perform measurement on a CSI resource in the CSI trigger state triggered by the CSI request field, and produce CSI (including at least one of CQI, PMI, CRI, SSBRI, LI, RI, or L1-RSRP described above) therefrom. The terminal may transmit the obtained CSI by using the PUSCH scheduled by the corresponding DCI format 0_1. If one bit corresponding to an uplink data indicator (UL-SCH indicator) in DCI format 0_1 indicates "1", the terminal may multiplex the acquired CSI and uplink data (UL-SCH) to a PUSCH resource scheduled by DCI format 0_1 so as to transmit the same. If one bit corresponding to the uplink data indicator (UL-SCH indicator) in DCI format 0_1 indicates "0", the terminal may map only CSI to the PUSCH resource scheduled by DCI format 01 without uplink data (UL-SCH) so as to transmit the same.

Figure 6E:
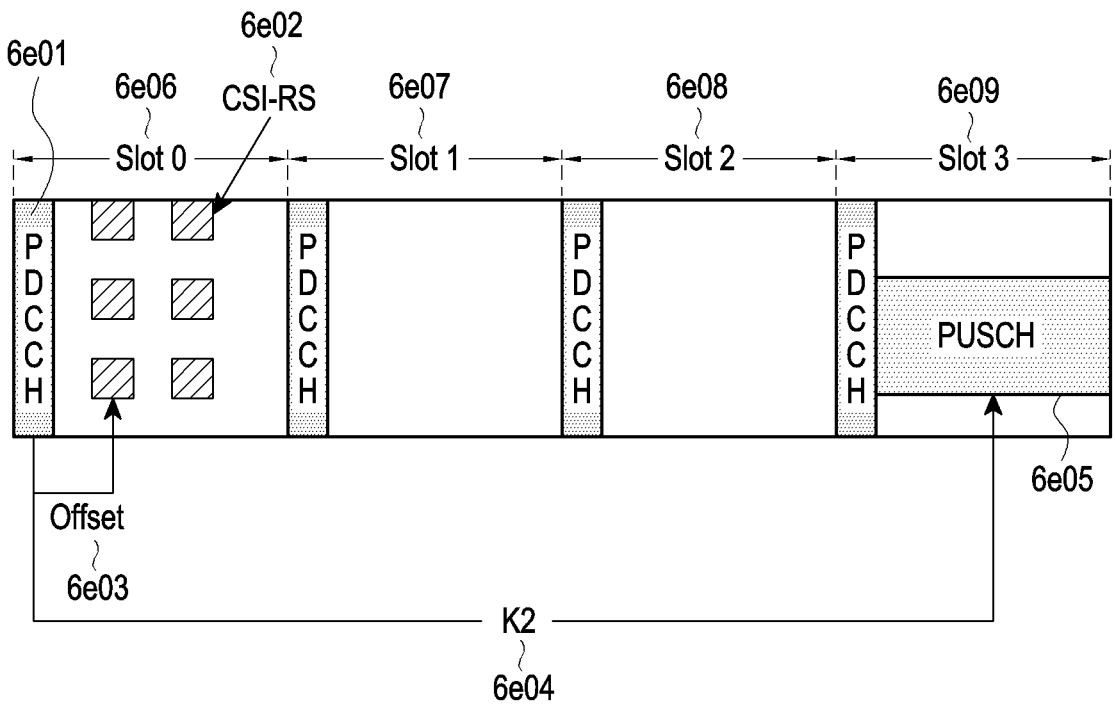
FIG. 6E illustrates an example of an aperiodic CSI reporting method according to an embodiment of the disclosure.
Figure 6F:
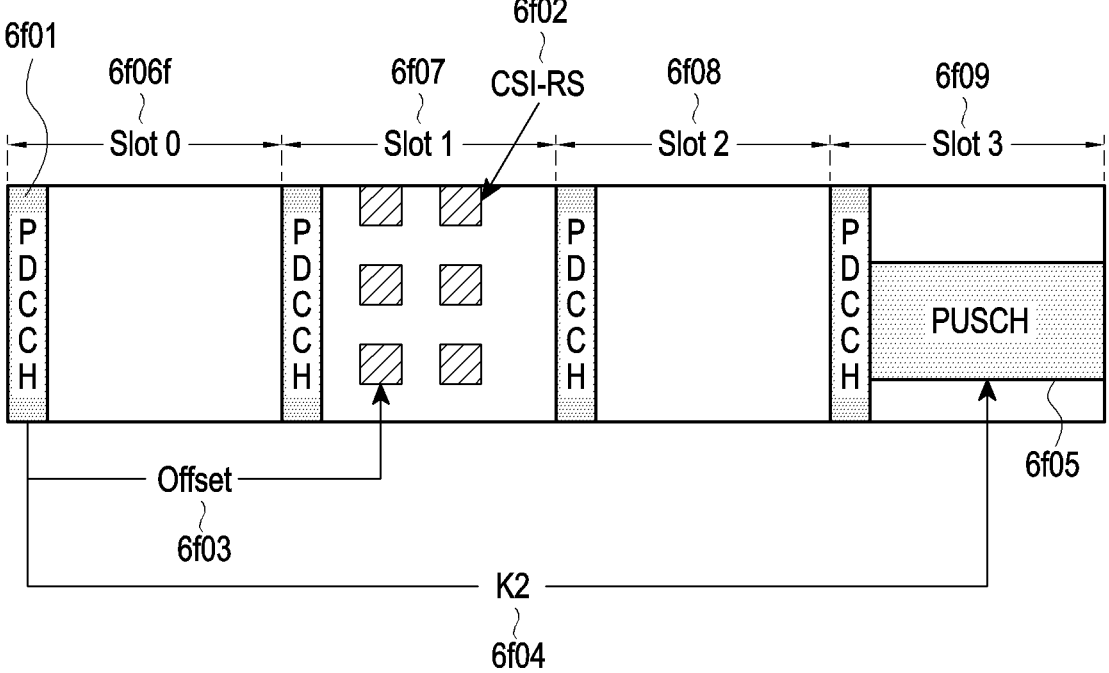
FIG. 6F illustrates another example of an aperiodic CSI reporting method according to an embodiment of the disclosure.

Each of FIG. 6E and FIG. 6F illustrates an example of an aperiodic CSI report method according to an embodiment of the disclosure.

In the example of FIG. 6E, a terminal may acquire DCI format 0_1 by monitoring a PDCCH 6e01, and may acquire scheduling information and CSI request information for a PUSCH 6e05 therefrom. The terminal may acquire resource information for a CSI-RS 6e02 to be measured from the received CSI request indicator. The terminal may determine a time point at which resources of the transmitted CSI-RS 6e02 need to be measured, based on a time point at which DCI format 0_1 is received and a parameter for an offset (aperiodicTriggeringOffset) within an CSI-RS resource set configuration (e.g., NZP-CSI-RS-ResourceSet). More specifically, the terminal may be configured with, by the base station via higher-layer signaling, an offset value X of the parameter (aperiodicTriggeringOffset) in the NZP-CSI-RS resource set configuration, and the configured offset value X may denote an offset between a slot where a CSI-RS resource is transmitted and a slot where DCI for triggering aperiodic CSI reporting is received. For example, a parameter value of the aperiodicTriggeringOffset and the offset value X may have a mapping relationship shown in Table 8 below.

TABLE 8

| aperiodicTriggeringOffset | Offset X |
|---|---|
| 0 | 0 slot |
| 1 | 1 slot |
| 2 | 2 slots |
| 3 | 3 slots |
| 4 | 4 slots |
| 5 | 16 slots |
| 6 | 24 slots |

The example of FIG. 6E shows an example in which aforementioned offset value 6e03 is configured to 0 (X=0). In this case, the terminal may receive the CSI-RS 6e02 in a slot (corresponding to slot #0 6e06 in FIG. 4) having received DCI format 0_1 for triggering the aperiodic CSI reporting and report CSI information measured based on the received CSI-RS to the base station through the PUSCH 6e05. The terminal may acquire scheduling information (information corresponding to each field of DCI format 0_1) for the PUSCH 6e05 for the CSI reporting from DCI format 0_1. For example, in DCI format 0_1, the terminal may acquire information on a slot for transmitting the PUSCH 6e05, from the time domain resource allocation information for the PUSCH 6e05 described above. In an example of FIG. 6, the terminal acquires 3 as a K2 value corresponding to a slot offset value for PDCCH-to-PUSCH, and accordingly, the PUSCH 6e05 may be transmitted in slot 3 6e09, which is spaced 3 slots apart from slot 0 6e06, that is, a time point at which the PUSCH 6e05 has received the PDCCH 6e01.

In the example of FIG. 6F, a terminal may acquire DCI format 0_1 by monitoring a PDCCH 6f01, and may acquire scheduling information and CSI request information for a PUSCH 6f05 therefrom. The terminal may acquire resource information for a CSI-RS 6f02 to be measured from the received CSI request indicator. The example of FIG. 6F shows an example in which offset value 6f03 for the aforementioned CSI-RS is configured to be 1 (X=1). In this case, the terminal may receive the CSI-RS 6f02 in a slot (corresponding to slot 0 6f06 of FIG. 6F) having received DCI format 0_1 that triggers aperiodic CSI reporting, and may report CSI information measured based on the received CSI-RS to the base station via the PUSCH 6f05 in slot 3 6e09, which is spaced 3 slots apart from slot 0 6F06, according to a K2 value 6f04 corresponding to a slot offset value for PDCCH-to-PUSCH.

Control information is transmitted within first N OFDM symbols in a subframe. Control channel transmission period N is generally N={1, 2, 3}. Therefore, the N value varies for each subframe according to an amount of control information to be transmitted in a current subframe. For example, the control information may include an indicator indicating the number of OFDM symbols over which the control information is transmitted, scheduling information of uplink or downlink data, hybrid automatic repeat request (HARQ) acknowledgment (ACK)/negative ACK (NACK) signal, and so on.

The wireless communication system adopts an HARQ scheme which retransmits corresponding data in a physical layer, if a decoding failure occurs in initial transmission. In the HARQ scheme, in case that a receiver fails to correctly decode the data, the receiver transmits information (e.g., NACK) notifying of the decoding failure to a transmitter so as to enable the transmitter to retransmit the data in the physical layer. The receiver improves data reception performance, by combining data, which is retransmitted by the transmitter, with the existing data for which decoding has failed. In addition, if the receiver correctly decodes the data, the receiver may transmit information (e.g., ACK) notifying of a success of decoding to the transmitter so as to enable the transmitter to transmit new data.

One of important things to provide a high-speed data service in the communication system is to support a scalable bandwidth. In some embodiments, the system transmission band of the LTE system may have various bandwidths, such as 20/15/10/5/3/1.4 MHz. Therefore, service providers may provide services by selecting a specific bandwidth from among the various bandwidths. A terminal (e.g., the terminal 120) may be of various types for supporting a bandwidth of 20 MHz at maximum and supporting only a bandwidth of 1.4 MHz at minimum.

In the wireless communication system, a base station (e.g., the base station 110) informs the terminal of scheduling information for downlink data or uplink data via downlink control information (DCI). An uplink refers to a radio link for a terminal to transmit data or a control signal to a base station, and a downlink refers to a radio link for a base station to transmit data or a control signal to a terminal. By defining various formats, the DCI is operated by applying a determined DCI format according to whether scheduling information is for uplink data (e.g., uplink (UL) grant) or scheduling information is for downlink data (downlink (DL) grant), whether the DCI is compact DCI having a small control information size, whether spatial multiplexing using multiple antennas is applied, whether the DCI is for power control, and the like. For example, DCI format 1 which is scheduling control information (e.g., DL grant) for downlink data may be configured to include the following control information.

Resource allocation type 0/1 flag: Resource allocation type 0/1 flag notifies whether a resource allocation scheme is type 0 or type 1. Type 0 flag allocates resources on a resource block group (RBG) basis by applying a bitmap scheme. In the LTE system, a basic scheduling unit is an RB expressed as time and frequency domain resources, and the RBG includes multiple RBs so as to become the basic scheduling unit for type 0. Type 1 flag allocates a specific RB in the RBG.

Resource block assignment: Resource block assignment notifies of an RB assigned for data transmission. A resource to be represented is determined according to a system bandwidth and a resource allocation scheme.

MCS: An MCS notifies of a modulation scheme used for data transmission and a size of a transport block to be transmitted.

HARQ process number: An HARQ process number notifies of a process number of HARQ.

New data indicator: A new data indicator notifies whether transmission is HARQ initial transmission or retransmission.

Redundancy version: A redundancy version notifies of a redundancy version (RV) of HARQ.

TPC command for PUCCH: A TPC command for a physical uplink control channel (PUCCH) notifies of a power control command for the PUCCH which is an uplink control channel.

DCI is channel-coded, modulated, and then transmitted via a physical downlink control channel (PDCCH) which is a downlink physical control channel.

In general, DCI is channel-coded independently for each terminal, and then configured and transmitted as an independent PDCCH. The PDCCH in the time domain is mapped and transmitted in a control channel transmission interval. A mapping position of the PDCCH in the frequency domain may be determined by an identifier (ID) of each terminal and dispersed across the entire system transmission bandwidth.

Downlink data is transmitted over a physical downlink shared channel (PDSCH) which is a physical channel for downlink data transmission. The PDSCH is transmitted after the control channel transmission interval, and scheduling information, such as a specific mapping position in the frequency domain and a modulation scheme, is notified by the DCI transmitted over the PDCCH.

The base station notifies the terminal of the modulation scheme applied to the PDSCH to be transmitted and a size (e.g., a transport block size (TBS)) of data to be transmitted, via a 5-bit MCS in the control information constituting the DCI. The TBS corresponds to a size of data to be transmitted by the base station before channel coding for error correction is applied.

In a cellular system, such as a 5G NR or LTE/LTE-A system, a base station (e.g., the base station 110) needs to transmit a reference signal in order to measure a downlink channel state. For example, in a case of an LTE-advanced (LTE-A) system of 3GPP, a terminal (e.g., the terminal 120) measures a channel state between a base station and the terminal itself by using a channel status information reference signal (CSI-RS) transmitted by the base station. In the channel state, several factors should be basically considered, which include an interference amount in a downlink. The interference amount in the downlink includes an interference signal and thermal noise generated by an antenna belonging to an adjacent base station, which may be used by the terminal to determine a channel situation of the downlink. For example, in case that a base station having one transmission antenna transmits a reference signal to a terminal having one reception antenna, the terminal determines an energy per symbol to interference density ratio (Es/Io) by determining an energy per symbol receivable in the downlink from the reference signal received from the base station and an interference amount concurrently received in the reception interval of the corresponding symbol. The determined Es/Io is notified to the base station so as to enable the base station to determine a data transmission rate at which transmission is to be performed to the terminal.

Figure 7:
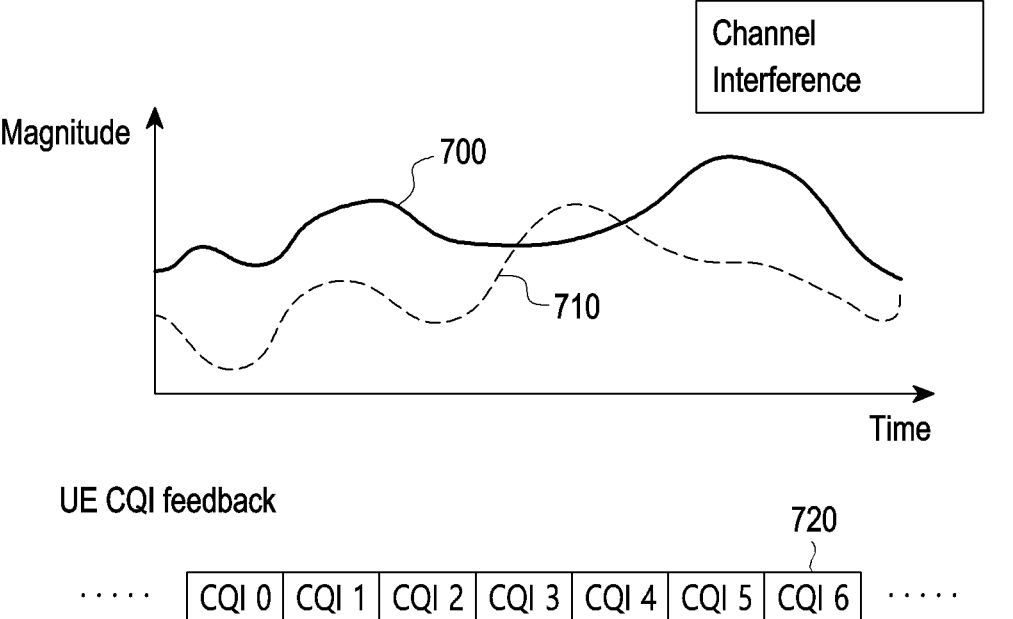
FIG. 7 illustrates an example of transmission of a channel quality indicator (CQI), which is one of channel state information of a terminal, according to signal energy and interference magnitude measured by the terminal according to an embodiment of the disclosure.

FIG. 7 illustrates an example of transmission of a channel quality indicator (CQI), which is one of channel state information of a terminal, according to signal energy and interference magnitude measured by the terminal according to an embodiment of the disclosure.

Referring to FIG. 7, a terminal (e.g., the terminal 120 of FIG. 1) may perform channel estimation by measuring a downlink reference signal, such as a CSI-RS, and may calculate, using a channel estimation result, an Es (a received signal energy) according to a wireless channel indicated with a solid line 700.

The terminal may calculate interference and noise intensities indicated with a dotted line 710 by using a separate resource for measurement of interference and noise or the downlink reference signal.

In the LTE, in order to measure interference and noise, the base station uses a CRS that is a downlink reference signal or configures an interference measurement resource for the terminal so as to assume a signal measured in a corresponding radio resource as the interference and the noise. By using the reception signal energy and the interference and noise intensities acquired by the method, the terminal determines a maximum data transmission rate receivable with a specific success rate calculated by the terminal in signal to interference and noise ratio, and notifies the same to the base station.

The base station, which has been notified with the maximum data transmission rate supportable by the terminal in the corresponding signal to interference and noise ratio, determines, using the maximum data transmission rate, an actual data transmission rate of the downlink signal to be transmitted to the terminal. In the LTE/NR standard, the maximum data transmission rate at which the terminal can receive data from the base station with a constant success rate may be referred to as CQI.

In general, since a wireless channel varies over time, the terminal may notify of a CQI to the base station periodically, or may notify a CQI each time when the base station requests the CQI from the terminal. A scheme in which the base station requests the CQI from the terminal may be performed via one or more methods of periodic and aperiodic methods.

In case that the terminal or the base station accurately measures CQI information, and accurately transmits or receives the CQI information, an MCS suitable for a channel environment is configured and efficient transmission or reception is thus possible while observing a target error probability configured in the wireless communication system, so that a more advanced wireless communication system requires defining a method for generating and applying CQI and MCS tables suitable for services supporting various reliability.

Hereinafter, the disclosure proposes a method for designing new CQI and modulation and coding (MCS) tables in order to determine a combination of modulation and coding techniques or to accurately report a channel quality according to target transmission or reception error probability required for efficient communication in 4G or 5G communication systems.

Furthermore, the disclosure proposes a method for adjusting a coding rate or spectral efficiency based on an existing CQI table and MCS table in order to determine a combination of modulation and coding techniques or to accurately report a channel quality according to target transmission or reception error probability required for efficient communication in 4G or 5G communication systems. The spectral efficiency may be expressed as, for example, a modulation order product rate (MPR).

In addition, the disclosure proposes a method and device for determining a combination of efficient modulation and coding techniques based on multiple MCS tables or reporting an accurate channel quality based on multiple CQI tables according to a target transmission or reception error probability required for efficient communication in the 4G or 5G communication system.

In case of 5G NR system, different CQI tables and MCS tables are applicable according to a maximum modulation order or target block error rate (BLER) configured in the system. Here, a BLER value may indicate an error occurrence probability after decoding of a received transport block is completed.

In some embodiments, the terminal may decode multiple transport blocks and then determine the BLER value via an appropriate calculation, but the terminal may determine the BLER value that is generally expected via a reception signal-to-noise ratio (SNR) or the like. In case that the terminal determines the BLER value that is generally expected via the reception SNR, etc., even if actual decoding is not performed, the terminal may measure the reception SNR, predict a decoding success probability based on the SNR, and report a CQI index to the base station.

<Description of CSI Reference Resource>

In order to report a CQI index to the base station, the terminal reports the CQI index based on a CSI reference resource, the following items may be examples of elements constituting the CSI reference resource, and items that are not described below may also be elements constituting the CSI reference resource.

First 2 OFDM symbols are used as control signals

The number of PDSCH and DMRS symbols is 12 symbols

A CP length and subcarrier spacing, such as a bandwidth part (BWP) configured for PDSCH reception A bandwidth size configured for CQI reporting RV (Redundancy Version) 0

REs allocated for an NZP CSI-RS and a ZP CSI-RS do not exist

A PDSCH symbol does not include a DMRS

A PRB bundling size in a 2-PRB unit

PDSCH transmission can be performed with up to 8 transmission layers

Table 9 or Table 11 may be used for CQI reporting for a case in which up to 64 QAM is available, Table 10 may be used when CQI reporting is required for a case in which up to 256 QAM is available.

Table 12 or Table 13 may be used for MCS determination or configuration for a case in which up to 64 QAM is available for a PDSCH or PUSCH, and Table 13 may be used when MCS determination or configuration is required for a case in which up to 256 QAM is available for PDSCH or PUSCH.

Table 15 or Table 16 may be used for MCS determination or configuration for a PUSCH for a case in which transform precoding and 64 QAM are applied for the PUSCH. (q values in Table 15 and Table 16 are values determined depending on whether pi/2-BPSK is indicated, wherein q=1 if tp-pi2BPSK is configured in higher layer signaling, otherwise q=2.)

The CQI tables of Table 9 to Table 14 may have values thereof configured via a 4-bit indicator and the CQI tables of Table 15 and Table 16 may have values therefor configured via a 5-bit indicator.

TABLE 9

| CQI index | modulation | code rate × 1024 | efficiency |
|---|---|---|---|
| 0 | | out of range | |
| 1 | QPSK | 78 | 0.1623 |
| 2 | OPSK | 120 | 0.2344 |
| 3 | QPSK | 193 | 0.3770 |
| 4 | QPSK | 308 | 0.6016 |
| 5 | QPSK | 449 | 0.8770 |
| 6 | OPSK | 602 | 1.1758 |
| 7 | 16QAM | 378 | 1.4766 |
| 8 | 16QAM | 490 | 1.0141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

TABLE 10

| CQI index | modulation | code rate × 1024 | efficiency |
|---|---|---|---|
| 0 | | out of range | |
| 1 | QPSK | 78 | 0.1523 |
| 2 | OPSK | 193 | 0.9770 |
| 3 | QPSK | 449 | 0.8770 |

TABLE 10-continued

| CQI index | modulation | code rate × 1024 | efficiency |
|---|---|---|---|
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 2.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

TABLE 11

| CQI index | modulation | code rate × 1024 | efficiency |
|---|---|---|---|
| 0 | | out of range | |
| 1 | QPSK | 30 | 0.0586 |
| 2 | QPSK | 50 | 0.0977 |
| 3 | OPSK | 78 | 0.1523 |
| 4 | QPSK | 120 | 0.2344 |
| 5 | QPSK | 199 | 0.3770 |
| 6 | QPSK | 308 | 0.6016 |
| 7 | QPSK | 449 | 0.8770 |
| 8 | QPSK | 602 | 1.1758 |
| 9 | 16QAM | 378 | 1.4766 |
| 10 | 16QAM | 490 | 1.9141 |
| 11 | 18QAM | 616 | 2.4063 |
| 12 | 64QAM | 468 | 2.7305 |
| 13 | 64QAM | 567 | 3.3223 |
| 14 | 64QAM | 666 | 3.9023 |
| 15 | 64QAM | 772 | 4.5234 |

TABLE 12

| MCS Index $I_{MCS}$ | Modulation Order Qm | Target code Rate R × [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

TABLE 13

| MCS Index $I_{MCS}$ | Modulation Order Qm | Target code Rate R × [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

TABLE 14

| MCS Index $I_{MCS}$ | Modulation Order Qm | Target code Rate R × [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |


TABLE 15

| MCS Index $I_{MCS}$ | Modulation Order Qm | Target code Rate R × [1024] | Spectral efficiency |
|---|---|---|---|
| 0 | q | 240/q | 0.2344 |
| 1 | q | 314/q | 0.3770 |
| 2 | 2 | 193 | 0.6016 |
| 3 | 2 | 251 | 0.8770 |
| 4 | 2 | 308 | 1.1758 |
| 5 | 2 | 379 | 1.4766 |
| 6 | 2 | 449 | 1.6953 |
| 7 | 2 | 526 | 1.9141 |
| 8 | 2 | 602 | 2.1602 |
| 9 | 2 | 679 | 2.4063 |
| 10 | 4 | 340 | 2.5703 |
| 11 | 4 | 378 | 2.7305 |
| 12 | 4 | 434 | 3.0293 |
| 13 | 4 | 490 | 3.3223 |
| 14 | 4 | 553 | 3.6094 |
| 15 | 4 | 616 | 3.9023 |
| 16 | 4 | 658 | 4.2129 |
| 17 | 6 | 466 | 4.5234 |
| 18 | 6 | 517 | 4.8164 |
| 19 | 6 | 567 | 5.1152 |
| 20 | 6 | 616 | 5.3320 |
| 21 | 6 | 666 | 5.5547 |
| 22 | 6 | 719 | 5.8906 |
| 23 | 6 | 772 | 6.2266 |
| 24 | 6 | 822 | 6.5703 |
| 25 | 6 | 873 | 6.9141 |
| 26 | 6 | 910 | 7.1602 |
| 27 | 6 | 948 | 7.4063 |
| 28 | q | reserved | |
| 29 | 2 | reserved | |
| 30 | 4 | reserved | |
| 31 | 6 | reserved | |

TABLE 16

| MCS Index $I_{MCS}$ | Modulation Order Qm | Target code Rate R × [1024] | Spectral efficiency |
|---|---|---|---|
| 0 | q | 60/q | 0.2344 |
| 1 | q | 80/q | 0.3770 |
| 2 | q | 100/q | 0.6016 |
| 3 | q | 128/q | 0.8770 |
| 4 | q | 156/q | 1.1758 |
| 5 | q | 198/q | 1.4766 |
| 6 | 2 | 120 | 1.6953 |
| 7 | 2 | 157 | 1.9141 |
| 8 | 2 | 193 | 2.1602 |
| 9 | 2 | 251 | 2.4063 |
| 10 | 2 | 308 | 2.5703 |
| 11 | 2 | 379 | 2.7305 |
| 12 | 2 | 449 | 3.0293 |
| 13 | 2 | 526 | 3.3223 |
| 14 | 2 | 602 | 3.6094 |
| 15 | 2 | 679 | 3.9023 |
| 16 | 4 | 378 | 4.2129 |
| 17 | 4 | 434 | 4.5234 |
| 18 | 4 | 490 | 4.8164 |
| 19 | 4 | 553 | 5.1152 |
| 20 | 4 | 616 | 5.3320 |
| 21 | 4 | 658 | 5.5547 |
| 22 | 4 | 699 | 5.8906 |
| 23 | 4 | 772 | 6.2266 |
| 24 | 6 | 567 | 6.5703 |
| 25 | 6 | 616 | 6.9141 |
| 26 | 6 | 666 | 7.1602 |
| 27 | 6 | 772 | 7.4063 |
| 28 | q | reserved | |
| 29 | 2 | reserved | |
| 30 | 4 | reserved | |
| 31 | 6 | reserved | |

With respect to determining of the CQI index is described in more detail, the terminal derives or determines a highest CQI index that satisfies the following conditions for a CQI value reported in uplink slot n:

[CQI determination-1]

A single PDSCH transport block having a combination of a modulation order (or technique), a target code rate, and a TBS, which corresponds to the CQI index, should be received such that the following transport block error probability is not exceeded:

If CSI-higher layer parameter cqi-Table included in CSI-ReportConfig configures (or indicates) Table 9 or Table 10, a target transport block error probability is 0.1

If CSI-higher layer parameter cqi-Table included in CSI-ReportConfig configures (or indicates) Table 11, a target transport block error probability is 0.00001

The condition for the transport block error probability may mean an approximated or substantial value and thus a satisfying BLER value in an actual communication system may have a value smaller or larger than a value of 0.1 or 0.00001 defined in the standard at least temporarily. However, the system is operated so that an average transport block error probability is close or approximate to the values of 0.1 and 0.00001 defined above. Here, the close value may refer to a value within 10% to 50% of the configured target BLER value, or may refer to a value in another range configured in the system.

According to an embodiment, in order to derive an appropriate target BLER value determined for CQI index reporting, a resource use rate, such as the number of RE resources, terminal implementation capability for accurate CQI index estimation, a level of an SNR difference for each target BLER when multiple target BLERs exist and whether different CQI index reporting is possible, which is caused by the SNR difference, for each target BLER in various wireless communication environments, a terminal implementation complexity when the number of multiple target BLER types increases, and the like should be considered.

In case that multiple target BLERs exist, the terminal reports a CQI index estimated based on at least one target BLER, and the target BLER value may be configured by a higher signal or signal L1.

In the current 5G NR system, 0.1 and 0.00001 are considered as target BLER values, wherein the latter case may be configured in consideration of a service requiring high reliability or low latency, for example, a service scenario such as URLLC. However, as LTE or 5G NR systems spread, more diverse services for different purposes are required. These various services may require various system conditions in consideration of not only reliability or low-latency characteristics, but also a location where a service is supported, average data traffic, and a terminal type according to each service.

However, it may be difficult to efficiently support various services with only two BLER conditions that differ by more than 10000 times, such as 0.1 and 0.00001, as at present. Accordingly, the disclosure proposes CQI tables and MCS tables for effectively supporting a target BLER other than the target BLER having values of 0.1 and 0.00001 as at present.

In the current 5G NR, in case that a maximum modulation order is configured to be 64-QAM to be applied to a system, the CQI table of Table 9 is used for a case that a target BLER is 0.1 for CQI reporting and the CQI table of Table 11 is used for a case that a target BLER is 0.00001.

The disclosure proposes a method for determining a new CQI table in case that a separate CQI table is used with respect to a target BLER between 0.1 to 0.00001.

It may be described on the assumption that a target BLER is configured to have a value of $10^{-P}$, P=1, 2, 3, 4, 5, . . . for convenience of description but the disclosure is not limited thereto and a target BLER may be configured to have a value close to $10^{-P}$, such as 0.2, 0.002, 0.00002, 0.09, 0.009, and 0.000009 depending of a system.

Hereinafter, an embodiment proposes a method for designing a CQI table or using the designed CQI table in order to transmit channel state information (CSI) by a device including a transceiver and at least one processor coupled with the transceiver in the wireless communication system according to the disclosure.

In particular, an embodiment proposes a method for designing a CQI table or using the designed CQI table in case that supported services or maximum modulation orders are different from each other. In addition, an embodiment proposes a method for determining, or configuring an appropriate MCS by using a designed MCS table or an appropriate MCS table corresponding to the CQI table.

For reference, in order to maintain signaling overhead at an LTE level, the CQI and MCS indicators may be maintained as 4 bits and 5 bits, respectively, as before, and CQI index 0 may be also defined as "out of range".

Embodiment 1 and embodiment 4 of the disclosure propose a method for designing (or determining) a CQI table for a target block error rate (BLER) and embodiment 5 proposes a method for using a designed (or determined) CQI table.

Embodiment 1 of the disclosure proposes a method for generating (or designing) a new third CQI table by using a first CQI table and a second CQI table which have the same maximum modulation scheme (or order) and different target BLERs.

Embodiment 2 of the disclosure proposes a method for generating (or designing) a new third CQI table in consideration of spectral efficiency of each of the first CQI table and the second CQI table.

Embodiment 3 of the disclosure proposes a method for using (CQI index determining or CSI reporting) the CQI tables designed in embodiment 1 and embodiment 2 in a terminal or a base station.

Embodiment 4 and embodiment 5 of the disclosure propose a method for designing (or determining) an MCS table according to a target BLER and embodiment 6 proposes a method for using a designed (or determined) MCS table.

Embodiment 4 of the disclosure proposes a method for generating (or designing) a new third MCS table by using a first MCS table and a second MCS table which have the same maximum modulation scheme (or order) and different target BLERs.

Embodiment 5 of the disclosure proposes a method for generating (or designing) a new MCS table in case that a maximum modulation order is 10 (that is, in case that 1024 QAM modulation scheme is used) in a 5G NR.

Embodiment 6 of the disclosure proposes a method for using (used for determining MCS index) the MCS tables designed in embodiment 4 and embodiment 5 in a terminal or a base station.

Embodiment 7 to embodiment 9 of the disclosure propose an operation method of a terminal or a base station in case that support of 1024 QAM is allowed in a 5G NR system.

Embodiment 7 of the disclosure proposes a method for processing limited buffer rate matching (LBRM) in case that support of 1024 QAM is allowed in a 5G NR system.

Embodiment 8 of the disclosure proposes a method for receiving a phase tracking reference signal (PT-RS) in case that support of 1024 QAM is allowed in a 5G NR system.

Embodiment 9 of the disclosure proposes a method for determining a processing time in case that support of 1024 QAM is allowed in a 5G or NR system.

Hereinafter, descriptions of respective specific embodiments are as follows.

Embodiment 1

Typically, indexes included in a CQI table or an MCS table are determined uniformly to have an operation signal-to-noise ratio (SNR) interval supporting a target BLER of a system. In general, SNR-based channel capacity is influenced by an error probability or BLER of a reception bit allowed by the system.

For example, in case that channel coding having code rate R is applied, if channel capacity based an assumption of error free is $C_{SNR}(R)$, channel capacity $C_{SNR,b}(R)$ of a case where a target bit error rate is Pb may have a relationship in which $C_{SNR,b}(R) < C_{SNR}(R)$. This is because, in a system for a strong condition where the system is error free, an SNR level required under a condition allowing a certain degree of a bit error rate or BLER is low.

Accordingly, since an operation SNR is also variable according to the allowable system target bit error rate or BLER, an optimized modulation order and code rate combination or a target spectral efficiency value may be changed according to the target bit error rate.

Typically, a bit error rate against an SNR increase decreases exponentially, and thus in case of designing or configuring an optimal CQI table or MCS table, it is desirable to design the same in consideration of a log-scale for the target BLER or bit error rate.

For example, since a target BLER of 0.001 corresponds to an intermediate value between a target BLER of 0.1 and a target BLER of 0.00001 in log-scale, a CQI table may be generated with respect to the target BLER of 0.001 by using the CQI table of Table 9 and the CQI table of Table 11. For reference, in some cases, the spectral efficiency may be expressed simply as a modulation order product rate (MPR), that is, R*Qm indicating a product of a modulation order Qm and a code rate R.

Table 9 and Table 11 are obtained by considering a case where a maximum modulation order is 6, that is, 64 QAM, and CQI tables used for cases where BLERs are 0.1 and 0.00001, respectively. Typically, a CQI table or an MCS table are designed in consideration of an almost equal operation SNR and target BLER. Therefore, in case that a CQI table is newly generated based on two CQI tables having target BLERs of 0.1 and 0.00001, a combination of modulation and code rate of the existing table or spectral efficiency corresponding thereto may be maximally reused.

First, it is assumed that there are a first CQI table and a second CQI table having the same modulation scheme or order and different target BLERs of $10^{-P1}$ and $10^{-P2}$. A new third CQI table having a target BLER of $10^{-P}$ and the same maximum modulation order may be generated to satisfy at least some or all of conditions below. (Assumed that P1<P<P2)

In addition, it is assumed that spectral efficiency corresponding to a modulation and code rate combination (modulation and code rate included in the table) with index I (I=1, 2, . . . ) of the first CQI table is $A_1$, spectral efficiency corresponding to a modulation and code rate combination with index I of the second CQI table is $B_1$, and spectral efficiency corresponding to a modulation and code rate combination with index I of the third CQI table is $C_1$.

Condition 1) The spectral efficiency $C_1$ corresponding to the modulation and code rate combination with index I of the third CQI table is smaller than or equal to the spectral efficiency $A_1$ corresponding to the modulation and coded rate combination corresponding to index I of the first CQI table ($C_1 \leq A_1$), and the spectral efficiency $C_1$ corresponding to the modulation and code rate combination with index I of the third CQI table is larger than or equal to the spectral efficiency $B_1$ corresponding to the modulation and coded rate combination corresponding to index I of the second CQI table ($B_1 \leq C_1$).

Condition 2) the same modulation and code rate combinations commonly included in the first CQI table and the second CQI table (that is, the modulation and code rate combinations commonly included in the first CQI table and the second CQI table) are all included in the third CQI table. Hereinafter, a set including all of the same modulation and coding rate combinations is referred to as a set S for convenience.

Condition 3) $P=a*(P1+P2)$ and the number of the same combinations in condition 2) is X, an index for the combination with the lowest spectral efficiency among the same combinations commonly included is determined as $g_{CQI}$ (a)−floor(X/2) or $g_{CQI}$ (a)−ceil (X/2), and indexes are sequentially determined for the same combination included in common.

Here, floor(x) indicates a largest integer less than or equal to a real number x, ceil(x) indicates a smallest integer greater than or equal to the real number x, and $g_{CQI}$(a) indicates an integer determined according to a. Also, a indicates an appropriately selectable number according to the target BLER, and it may be expressed that, in case that P1=1 and P2=5, a=1/3 to configure P=2, a=1/2 to configure P=3, and a=2/3 to configure P=4.

For convenience, the disclosure is described on the assumption that $g_{CQI}$(1/3)=5 (or 4), $g_{CQI}$(1/2)=8, $g_{CQI}$(2/3)=10 (or 11 or 12) but the values may be differently configured. However, in case of satisfying the condition that $g_{CQI}$(a)−floor(X/2)<1 or $g_{CQI}$(a)−ceil(X/2)<1 or $g_{CQI}$(a)−floor(X/2)+X>15 or $g_{CQI}$(a)−ceil(X/2)+X>15, modulation and code rate combinations corresponding to less than index 1 or greater than index 15 are excluded from the set S.

Condition 4) The index allocated to a combination with a lowest spectral efficiency among the modulation and code rate combinations included in the set S (that is, all modulation and code rate combinations commonly included in the first CQI table and the second CQI table) may be referred to as J. Here, among modulation and code rate combinations of the second CQI table, (J-1) combinations with spectral efficiency higher than those of modulation and code rate combinations not included in set S while lower than those of modulation and code rate combinations included in set S are allocated to indexes from 1 to (J-1).

Condition 5) Assuming that an index allocated to a combination with the highest spectral efficiency among the same combinations included in the set S is K, among modulation and code rate combinations of the first CQI table, (15-K) combinations with spectral efficiency higher than those of modulation and code rate combinations included in set S and having a lower spectral efficiency among modulation and code rate combinations not included in set S are sequentially allocated to indexes from (K+1) to 15.

As a specific embodiment in consideration of the aforementioned conditions, a method for generating a new CQI table having target BLER of $10^{-3}$ by using Table 9 and Table 11 will be described as follows. First, modulation and code rate combinations commonly included in Table 9 and Table 11 is determined according to condition 2). It may be identified that there are a total of 13 common combinations, such as (QPSK, 78/1024), (QPSK, 120/1024), (QPSK, 193/1024), (QPSK, 308/1024), (QPSK, 449/1024), (QPSK, 602/1024), (16QAM, 378/1024), (16QAM, 490/1024), (16QAM, 616/1024), (64QAM, 466/1024), (64QAM, 567/1024), (64QAM, 666/1024), and (64QAM, 772/1024). (That is, X=13)

a=1/2 according to Condition 3), and thus in case that $g_{CQI}$(1/2)=8, $g_{CQI}$(a)−floor(X/2)=8−6=2. Accordingly, the 13 combinations are sequentially allocated from indexes 2 to 14. Next, according to Condition 4), (QPSK, 50/1024) combination of Table 11 is allocated to index 1, and (64QAM, 873/1024) of [Table 9] is allocated to index 15. The generated CQI tables are as shown in Table 17.

TABLE 17

| CQI index | modulation | code rate × 1024 | efficiency |
|---|---|---|---|
| 0 | | out of range | |
| 1 | QPSK | 50 | 0.0977 |
| 2 | QPSK | 78 | 0.1523 |
| 3 | QPSK | 120 | 0.2344 |
| 4 | QPSK | 193 | 0.3770 |
| 5 | QPSK | 308 | 0.6016 |
| 6 | QPSK | 449 | 0.8770 |
| 7 | QPSK | 602 | 1.1758 |
| 8 | 16QAM | 378 | 1.4766 |
| 9 | 16QAM | 490 | 1.9141 |
| 10 | 16QAM | 616 | 2.4063 |
| 11 | 64QAM | 466 | 2.7305 |
| 12 | 64QAM | 567 | 3.3223 |
| 13 | 64QAM | 666 | 3.9023 |
| 14 | 64QAM | 772 | 4.5234 |
| 15 | 64QAM | 873 | 5.1152 |

Embodiment 2

In Embodiment 1 of the disclosure, in case that (P1=1, P2=5, P=2) or (P1=1, P2=5, P=4), a case where $g_{CQI}$(a)−floor(X/2)<2 or $g_{CQI}$(a)−ceil(X/2)<2 may occur, and thus the disclosure proposes a method for generating a new third CQI table according to Embodiment 2.

First, it is assumed that spectral efficiencies for index J (J=1, 2, . . . ) of two given CQI tables, the first CQI table and the second CQI table, are $A_J$, and $B_J$, respectively. In case of assuming that spectral efficiency for index J of the new third CQI table is $C_J$, $C_J$ may be indicated as Table 18 and the following by using a function $F(A_J, Bs)$ which defines new values based on each of $A_J$, and $B_J$:

$C_J=F(A_J, B_J)$. Wherein, the function $F(A, B)$ may be defined in various forms, for example, as a function considering a target BLER, such as $F(A, B)=(1-a)*A+a*B$. (Here, a indicates a value defined in Condition 3 of Embodiment 1.)

In addition, in general, in case that the same modulation scheme or order for the same index is obtained, $C_1$ may be defined according to the coding rate rather than the spectral efficiency. $C_1=F(A_1, B_J)$ values may be expressed with other close values.

For example, if $C_3=0.1934$, $1024*R=1024*0.1934/2-99$, and to express the value in a simple way, such as $1024*R=100$, the value may be changed to a close value such as $C_1=0.1953$. In general, a value close to a given value may mean values within a range of about 10 to 20%.

TABLE 18

| CQI index | modulation | code rate × 1024 | efficiency |
|---|---|---|---|
| 0 | | Out of range | |
| 1 | QPSK | 1024 × F(A1, B1)/2 | F(A1, B1) |
| 2 | QPSK | 1024 × F(A2, B2)/2 | F(A2, B2) |
| 3 | QPSK | 1024 × F(A3, B3)/2 | F(A3, B3) |
| 4 | QPSK | 1024 × F(A4, B4)/2 | F(A4, B4) |
| 5 | QPSK | 1024 × F(A5, B5)/2 | F(A5, B5) |
| 6 | QPSK | 1024 × F(A6, B6)/2 | F(A6, B6) |
| 7 | QPSK | 1024 × F(A7, B7)/2 | F(A7, B7) |
| 8 | 16QAM | 1024 × F(A8, B8)/4 | F(A8, B8) |
| 9 | 16QAM | 1024 × F(A9, B9)/4 | F(A9, B9) |
| 10 | 16QAM | 1024 × F(A10, B10)/4 | F(A10, B10) |
| | (or 64QAM) | (or 1024 × F(A10, B10)/6) | |
| 11 | 64QAM | 1024 × (F(A11, B11)/6 | F(A11, B11) |
| 12 | 64QAM | 1024 × (F(A12, B12)/6 | F(A12, B12) |
| 13 | 64QAM | 1024 × (F(A13, B13)/6 | F(A13, B13) |
| 14 | 64QAM | 1024 × (F(A14, B14)/6 | F(A14, B14) |
| 15 | 64QAM | 1024 × (F(A15, B15)/6 | F(A15, B15) |

By using a method for generating Table 18 based on Table 9 and Table 11, a new CQI table having a target BLER=$10^{-2}$, $10^{-3}$, and $10^{-4}$ may be generated. That is, CQI tables such as Table 19, Table 20, and Table 21 may be generated with respect to each case of a target BLER=$10^{-2}$, $10^{-3}$, and $10^{-4}$.

TABLE 19

| CQI index | modulation | code rate × 1024 | efficiency |
|---|---|---|---|
| 0 | | out of range | |
| 1 | QPSK | 62 | 0.1211 |
| 2 | QPSK | 97 | 0.1895 |
| 3 | QPSK | 155 | 0.3027 |
| 4 | QPSK | 245 | 0.4785 |
| 5 | QPSK | 364 | 0.7109 |
| 6 | QPSK | 504 | 0.9844 |
| 7 | QPSK | 654 | 1.2773 |
| 8 | 16QAM | 427 | 1.6680 |
| 9 | 16QAM | 587 | 2.0977 |
| 10 | 18QAM | 629 | 2.4570 |
| 11 | 64QAM | 515 | 3.0176 |
| 12 | 64QAM | 599 | 3.5098 |
| 13 | 64QAM | 704 | 4.1250 |
| 14 | 64QAM | 804 | 4.7109 |
| 15 | 64QAM | 889 | 5.2090 |

TABLE 20

| CQI index | modulation | code rate × 1024 | efficiency |
|---|---|---|---|
| 0 | | out of range | |
| 1 | QPSK | 54 | 0.1055 |
| 2 | QPSK | 85 | 0.1660 |
| 3 | QPSK | 136 | 0.2656 |
| 4 | QPSK | 214 | 0.4180 |
| 5 | QPSK | 321 | 0.6270 |
| 6 | QPSK | 455 | 0.8887 |
| 7 | QPSK | 602 | 1.1758 |
| 8 | 16QAM | 396 | 1.5469 |
| 9 | 16QAM | 497 | 1.9414 |
| 10 | 16QAM | 595 | 2.3242 |
| 11 | 64QAM | 489 | 2.8652 |
| 12 | 64QAM | 566 | 3.3164 |
| 13 | 64QAM | 670 | 3.9258 |
| 14 | 64QAM | 770 | 4.5117 |
| 15 | 64QAM | 856 | 5.0156 |

TABLE 21

| CQI index | modulation | code rate × 1024 | efficiency |
|---|---|---|---|
| 0 | | out of range | |
| 1 | QPSK | 46 | 0.08984375 |

TABLE 21-continued

| CQI index | modulation | code rate × 1024 | efficiency |
|---|---|---|---|
| 2 | QPSK | 73 | 0.142578125 |
| 3 | QPSK | 116 | 0.2265625 |
| 4 | QPSK | 182 | 0.35546875 |
| 5 | QPSK | 278 | 0.54296875 |
| 6 | QPSK | 406 | 0.79296875 |
| 7 | QPSK | 551 | 1.076171875 |
| 8 | 16QAM | 364 | 1.421875 |
| 9 | 16QAM | 457 | 1.78515625 |
| 10 | 16QAM | 560 | 2.1875 |
| 11 | 64QAM | 463 | 2.712890625 |
| 12 | 64QAM | 533 | 3.123046875 |
| 13 | 64QAM | 653 | 3.720703125 |
| 14 | 64QAM | 735 | 4.306540625 |
| 15 | 64QAM | 831 | 4.869140625 |

An example of a new CQI table having a target BLER=$10^{-2}$ generated by using the method of Table 18 based on Table 9 and Table 17 is as Table 22 below. In addition, an example of a new CQI table having a target BLER=$10^{-4}$ generated by using the method of Table 18 based on Table 11 and Table 17 is as Table 23] below.

Here, in P=a*(P1+P2), it means that P1=1, P2=3, a=1/2 in case of using Table 9 and Table 17, and it means that P1=3, P2=5, a=1/2 in case of using Table 11 and Table 17.

TABLE 22

| CQI index | modulation | code rate × 1024 | efficiency |
|---|---|---|---|
| 0 | | out of range | |
| 1 | QPSK | 64 | 0.1250 |
| 2 | OPSK | 99 | 0.1984 |
| 3 | QPSK | 157 | 0.3066 |
| 4 | QPSK | 251 | 0.4902 |
| 5 | OPSK | 879 | 0.7402 |
| 6 | QPSK | 526 | 1.0273 |
| 7 | 16QAM | 340 | 1.3281 |
| | (or QPSK) | (or 679) | (or 1.3262) |
| 8 | 16QAM | 484 | 1.6958 |
| 9 | 16QAM | 563 | 2.1602 |
| 10 | 64QAM | 438 | 2.5664 |
| | (or 16QAM) | (or 658) | (or 2.5708) |
| 11 | 64QAM | 517 | 3.0298 |
| 12 | 64QAM | 616 | 3.6094 |
| 13 | 64QAM | 719 | 4.2129 |
| 14 | 64QAM | 822 | 4.8164 |
| 15 | 64QAM | 910 | 5.8380 |

TABLE 23

| CQI index | modulation | code rate × 1024 | efficiency |
|---|---|---|---|
| 0 | | out of range | |
| 1 | QPSK | 40 | 0.0781 |
| 2 | QPSK | 64 | 0.1250 |
| 3 | OPSK | 99 | 0.1934 |
| 4 | QPSK | 157 | 0.3066 |
| 5 | QPSK | 251 | 0.4902 |
| 6 | QPSK | 379 | 0.7402 |
| 7 | QPSK | 526 | 1.0273 |
| 8 | 16QAM | 340 | 1.3281 |
| | (or QPSK) | (or 679) | (or 1.3262) |
| 9 | 16QAM | 434 | 1 6953 |
| 10 | 16QAM | 558 | 2.1602 |
| 11 | 64QAM | 438 | 2.5664 |
| | (or 16QAM) | (or 658) | (or 2.5708) |
| 12 | 64QAM | 517 | 6.0298 |
| 13 | 64QAM | 616 | 3 6094 |
| 14 | 64QAM | 719 | 4.2129 |
| 15 | 64QAM | 822 | 4.8164 |

In the above, there is proposed the method for determining the third CQI table by newly determining the spectral efficiency in consideration of the spectral efficiency and the target BLER for each index in the two different first CQI table and the second CQI table, and the above Table 18 to Table 23 CQI tables may be determined according to the described method.

Furthermore, the code rate or spectral efficiency of each CQI table may be determined by value a determined according to a target BLER value. In other words, the code rate or spectral efficiency for each CQI index J of the third CQI table may have a value of $(1-a)*R_1(J)+a*R_2(J)$ or $(1-a)*SE_1(J)+a*SE_2(J)$, or a value close thereto, with respect to each code rate $R_1(J)$ or $R_2(J)$ or spectral efficiency of $SE_1(J)$ or $SE_2(J)$ corresponding to the first CQI table and the second CQI table.

Embodiment 3

The method for designing or determining a CQI table is proposed in Embodiment 1 and Embodiment 2 above. The CQI tables designed or determined in Embodiment 1 and Embodiment 2 above may be stored in a base station or a terminal to be used for CQI index determination or CSI reporting.

For example, the CQI tables designed with respect to the target BLER=0.001, such as Table 17 in addition to Table 9, Table 10, and Table 11 may be used as follows so as to be used for CQI index determination or CSI reporting.

[CQI Determination-2]

> A single PDSCH transport block having a combination of a modulation order (or technique), a target code rate, and a TBS, which corresponds to the CQI index, should be received such that the following transport block error probability is not exceeded:
>
> If CSI-higher layer parameter cqi-Table included in CSI-ReportConfig configures (or indicates) Table 9 or Table 10, a target transport block error probability is 0.1
>
> If CSI-higher layer parameter cqi-Table included in CSI-ReportConfig configures (or indicates) Table 17] a target transport block error probability is 0.001
>
> If CSI-higher layer parameter cqi-Table included in CSI-ReportConfig configures (or indicates) Table 11, a target transport block error probability is 0.00001

The above example shows the case of four CQI tables by adding the case of target BLER=0.001, but in general, in case that there are more target BLERs and considering more diverse service scenarios, some of Table 19 to Table 23 may be additionally used.

Embodiment 1 and Embodiment 2 above illustrated a method for generating a new CQI table or characteristics of the generated CQI table and a method for using the same. Hereinafter, a method for designing an MCS table according to a target BLER will be described.

Embodiment 4

Typically, an error rate against an SNR increase decreases exponentially, and thus in case of designing or configuring optimal MCS tables, it is desirable to design the same in consideration of a log-scale for the target BLER or bit error rate.

For example, since a target BLER of 0.001 corresponds to an intermediate value between a target BLER of 0.1 and a target BLER of 0.00001 in log-scale, an MCS table may be generated with respect to the target BLER of 0.001 by appropriately using the MCS table of Table 12 to the MCS table of Table 16.

It is assumed that there are a first MCS table and a second MCS table having the same modulation scheme or order (modulation order in the tables) and different target BLERs of $10^{-P1}$ and $10^{-P2}$. A new third MCS table having a target BLER of $10^{-P}$ and the same maximum modulation order may be generated to satisfy at least some or all of conditions below. (Assumed that P1<P<P2)

Condition 1) the spectral efficiency corresponding to the modulation and code rate combination (a modulation order and target code rate combination in the tables) with index I of the third MCS table is smaller than or equal to the spectral efficiency corresponding to the modulation and coded rate combination corresponding to index I of the first MCS table, and the spectral efficiency corresponding to the modulation and code rate combination with index I of the third MCS table is larger than or equal to the spectral efficiency corresponding to the modulation and coded rate combination corresponding to index I of the second MCS table (BI≤CI).

Condition 2-1) The same modulation and code rate combinations commonly included in the first MCS table and the second MCS table (that is, the modulation order and target code rate combinations commonly included in the first MCS table and the second MCS table) are all included in the third MCS table. Hereinafter, a set including all of the same modulation and coding rate combinations is referred to as a set S1 for convenience.

Condition 2-2) It is assumed that a combination having a lowest spectral efficiency among the same modulation and code rate combinations commonly included in the first MCS table and the second MCS table is C1 and a combination having a highest spectral efficiency is C2, a modulation and code rate combination having spectral efficiency higher than or equal to C1 and lower than or equal to C2 in the first MCS table and the second MCS table is included in the third MCS table. Hereinafter, all of the same modulation and coding rate combinations are referred to as a set S2 for convenience.

Condition 3) in case that P=a*(P1+P2) and the number of the same combinations in Condition 2) is X, an index for the combination with the lowest spectral efficiency among the same combinations commonly included is determined as $g_{MCS}(a)-floor(X/2)$ or $g_{MCS}(a)-ceil(X/2)$ and indices are sequentially determined for the same combination included in common.

Here, floor(x) indicates a largest integer less than or equal to a real number x, ceil(x) indicates a smallest integer greater than or equal to the real number x, and $g_{MCS}(a)$ indicates an integer determined according to a. Also, a indicates an appropriately selectable number according to the target BLER, and in case that P1=1 and P2=5, a=1/3 to configure P=2, a=1/2 to configure P=3, and a=2/3 to configure P=4.

For convenience, the disclosure is described on the assumption that $g_{MCS}(1/2)=14$ or 15, but the values may be differently configured. However, in case that $g_{MCS}(a)-floor(X/2)<0$, $g_{MCS}(a)-ceil(X/2)<0$, $g_{MCS}(a)-floor(X/2)+X>28$ (or 27), or $g_{MCS}(a)-ceil(X/2)+X>28$ (or 27), modulation and code rate combinations corresponding to less than index 0 or greater than index 28 (or 27) are excluded when the third MCS table is generated.

Condition 4) Assuming that an index allocated to a combination with the lowest spectral efficiency among the same combinations included in the set S1 or set S2 is J, among modulation and code rate combinations of the second MCS table, J combinations with spectral efficiency lower than those of modulation and code rate combinations included in set S1 or S2 and having higher than those of modulation and code rate combinations not included in set S1 or S2 are allocated to indexes from 0 to (J-1).

Condition 5) Assuming that an index allocated to a combination with the highest spectral efficiency among the same combinations included in the set S1 or set S2 is K, among modulation and code rate combinations of the first MCS table, (28-K) or (27-K) combinations with spectral efficiency higher than those of modulation and code rate combinations included in set S1 or set S2 and having a lower spectral efficiency among modulation and code rate combinations not included in set S1 or set S2 are sequentially allocated to indexes from (K+1) to 28 or 27.

Here, a value of 28 or 27 may be changed according to the number of reserved indexes in the given MCS table. (e.g., 31–(the number of reserved indexes))

As a specific embodiment in consideration of the aforementioned conditions, a method for generating a new MCS table having target BLER of $10^3$ by using Table 12 and Table 14 will be described as follows.

First, a set S1 of modulation and code rate combinations commonly included in Table 12 and Table 14 is determined according to condition 2-1). It may be identified that there are a total of 23 common combinations, such as (QPSK, 120/1024), (QPSK, 157/1024), (QPSK, 193/1024), (QPSK, 251/1024), (QPSK, 308/1024), (QPSK, 379/1024), (QPSK, 449/1024), (QPSK, 526/1024), (QPSK, 602/1024), (16QAM, 340/1024), (16QAM, 378/1024), (16QAM, 434/1024), (16QAM, 490/1024), (16QAM, 553/1024), (16QAM, 616/1024), (64QAM, 438/1024), (64QAM; 466/1024), (64QAM, 517/1024), (64QAM, 567/1024), (64QAM, 616/1024), (64QAM, 666/1024), (64QAM, 719/1024), and (64QAM, 772/1024) (X1=23)

In case that a set S2 of modulation and code rate combinations is determined according to Condition 2-2) with respect to Table 12 and Table 14, it may be identified that set S2 includes a total of 25 combinations, such as (QPSK, 120/1024), (QPSK, 157/1024), (QPSK, 193/1024), (QPSK, 251/1024), (QPSK, 308/1024), (QPSK, 379/1024), (QPSK, 449/1024), (QPSK, 526/1024), (QPSK, 602/1024), (QPSK, 679/1024), (16QAM, 340/1024), (16QAM, 378/1024), (16QAM, 434/1024), (16QAM, 490/1024), (16QAM, 553/1024), (16QAM, 616/1024), (16QAM, 658/1024), (64QAM, 438/1024), (64QAM, 466/1024), (64QAM, 517/1024), (64QAM, 567/1024), (64QAM, 616/1024), (64QAM, 666/1024), (64QAM, 719/1024), and (64QAM, 772/1024)

(X2=25)

Next, a=1/2 according to Condition 3), and thus in case that $g_{MCS}(1/2)=14$, $g_{MCS}(a)$–floor(X/2)=14-12=2. Accordingly, the 23 combinations included in set S1 are sequentially allocated from indexes 2 to 24.

Next, by Condition 4), a combination of (QPSK, 78/1024) is allocated to index 0 and a combination of (QPSK, 99/1024) is allocated to index 1 in Table 14, and (64QAM, 822/1024), (64QAM, 873/1024), (64QAM, 910/1024), and (64QAM, 948/1024) are sequentially allocated to indexes 25, 26, 27, and 28, respectively, in Table 12.

The generated MCS tables are as shown in Table 24.

TABLE 24

| MCS Index $I_{MCS}$ | Modulation Order Qm | Target code Rate R × [1024] | Spectral efficiency |
|---|---|---|---|
| 0 | 2 | 78 | 0.1523 |
| 1 | 2 | 99 | 0.1934 |
| 2 | 2 | 120 | 0.2344 |
| 3 | 2 | 157 | 0.3066 |
| 4 | 2 | 193 | 0.3770 |
| 5 | 2 | 251 | 0.4902 |
| 6 | 2 | 308 | 0.6016 |
| 7 | 2 | 379 | 0.7402 |
| 8 | 2 | 449 | 0.8770 |
| 9 | 2 | 526 | 1.0273 |
| 10 | 2 | 602 | 1.1758 |
| 11 | 4 | 340 | 1.3281 |
| 12 | 4 | 378 | 1.4766 |
| 13 | 4 | 434 | 1.6953 |
| 14 | 4 | 490 | 1.9141 |
| 15 | 4 | 553 | 2.1602 |
| 16 | 4 | 616 | 2.4063 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

In case that $g_{MCS}(1/2)=15$ in Condition 3), $g_{MCS}(a)$–floor (X/2)=15-12=3 and thus the 23 combinations included in set S1 are sequentially allocated to indexes 3 to 25. In addition, by Condition 4), combinations of (QPSK, 64/1024), (QPSK, 78/1024), and (QPSK, 99/1024) are sequentially allocated to indexes 0, 1, and 2 in Table 14 and combinations of (64QAM, 822/1024), (64QAM, 873/1024), and (64QAM, 910/1024) are sequentially allocated to indexes 26, 27, and 28, respectively, in Table 14.

The generated MCS tables are as shown in Table 25.

TABLE 25

| MCS Index $I_{MCS}$ | Modulation Order Qm | Target code Rate R × [1024] | Spectral efficiency |
|---|---|---|---|
| 0 | 2 | 64 | 0.1250 |
| 1 | 2 | 78 | 0.1523 |
| 2 | 2 | 99 | 0.1934 |
| 3 | 2 | 120 | 0.2344 |
| 4 | 2 | 157 | 0.3066 |
| 5 | 2 | 193 | 0.3770 |
| 6 | 2 | 251 | 0.4902 |
| 7 | 2 | 308 | 0.6016 |
| 8 | 2 | 379 | 0.7402 |
| 9 | 2 | 449 | 0.8770 |
| 10 | 2 | 526 | 1.0273 |
| 11 | 2 | 602 | 1.1758 |
| 12 | 4 | 340 | 1.3281 |
| 13 | 4 | 378 | 1.4766 |
| 14 | 4 | 434 | 1.6953 |
| 15 | 4 | 490 | 1.9141 |
| 16 | 4 | 553 | 2.1602 |
| 17 | 4 | 616 | 2.4063 |
| 18 | 6 | 438 | 2.5664 |
| 19 | 6 | 466 | 2.7305 |
| 20 | 6 | 517 | 3.0293 |
| 21 | 6 | 567 | 3.3223 |

TABLE 25-continued

| MCS Index $I_{MCS}$ | Modulation Order Qm | Target code Rate R × [1024] | Spectral efficiency |
|---|---|---|---|
| 22 | 6 | 616 | 3.6094 |
| 23 | 6 | 666 | 3.9023 |
| 24 | 6 | 719 | 4.2129 |
| 25 | 6 | 772 | 4.5234 |
| 26 | 6 | 822 | 4.8164 |
| 27 | 6 | 873 | 5.1152 |
| 28 | 6 | 910 | 5.3320 |
| 29 | 2 | reserved | |
| 30 | 4 | reserved | |
| 31 | 6 | reserved | |

In case that $g_{MCS}(1/2)=14$ in Condition 3) and a MCS table is generated based on set S2, $g_{MCS}(a)-\text{floor}(X/2)=14-12=2$ and thus the 25 combinations included in set Sil are sequentially allocated to indexes 2 to 26. In addition, by Condition 4), combinations of (QPSK, 78/1024) and (QPSK, 99/1024) are sequentially allocated to indexes 0 and 1 in Table 14 and combinations of (64QAM, 822/1024) and (64QAM, 873/1024) are sequentially allocated to indexes 27 and 28, respectively, in Table 12.

The generated MCS tables are as shown in Table 26.

TABLE 26

| MCS Index $I_{MCS}$ | Modulation Order Qm | Target code Rate R × [1024] | Spectral efficiency |
|---|---|---|---|
| 0 | 2 | 78 | 0.1523 |
| 1 | 2 | 99 | 0.1934 |
| 2 | 2 | 120 | 0.2344 |
| 3 | 2 | 157 | 0.3066 |
| 4 | 2 | 193 | 0.3770 |
| 5 | 2 | 251 | 0.4902 |
| 6 | 2 | 308 | 0.6016 |
| 7 | 2 | 379 | 0.7402 |
| 8 | 2 | 449 | 0.8770 |
| 9 | 2 | 526 | 1.0273 |
| 10 | 2 | 602 | 1.1758 |
| 11 | 2 | 679 | 1.3262 |
| 12 | 4 | 340 | 1.3281 |
| 13 | 4 | 378 | 1.4766 |
| 14 | 4 | 434 | 1.6953 |
| 15 | 4 | 490 | 1.9141 |
| 16 | 4 | 553 | 2.1602 |
| 17 | 4 | 616 | 2.4063 |
| 18 | 4 | 658 | 2.5703 |
| 19 | 6 | 438 | 2.5664 |
| 20 | 6 | 466 | 2.7305 |
| 21 | 6 | 517 | 3.0293 |
| 22 | 6 | 567 | 3.3223 |
| 23 | 6 | 616 | 3.6094 |
| 24 | 6 | 666 | 3.9023 |
| 25 | 6 | 719 | 4.2129 |
| 26 | 6 | 772 | 4.5234 |
| 27 | 6 | 822 | 4.8164 |
| 28 | 6 | 873 | 5.1152 |
| 29 | 2 | reserved | |
| 30 | 4 | reserved | |
| 31 | 6 | reserved | |

As such, another MCS table may be generated by using set Sil and set S2 while changing a value of $g_{MCS}(a)$ and a calculation value of floor(X/2) or ceil(X/2).

The MCS tables in Table 24 to Table 27 designed so far are merely examples and in some cases, each code rate or spectral efficiency may be configured from other modulations and code rate combinations having close values within 10 to 20%.

Embodiment 5

Embodiment 5 of the disclosure describes a method for designing an appropriate MCS table and a method for transmitting/receiving data based on the MCS table in case that 1024 QAM modulation scheme with a maximum modulation order of 10 is allowable in a wireless communication system such as 5G NR.

It is assumed that a CQI table such as Table 27 is defined in a wireless communication system. In other words, it is assumed that a CQI table of Table 27 may be configured in a terminal or a base station as a cqi-table parameter in [CQI determination-1] or [CQI determination-2]. (In this specification, for convenience of explanation, it is described that in case that a CSI-higher layer parameter included in CSI-ReportConfig configures (or indicates) Table 27, a target transport block error probability is based on a CQI table suitable for 0.1, but the same can be applied to other CQI tables.)

TABLE 27

| CQI index | modulation | code rate × 1024 | Spectral efficiency |
|---|---|---|---|
| 0 | | out of range | |
| 1 | QPSK | 78 | 0.1528 |
| 2 | QPSK | 198 | 0.3770 |
| 3 | QPSK | 449 | 0.8770 |
| 4 | 16QAM | 378 | 1.4766 |
| 5 | 16QAM | 616 | 2.4068 |
| 6 | 64QAM | 567 | 3.3223 |
| 7 | 64QAM | 666 | 8.8023 |
| 8 | 64QAM | 772 | 4.5234 |
| 9 | 64QAM | 873 | 5.1152 |
| 10 | 256QAM | 711 | 5.5547 |
| 11 | 256QAM | 797 | 6.2260 |
| 12 | 256QAM | 885 | 6.9141 |
| 19 | 256QAM | 948 | 7.4063 |
| 14 | 1024QAM | 858 | 8.8821 |
| 15 | 1024QAM | 948 | 9.2578 |

A MCS table to be newly defined is designed based on Table 13, which is one of MCS tables in a 5G NR system and for convenience, descriptions are provided for a case in which the 1024 QAM modulation scheme, that is, modulation order 10, correspond to MCS indexes 23 to 26.

In case that MCS index 22 corresponds to 256 QAM, it is preferable to configure MCS index 23 to spectral efficiency average value or a value close to the average corresponding to each of CQI indices 13 and 14 in the CQI tables of Table 27.

For example, the average value of spectral efficiency of 7.4063 of CQI index 13 in Table 27 and spectral efficiency of 8.3321 of CQI index 14 in Table 27 is 7.8692, and thus spectral efficiency corresponding to index 23 of the MCS table to be newly defined may be configured to 7.8692 or a value close thereto. The spectral efficiency of 7.4063 of CQI index 13 in Table 27 and the spectral efficiency of 8.3321 of CQI index 14 in Table 27 is approximate values of an actual spectral efficiency values, and thus more accurate average values may be acquired as follow:

$$\frac{1}{2} \times \left( \frac{948}{1024} \times 8 + \frac{853}{1024} \times 10 \right) \cong 7,8682.$$

In some cases, spectral efficiency may be defined (or determined) as an approximate value of an average value instead of the exact average value, where the approximate value may mean a value within +3% or −3% of the value of the exact average value.

In case that the spectral efficiency is determined to be 7.8682, the [code rate R×1024] value has a value close to 805.7, and in case that the spectral efficiency is determined to be 7.8692, the [code rate R×1024] value has a value close to 805.8, and therefore, the [code rate R×1024] value of the MCS index 23 may be defined as a value such as 805, 805.5, 806, or 806.5. In addition, the spectral efficiency values corresponding to [code rate R×1024] values are 7.8613, 7.8662, 7.8711, and 7.8760, respectively.

The values corresponding to CQI table index 14 of Table 27 may be used, as they are, for the spectral efficiency and [code rate R×1024] values corresponding to MCS index 24 of the MCS table to be newly defined. Similarly, the values corresponding to CQI table index 15 of Table 27 may be used, as they are, for the spectral efficiency and [code rate R×1024] values corresponding to MCS index 26.

The spectral efficiency value corresponding to MCS index 25 of the MCS table to be newly defined may be determined as an average value of values corresponding to CQI index 14 and CQI index 15 of Table 27 or an approximate value of the average value. (Alternatively, it may be determined as an average value of values corresponding to MCS index 24 and MCS index 26 or an approximate value of the average value.)

The spectral efficiency values corresponding to CQI index 14 and CQI index 15 in Table 27 are 8.3321 and 9.2578, respectively, and thus an average value thereof is a value close to 8.7950. Alternatively, the accurate average value is acquired as follows, $$\frac{1}{2} \times \left( \frac{853}{1024} \times 10 + \frac{948}{1024} \times 10 \right) \cong 8.7939,$$

and thus the average value of spectral efficiency may be 8.7939. Therefore, the spectral efficiency value corresponding to MCS index 25 may be determined as an approximate value of the accurate average value, such as 8.7939 or 8.7950. Here, the approximate value may mean a value within −3% to +3% of an accurate average value.

In case that the spectral efficiency is determined to be 8.7939, the [code rate R×1024] value has a value close to 900.5, and in case that the spectral efficiency is determined to be 8.7950, the [code rate R×1024] value has a value close to 900.6, and therefore, the [code rate R×1024] value of the MCS index 25 may be defined as a value such as 900, 900.5, or 901. In addition, the spectral efficiency values corresponding to [code rate R×1024] values are 8.7891, 8.7939 (−8.7940), and 8.7988, respectively.

An example of The MCS table designed through the method described above is shown in Table 28. For reference, indexes 27 to 31 are sequentially correspond to modulation orders 2, 4, 5, 8, and 10 in Table 28 and indicate indexes configurable for data retransmission.

TABLE 28

| MCS Index $I_{MCS}$ | Modulation Order Qm | Target code Rate R × [1024] | Spectral Efficiency |
|---|---|---|---|
| 0 | — | — | — |
| 1 | — | — | — |
| . . . | . . . | . . . | . . . |
| 22 | — | — | — |

TABLE 28-continued

| MCS Index $I_{MCS}$ | Modulation Order Qm | Target code Rate R × [1024] | Spectral Efficiency |
|---|---|---|---|
| 23 | 10 | 805.5 | 7.8662 |
| 24 | 10 | 853 | 8.3321 |
| 25 | 10 | 900.5 | 8.7939 |
| 26 | 10 | 948 | 9.2578 |
| 27 | 2 | reserved | |
| 28 | 4 | reserved | |
| 29 | 6 | reserved | |
| 30 | 8 | reserved | |
| 31 | 10 | reserved | |

Table 28 above is an example of an MCS table acquired by removing one index value for reserved indication and four indexes for 1024 QAM from Table 13. Here, various MCS tables may be determined depending on a method for determining a MCS combination to be removed from Table 13. (However, typically, a combination of MCS index 0 indicates a most robust modulation order and code rate combination that the system can tolerate, and MCS index 0 may be configured in the same manner.)

For example, a new MCS table may configured by removing three modulation order and code rate combinations from among the MCS indexes corresponding to modulation order 4 and two modulation order and code rate combinations from the MCS indexes corresponding to modulation order 6 from Table 13, sequentially reordering MCS indexes, and combining the same with MCS indexes corresponding to 1024 QAM in Table 28.

For more specific example, Table 29 shows an example in which three combinations of cases of MCS indexes 5, 7, and 9 are removed in case of modulation order 4 and two combinations of cases of MCS indexes 12 and 14 are removed in case of modulation order 6 from Table 13, which is then combined with Table 28.

TABLE 29

| MCS Index $I_{MCS}$ | Modulation Order Qm | Target code Rate [R × 1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 434 | 1.6953 |
| 6 | 4 | 553 | 2.1602 |
| 7 | 4 | 658 | 2.5703 |
| 8 | 6 | 466 | 2.7305 |
| 9 | 6 | 567 | 3.3223 |
| 10 | 6 | 666 | 3.9023 |
| 11 | 6 | 719 | 4.2129 |
| 12 | 6 | 772 | 4.5234 |
| 13 | 6 | 822 | 4.8164 |
| 14 | 6 | 873 | 5.1152 |
| 15 | 8 | 682.5 | 5.3320 |
| 16 | 8 | 711 | 5.5547 |
| 17 | 8 | 754 | 5.8906 |
| 18 | 8 | 797 | 6.2266 |
| 19 | 8 | 841 | 6.5703 |
| 20 | 8 | 885 | 6.9141 |
| 21 | 8 | 916.5 | 7.1602 |
| 22 | 8 | 948 | 7.4063 |
| 23 | 10 | 805.5 | 7.8662 |
| 24 | 10 | 853 | 8.3321 |
| 25 | 10 | 900.5 | 8.7939 |
| 26 | 10 | 948 | 9.2578 |

TABLE 29-continued

| MCS Index $I_{MCS}$ | Modulation Order Qm | Target code Rate [R × 1024] | Spectral efficiency |
|---|---|---|---|
| 27 | 2 | reserved | |
| 28 | 4 | reserved | |
| 29 | 6 | reserved | |
| 30 | 8 | reserved | |
| 31 | 10 | reserved | |

For another example, Table 30 shows an example in which combination of cases of MCS index 5, CS index 7, and MCS index 9 are removed in case of modulation order 4, combinations of a case of MCS index 11 is removed in case of modulation order 6, and combinations of a case of MCS index 20 is removed in case of modulation order 8 from Table 13, which is then combined with Table 28.

TABLE 30

| MCS Index $I_{MCS}$ | Modulation Order Qm | Target code Rate [R × 1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 434 | 1.6953 |
| 6 | 4 | 553 | 2.1602 |
| 7 | 4 | 658 | 2.5703 |
| 8 | 6 | 517 | 3.0293 |
| 9 | 6 | 567 | 3.3223 |
| 10 | 6 | 616 | 3.6094 |
| 11 | 6 | 666 | 3.9023 |
| 12 | 6 | 719 | 4.2129 |
| 13 | 6 | 772 | 4.5234 |
| 14 | 6 | 822 | 4.8164 |
| 15 | 8 | 873 | 5.1152 |
| 16 | 8 | 711 | 5.5547 |
| 17 | 8 | 754 | 5.8906 |
| 18 | 8 | 797 | 6.2266 |
| 19 | 8 | 841 | 6.5703 |
| 20 | 8 | 885 | 6.9141 |
| 21 | 8 | 916.5 | 7.1602 |
| 22 | 8 | 948 | 7.4063 |
| 23 | 10 | 805.5 | 7.8662 |
| 24 | 10 | 853 | 8.3321 |
| 25 | 10 | 900.5 | 8.7939 |
| 26 | 10 | 948 | 9.2578 |
| 27 | 2 | reserved | |
| 28 | 4 | reserved | |
| 29 | 6 | reserved | |
| 30 | 8 | reserved | |
| 31 | 10 | reserved | |

For another example, Table 31 shows an example in which combinations of cases of MCS index 4, CS index 7, and MCS index 9 are removed in case of modulation order 2, combinations of a case of MCS index 11 is removed in case of modulation order 4, and combinations of cases of MCS index 12 and MCS index 14 are removed in case of modulation order 6 from Table 13, which is then combined with Table 28.

TABLE 31

| MCS Index $I_{MCS}$ | Modulation Order Qm | Target code Rate [R × 1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |

TABLE 31-continued

| MCS Index $I_{MCS}$ | Modulation Order Qm | Target code Rate [R × 1024] | Spectral efficiency |
|---|---|---|---|
| 4 | 4 | 378 | 1.4766 |
| 5 | 4 | 434 | 1.6953 |
| 6 | 4 | 553 | 2.1602 |
| 7 | 4 | 658 | 2.5703 |
| 8 | 6 | 466 | 2.7305 |
| 9 | 6 | 567 | 3.3223 |
| 10 | 6 | 666 | 3.9023 |
| 11 | 6 | 719 | 4.2129 |
| 12 | 6 | 772 | 4.5234 |
| 13 | 6 | 822 | 4.8164 |
| 14 | 6 | 873 | 5.1152 |
| 15 | 8 | 682.5 | 5.3320 |
| 16 | 8 | 711 | 5.5547 |
| 17 | 8 | 754 | 5.8906 |
| 18 | 8 | 797 | 6.2266 |
| 19 | 8 | 841 | 6.5703 |
| 20 | 8 | 885 | 6.9141 |
| 21 | 8 | 916.5 | 7.1602 |
| 22 | 8 | 948 | 7.4063 |
| 23 | 10 | 805.5 | 7.8662 |
| 24 | 10 | 853 | 8.3321 |
| 25 | 10 | 900.5 | 8.7939 |
| 26 | 10 | 948 | 9.2578 |
| 27 | 2 | reserved | |
| 28 | 4 | reserved | |
| 29 | 6 | reserved | |
| 30 | 8 | reserved | |
| 31 | 10 | reserved | |

As such, in a method for configuring a new MCS table based on the MCS table of Table 13, in case that a reserved field corresponding to 1024 QAM is added while adding D modulation order and code rate combinations corresponding to 1024 QAM, (D+1) combinations need to be removed from MCS combinations of Table 13. Table 29 to Table 31 may show an example in which D=4. For reference, since indexes for reserved indication are typically used for retransmission, and thus an MCS index corresponding to each modulation order is preferably included in an MCS table, but for some cases, reserved indication corresponding to a specific modulation order may be omitted.

Furthermore, Table 28 to Table 31 are merely examples, modulation order and code rate combinations corresponding to some MCS levels in each MCS table may be excluded or changed. A new MCS table may be generated by appropriately combining modulation order and code rate combinations of each MCS table.

For example, when configuring an MCS table, in case that an MCS table is configured to maximally include modulation order and code rate combinations included in a CQI table and spectral efficiency, the MCS tables of Table 28 to Table 31 and other MCS tables may be defined. Here, the meaning of maximally including the modulation order and code rate combinations included in the CQI table and the corresponding spectral efficiency may indicate that all of the other modulation order and code rate combinations are included in the MCS table except for 1 to 3 of the modulation order and code rate combinations included in the CQI table.

For specific example, assuming that an MCB table is designed to maximally include combinations of a case of modulation order 4 among modulation order and code rate combinations included in the CQI table of Table 29, all or at least one of (modulation order, [code rate R×1024], spectral efficiency value)=(4, 378, 1.4766) and (4, 616, 2.4063) needs to be included in the MCS table. As an example of the MCS table, in Table 13, the remaining modulation order and code rate combinations among MCS indexes corresponding to modulation order 4, excluding modulation order and code rate combinations corresponding to MCS index 6, MCS index 9, and MCS index 10' may be included in the MCS table. In other words, in Table 29 and Table 30, an MCS table in which (modulation order, [code rate R×1024], spectral efficiency value) for MCS index 5=(4, 378, 1.4766), (modulation order, [code rate R×1024], spectral efficiency value) for MCS index 6=(4, 490, 1.9141), and (modulation order, [code rate R×1024], spectral efficiency value) for MCS index 7=(4, 616, 2.4063) may be defined. Of course, this is merely an example and an MCS table including all or at least one of (modulation order, [code rate R×1024], spectral efficiency value) (4, 378, 1.4766) and (4, 616, 2.4063) while including at least one or at most two of (4, 434, 1.6953), (4, 490, 1.9141), (4, 553, 2.1602), or (4, 658, 2.5703) may be defined. Accordingly, various MCS tables for supporting 1024 QAM, such as MCS tables for supporting 1024 QAM in Table 29-1 and Table 30-1 may be applied to the MCS tables for supporting 1024 QAM of the disclosure.

TABLE 29-1

| MCS Index $I_{MCS}$ | Modulation Order Qm | Target code Rate [R × 1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 490 | 1.9141 |
| 7 | 4 | 616 | 2.4063 |
| 8 | 6 | 466 | 2.7305 |
| 9 | 6 | 567 | 3.3223 |
| 10 | 6 | 666 | 3.9023 |
| 11 | 6 | 719 | 4.2129 |
| 12 | 6 | 772 | 4.5234 |
| 13 | 6 | 822 | 4.8164 |
| 14 | 6 | 873 | 5.1152 |
| 15 | 8 | 682.5 | 5.3320 |
| 16 | 8 | 711 | 5.5547 |
| 17 | 8 | 754 | 5.8906 |
| 18 | 8 | 797 | 6.2266 |
| 19 | 8 | 841 | 6.5703 |
| 20 | 8 | 885 | 6.9141 |
| 21 | 8 | 916.5 | 7.1602 |
| 22 | 8 | 948 | 7.4063 |
| 23 | 10 | 805.5 | 7.8662 |
| 24 | 10 | 853 | 8.3321 |
| 25 | 10 | 900.5 | 8.7939 |
| 26 | 10 | 948 | 9.2578 |
| 27 | 2 | | reserved |
| 28 | 4 | | reserved |
| 29 | 6 | | reserved |
| 30 | 8 | | reserved |
| 31 | 10 | | reserved |

TABLE 30-1

| MCS Index $I_{MCS}$ | Modulation Order Qm | Target code Rate [R × 1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 490 | 1.9141 |
| 7 | 4 | 616 | 2.4063 |
| 8 | 6 | 517 | 3.0293 |

TABLE 30-1-continued

| MCS Index $I_{MCS}$ | Modulation Order Qm | Target code Rate [R × 1024] | Spectral efficiency |
|---|---|---|---|
| 9 | 6 | 567 | 3.3223 |
| 10 | 6 | 616 | 3.6094 |
| 11 | 6 | 666 | 3.9023 |
| 12 | 6 | 719 | 4.2129 |
| 13 | 6 | 772 | 4.5234 |
| 14 | 6 | 822 | 4.8164 |
| 15 | 8 | 873 | 5.1152 |
| 16 | 8 | 711 | 5.5547 |
| 17 | 8 | 754 | 5.8906 |
| 18 | 8 | 797 | 6.2266 |
| 19 | 8 | 841 | 6.5703 |
| 20 | 8 | 885 | 6.9141 |
| 21 | 8 | 916.5 | 7.1602 |
| 22 | 8 | 948 | 7.4063 |
| 23 | 10 | 805.5 | 7.8662 |
| 24 | 10 | 853 | 8.3321 |
| 25 | 10 | 900.5 | 8.7939 |
| 26 | 10 | 948 | 9.2578 |
| 27 | 2 | | reserved |
| 28 | 4 | | reserved |
| 29 | 6 | | reserved |
| 30 | 8 | | reserved |
| 31 | 10 | | reserved |

Similarly, in case of Table 1], an MCS table in which at least one of index 0.6 or index 7 is (modulation order, [code rate R×1024], spectral efficiency value)=(4, 616, 2.4063) with respect to indexes 5, 6, and 7 and which has characteristics corresponding to at least two of (modulation order, [code rate R×1024], spectral efficiency value)=(4, 434, 1.6953), (4, 490, 1.9141), (4, 553, 2.1602), or (4, 658, 2.5703) with respect to remaining two indexes may be defined. Therefore, as the MCS table according to the disclosure, an MCS table in which (modulation order, [code rate R×1024], spectral efficiency value) sets corresponding to one or more indexes of Table 31 are changed to the different values described above may be applied.

Furthermore, the spectral efficiency values included in Table 28 to Table 31, Table 29-1, and Table 30-1 may be substituted with approximate values of respective values. For specific example, (modulation order, [code rate R×1024], spectral efficiency value) for index 23 in Table 28 to Table 31, Table 29-, and Table 30-1 may be substituted with (805, 7.8613), (806, 7.8711), or (806.5, 7.8760), respectively. Similarly, (modulation order, [code rate R×1024], spectral efficiency value) for index 25 in Table 28 to Table 31, Table 29-1, and Table 30-1 may be substituted with (900, 8.7891) or (901, 8.7988), respectively. Furthermore, the spectral efficiency values of 7.8662, 8.3321, 8.7939, and 9.2578 corresponding to each of MCS indexes 23, 24, 25, and 26 in Table 28 to Table 31, Table 29-1, and Table 30-1 may be substituted with approximate values within −3% to +3%, and when the spectral efficiency values is referred to as SE(23), SE(24), SE(25), and SE(26), respectively, a value of [code rate R×1024] may be configured to have one $\lfloor SE(i)/10×1024\rfloor\lceil SE(i)/10×1024\rceil$ $\lceil SE(i)/10×1024\rceil±0.5$ of values of, or $[SE(i)/10×1024]±0.5$ i=23, 24, 25, 26 with respect to, in general. (Wherein, $\lfloor\cdot\rfloor$, indicates a flooring operation and $\lceil\cdot\rceil$ indicates a ceiling operation.)

Embodiment 6

The method for designing or determining an MCS table is described in Embodiment 6 to Embodiment 9 above. The MCS tables designed as such may be stored in a base station or a terminal and used to determine MCS indexes.

In the current 5G NR system, supportable modulation schemes include QPSK, 16QAM, 64QAM, and 256QAM and may include 1024 QAM or more in the future. Different CQI tables and different MCS tables may be used depending on an order of a maximum modulation scheme that a terminal supports.

Here, by applying different CQI tables according to a target BLER and a maximum modulation order required by the system, a terminal may determine or indicate an appropriate CQI index and transmit a value thereof to a base station. Accordingly, the base station may configure or indicate an MCS index, that is, a combination of a modulation scheme and a target code rate, based on an appropriate MCS table based on a corresponding CQI index or a CQI value corresponding thereto.

In this case, an MCS index may be determined based on the MCS table designed for a target BLER=0.001, such as newly designed Table 24 to Table 27 in addition to Table 12 to Table 16.

As an example of a specific method, in the 5G NR system, an MCS index for a PDSCH, that is, modulation order (or scheme) Qm and target code rate R, is determined via the following procedures.

With respect to a PDSCH scheduled via a PDCCH including DCI format 1_0 or format 1_1 with a CRC scrambled by C-RNTI, MCS-C-RNTI, TC-RNTI, CS-RNTI, SI-RNTI, RA-RNTI, or P-RNTI, or with respect to a PDSCH scheduled using PDSCH configuration SPS-Config provided by a higher layer without corresponding PDCCH transmission, (a) In case that higher layer parameter mcs-Table given by PDSCH-Config has been configured to "qam256", and the PDSCH has been scheduled by the PDCCH of DCI format 1_1 that is together with the CRC scrambled by C-RNTI, a UE uses the MCS index $I_{MCS}$ value of [Table 13] to determine modulation order Qm and target code rate R.

(b) In case that the conditions of (a) are not satisfied, the UE has not been configured by MCS-C-RNTI (UE is not configured with MCS-C-RNTI), higher layer parameter mcs-Table given by PDSCH-Config has been configured to "qam64LowSE", and the PDSCH has been scheduled by the PDCCH in a UE-specific search space with the CRC scrambled by C-RNTI, the UE uses the MCS index $I_{MCS}$ value of [Table 14] to determine modulation order Qm and target code rate R.

(c) In case that the conditions of (a) and (b) are not satisfied, the UE has been configured by MCS-C-RNTI, and the PDSCH has been scheduled by the PDCCH to which the CRC scrambled by MCS-C-RNTI is applied, the UE uses the MCS index $I_{MCS}$ value of [Table 14] to determine modulation order Qm and target code rate R.

(d) In case that the conditions of (a), (b), and (c) are not satisfied, and the UE has not been configured by higher layer parameter mcs-Table given by SPC-Config, higher layer parameter mcs-Table given by PDSCH-Config has been set to "qam256", and (d-1) the PDSCH has been scheduled by the PDCCH of DCI format 1_1 to which the CRC scrambled by CS-RNTI is applied, or (d-2) the PDSCH has been scheduled without corresponding SPDCCH transmission using SPS-Config, the UE uses the MCS index $I_{MCS}$ value of [Table 13] to determine modulation order Qm and target code rate R.

(e) In case that the conditions of (a) to (d) are not satisfied, and higher layer parameter mcs-Table given by SPC-Config has been set to gam64LowSE and the UE is thus configured, (e-1) in case that the PDSCH has been scheduled by the PDCCH to which the CRC scrambled by CS-RNTI is applied, or (e-2) the PDSCH has been scheduled without corresponding PDCCH transmission using SPS-Config, the UE uses the MCS index $I_{MCS}$ value of [Table 14] to determine modulation order Qm and target code rate R.

(f) In case that the conditions of (a) to (e) are not satisfied, the UE uses the MCS index $I_{MCS}$ value of [Table 12] to determine modulation order Qm and target code rate R.

Contents of determining the MCS index for the PDSCH, i.e., modulation order (or method) Qm and target code rate R, correspond to the following contents of the standards.

For the PDSCH scheduled by a PDCCH with DCI format 1_0 or format 1_1 with CRC scrambled by C-RNTI, MCS-C-RNTI, TC-RNTI, CS-RNTI, SI-RNTI, RA-RNTI, or P-RNTI, or for the PDSCH scheduled without corresponding PDCCH transmissions using the higher-layer-provided PDSCH configuration SPS-Config, (a) if the higher layer parameter mcs-Table given by PDSCH-Config is set to 'qam256', and the PDSCH is scheduled by a PDCCH with DCI format 1_1 with CRC scrambled by C-RNTI the UE shall use $I_{MCS}$ and Table 5 to determine the modulation order ($Q_m$) and Target code rate (R) used in the physical downlink shared channel.

(b) elseif the UE is not configured with MCS-C-RNTI, the higher layer parameter mcs-Table given by PDSCH-Config is set to 'qam64LowSE', and the PDSCH is scheduled by a PDCCH in a UE-specific search space with CRC scrambled by C-RNTI the UE shall use $I_{MCS}$ and Table 6 to determine the modulation order ($Q_m$) and Target code rate (R) used in the physical downlink shared channel.

(c) elseif the UE is configured with MCS-C-RNTI, and the PDSCH is scheduled by a PDCCH with CRC scrambled by MCS-C-RNTI the UE shall use $I_{MCS}$ and Table 6 to determine the modulation order (Qm) and Target code rate (R) used in the physical downlink shared channel.

(d) elseif the UE is not configured with the higher layer parameter mcs-Table given by SPS-Config, the higher layer parameter mcs-Table given by PDSCH-Config is set to 'qam256', if the PDSCH is scheduled by a PDCCH with DCI format 1_1 with CRC scrambled by CS-RNTI or if the PDSCH is scheduled without corresponding PDCCH transmission using SPS-Config, the UE shall use $I_{MCS}$ and Table 5 to determine the modulation order ($Q_m$) and Target code rate (R) used in the physical downlink shared channel.

(e) elseif the UE is configured with the higher layer parameter mcs-Table given by SPS-Config set to 'qam64LowSE' if the PDSCH is scheduled by a PDCCH with CRC scrambled by CS-RNTI or if the PDSCH is scheduled without corresponding PDCCH transmission using SPS-Config, the UE shall use $I_{MCS}$ and Table 6 to determine the modulation order ($Q_m$) and Target code rate (R) used in the physical downlink shared channel.

(f) else the UE shall use $I_{MCS}$ and Table 4 to determine the modulation order ($Q_m$) and Target code rate (R) used in the physical downlink shared channel.

end

In case that [Table 24] to [Table 26] are used for a specific service scenario, a specific condition may be added and used between or before/after the above conditions (a), (b), (c), (d), (e), and (f). For example, an MCS table such as at least one of [Table 24] to [Table 26] may be used by adding or subdividing conditions, according to configured values of mcs-Table of higher layer signaling PDSCH-Config and mcs-Table of SPS-Config, or whether the PDSCH has been scheduled based on the PDCCH, to which a CRC scrambled by a specific RNTI (e.g., C-RNTI, MCS-C-RNTI, TC-RNTI, CS-RNTI, SI-RNTI, RA-RNTI, or P-RNTI, etc.) is applied.

The parameter mcs-Table value may be set to a value other than "qam256" or "qam64LowSE". For example, in case that the value is configured to a parameter with a different name, such as "qam64MidSE", it may be configured to use at least one of the MCS tables in [Table 24] to [Table 26], in which a target BLER is lower than 0.1 and is higher than 0.00001 (e.g., the target BLER is close to 0.001) and 64 QAM is defined as a maximum modulation scheme. In general, in case that there are more target BLERs and more various service scenarios are considered, more MCS tables may be additionally used.

As an example of another specific method, in the 5G NR system, with respect to a PUSCH scheduled by an RAR UL grant, a PUSCH scheduled by DCI format 0_0 CRC-scrambled by C-RNTI, MCS-C-RNTI, TC-RNTI, or CS-RNTI, a PUSCH scheduled by DCI format 0_1 CRC-scrambled by C-RNTI, MCS-C-RNTI, CS-RNTI, or SP-CSI-RNTI, or a PUSCH having a grant configured using CS-RNTI (a PUSCH with configured grant using CS-RNTI), the MCS index for the PUSCH, that is, modulation order (or scheme) Qm and target code rate R, is determined according to:

a type in which a PUSCH is scheduled whether "transform precoding" is disabled or enabled (disable or not), parameter mcs-Table of higher layer signaling pusch-Config or mcs-TableTransformPrecoder set value (e.g., "qam256" or "qam64LowSE"), parameter mcs-Table of higher layer signaling config-uredGrantConfig or mcs-TableTransformPrecoder set value (e.g., "qam256" or "qam64LowSE"), whether scheduling is performed based on a PDCCH, to which a CRC scrambled by a specific RNTI, is applied, and the like. Here, MCS tables, such as [Table 24] to [Table 26], may be additionally used by adding or subdividing the above conditions according to services. In this case, the parameter mcs-Table value may be configured to a value other than "qam1024", "qam256", or "qam64LowSE", for example, in case that the value is configured to a parameter with a difference name, such as "qam64MidSE", it may be configured to use at least one of MCS tables of [Table 24] to [Table 26], in which a target BLER is lower than 0.1 and is higher than 0.00001 (e.g., the target BLER is close to 0.001) and 64 QAM is defined as a maximum modulation scheme.

Although, an CQI table or an MCS table optimized according to the target BLER of the system may all be configured differently, in general, many modulation scheme (or order) and code rate combinations are shared and used as in embodiments of the disclosure. When a configuration using at least one of a first CQI table or a first MCS table to determine CQI or MCS is referred to as a first table configuration, and a configuration using at least one of a second CQI table or a second MCS table is referred to as a second table configuration, characteristics between operations of the base station or the terminal and respective table configurations may be summarized as follows.

A terminal (UE being operable to apply a first table configuration in a radio communication with a radio node of a cellular network) capable of performing the first table configuration for wireless communication with one base station (or radio node) of a cellular network receives an instruction for applying or performing the second table configuration from the base station. The second table configuration is applied for wireless communication with the base station (or radio node) based on the instruction. Control information (e.g., CQI information, etc.) or data is transmitted to the base station, based on the second table configuration.

The second MCS table or the second CQI table for the second table configuration supports spectral efficiency lower than minimum spectral efficiency of a first MCS table configuration.

In case that the second table configuration has been applied and it is desirable to use at least one of modulation order and code rate combinations for spectral efficiency included in at least one of the first MCS table or the first CQI table (as a fallback), at least one of the combinations is maintained in at least one of the second MCS table or the second CQI table.

"Modulation order and code rate combinations for spectral efficiency included in at least one of the first MCS table or the first CQI table" maintained in at least one of the second MCS table or the second CQI table may include a modulation order and code rate combination for lowest spectral efficiency of the first table configuration.

The system to which the first table configuration is applied may have the target BLER higher than that of the system to which the second table configuration is applied. (Approximately 10' times or more, P=1, 2, . . ., 5)

The terminal may transmit an appropriate CQI index to the base station, based on a CQI table determined according to a table configuration, or may determine a modulation scheme and a code rate, based on a determined MCS table, and subsequently the terminal may determine a TBS for transmitting data, and then may encode the data so as to transmit encoded bits to the base station.

The terminal may determine the modulation scheme and the code rate, based on the determined MCS table, may determine the TBS for data corresponding to the encoded bits transmitted from the base station, and then may decode the received encoded bits so as to restore the data.

When summarizing the operations from the viewpoint of the base station, the operations may be as follows.

In order to perform wireless communication with one terminal of the cellular network, the base station capable of performing the first table configuration transmits, to the terminal, the instruction for applying or performing the second table configuration.

Control information (e.g., CQI information, etc.) or data transmitted based on the second table configuration is received from the terminal.

The base station may determine an appropriate MCS based on the CQI index transmitted from the terminal, based on the CQI table determined according to the table configuration, or may determine the TBS of data corresponding to the encoded bits received from the terminal, based on the modulation scheme and code rate determined based on the determined MCS table, and then may restore the data by appropriately decoding the received encoded bits.

The base station may determine the modulation scheme and the code rate, based on the determined MCS table, may subsequently determine the TBS for data transmission, and then may encode the data so as to transmit encoded bits to the terminal.

(Features Related to the First Table Configuration and the Second Table Configuration are the Same and are Thus Omitted)

The TBS may be determined using a code rate indicated by an index included in the MCS table. In 5G NR, a TBS may be determined by the number of allocated REs, the number of layers to be used, a modulation order, a code rate, and the like. Among various factors for determination of a TBS, a modulation order and a code rate may be determined via an MCS in signaling information.

In some embodiments, a modulation order determined via an MCS may be used as it is, and a code rate determined via an MCS may be used as it is, wherein additional adjustment may be performed according to RRC configuration information.

In some embodiments, when only an MCS table for a service having a specific target BLER is defined, and according to RRC signaling, a maximum modulation order is the same but is configured to support a service having a BLER different from the specific target BLER, a transceiver may determine a modulation order and a code rate from the defined MCS table, and may adjust only the code rate for use. As an example, a method of subtracting or adding a predetermined constant value or multiplying a specific ratio in a code rate may be used, wherein the constant value for subtraction or addition or the specific ratio for multiplication in the code rate may use the same value with respect to all CQI indices, or a value varying according to a modulation order may be used.

Embodiment 7

Embodiment 9 proposes a method for configuring an MCS table suitable for use by a base station and a terminal in case that a CQI table, in which 1024 QAM is a maximum modulation scheme, is configured as shown in [Table 27]. In case that 1024 QAM support is allowed in the 5G NR system, additional operations may be required in the base station and the terminal.

As an example, an additional operation for a limited buffer rate matching (LBRM) technique of the 5G NR system is proposed.

In the 5G NR system, in case that the terminal and the base station determine a TBS, $$N'_{RE}$$

58 that is the number of REs allocated to PDSCH mapping in one PRB in allocated resources is calculated as $$N'_{RE} = N^{RB}_{sc} \cdot N^{sh}_{symb} - N^{PRB}_{DMRS} - N^{PRB}_{oh},$$

then a total number $N_{RE}$ of REs allocated to a PDSCH is calculated as $$N_{RE} = \min(156, N'_{RE}) \cdot n_{PRB}, \text{ and } N_{info} = N_{RE} \cdot R \cdot Q_m \cdot v$$

is calculated to determine the TBS based on a value thereof. (Here, $$N^{RB}_{sc}$$

indicates the number (e.g., 12) of subcarriers included in one RB, $$N^{sh}_{symb}$$

indicates the number of OFDM symbols allocated to a PDSCH, $$N^{PRB}_{DMRS}$$

indicates the number of REs in one PRB, which are occupied by a demodulation reference signal (DMRS) of the same code division multiplexing (CDM) group, and $$N^{PRB}_{oh}$$

indicates the number (e.g., configured to one of 0, 6, 12, 18) of REs occupied by overhead in one PRB configured by higher signaling. R and Qm indicate a code rate and a modulation order indicated by an MCS, and v denotes the number of supported layers.)

In the 5G NR system, in case that one TB or code block (CB) is input to an LDPC encoder, parity bits may be determined or generated so as to be output. In this case, codes used in the LDPC encoder are determined according to an LDPC base graph. In particular, in 5N NR, a base graph (or base matrix) is determined according to a TBS length and a code rate as follows, and LDPC encoding and decoding are performed according to the determined base graph during initial transmission and retransmission.

[Method for Selecting Base Graph (or Base Matrix)]

In case that a code rate indicated by an MCS is R,
TBS≤292 or TBS≤3824 and R≤0.67
Alternatively, in case that R≤0.25,
LDPC encoding is performed based on BG(2) (base graph 2 or base matrix 2).
In other cases, LDPC encoding is performed
LDPC encoding is performed based on BG(2) (base graph 1 or base matrix 1).

A parity check matrix is also determined based on the LDPC base graphs BG(1) and BG(2), and a code block size (CBS), and an LDPC code may generate a parity bit, based on the parity check matrix.

Here, a method for sending all parity bits generated by LDPC coding with respect to a specific input may be referred to as full buffer rate matching (FBRM), and a method of limiting the number of transmittable parity bits may be referred to as limited buffer rate matching (LBRM).

In case that resources are allocated for data transmission, an output of the LDPC encoder is made to a circular buffer, and bits of the buffer are repeatedly transmitted as many times as the number of the allocated resources, and a length of the circular buffer may be called $N_{cb}$. Assuming that the number of all LDPC codeword bits generated by LDPC coding is N, $N_{cb}$=N in the FBRM method. (For reference, in 5G NR, in LDPC codeword bits for initial transmission, some of information word bits are always excluded and are not transmitted.)

In the LBRM method, $N_{cb}$ corresponds to min(N, $N_{ref}$) $N_{ref}$ is given as $$\left\lfloor \frac{TBS_{LBRM}}{C \cdot R_{LBRM}} \right\rfloor,$$

C indicates the number of code blocks, and $R_{LBRM}$ is determined to be 2/3. In the TBS determined process described above, $TBS_{LBRM}$ may be determined by assuming the number v of layers as a maximum number of layers supported by the terminal in a corresponding cell, assuming QM to be a maximum modulation order configured to the terminal in the corresponding cell or to be 64 QAM in case that QM is not configured, assuming code rate R to be 948/1024, assuming $N_{RE}$ to be 156·$n_{PRB}$, and assuming $n_{PRB}$ to be $n_{PRB,LBRM}$. Here, $n_{PRB,LBRM}$ may be given as in Table 32 below.

TABLE 32

| Maximum number of PRBs across all configured BWPs of a carrier | $n_{PRB, LBRM}$ |
|---|---|
| Less than 33 | 32 |
| 33 to 66 | 66 |
| 67 to 107 | 107 |
| 108 to 135 | 135 |
| 136 to 162 | 162 |
| 163 to 217 | 217 |
| Larger than 217 | 273 |

In the NR system, an (approximated) maximum data rate supported by the terminal for a given number of aggregated carriers in a band or a band combination may be determined based on Equation 2 below.

$$\text{data rate (in Mbps)} =$$
$$10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j)\mu} \cdot 12}{T_s^{\mu}} \cdot \left(1 - OH^{(j)}\right) \right) \quad \text{Equation 2}$$

In Equation 2, J may indicate the number of carriers bound by carrier aggregation, $$R_{max} = 948/1024, \; v_{Layers}^{(j)}$$

may indicate the maximum number of layers, $$Q_m^{(j)}$$

may indicate a maximum modulation order, $f^{(j)}$ may indicate a scaling index, and μ may indicate a subcarrier spacing. The terminal may report $f^{(j)}$ as one value among 1, 0.8, 0.75, and 0.4, and μ may be given as shown in Table 33 below. (j) is an index indicating an j-th component carrier (CC).

TABLE 33

| μ | $\Delta f = 2^{\mu} \cdot 15$[kHz] | Cyclic Prefix |
|---|---|---|
| 0 | 15 | Normal |
| 1 | 30 | Normal |
| 2 | 60 | Normal, Extended |
| 3 | 120 | Normal |
| 4 | 240 | Normal |

$$T_s^{\mu}$$

is an average OFDM symbol length, $$T_s^{\mu}$$

may be calculated based on $$\frac{10^{-3}}{14 \cdot 2^{\mu}},$$

and $$N_{PRB}^{BW(j),\mu}$$

is the maximum number of RBs in BW(j). $OH^{(j)}$ is an overhead value, may be given as 0.14 in a downlink of FR1 (a band equal to or lower than 6 GHz, also referred to as B6G (below 6 GHz)) and given as 0.18 in an uplink thereof, and may be given as 0.08 in a downlink of FR2 (a band over 6 GHz, also referred to as A6G (above 6 GHz)) and given as 0.10 in an uplink thereof.

The overhead values may be defined as different values according to a service or a modulation order. For example, a case where an MCS table supporting 1024 QAM as in [Table 28] to [Table 31] is configured in the wireless communication system indicates a special situation where a channel environment is very good, and therefore the $OH^{(j)}$ value may also be configured differently. When use in an environment with a very good channel environment is assumed, the overhead value may be configured to be a smaller value, but since the 1024 QAM modulation scheme is vulnerable to a phase error, a peak-to-average power-ratio (PAPR) problem of the OFDM system, or the like, a value larger than a current reference may be configured. Data transmission or reception through a physical sidelink shared channel (PSSCH) in case that a vehicle-to-Infra or vehicle-to-vehicle (V2X) service is supported may have a different symbol allocation scheme for data transmission or reception through a PDSCH, so that the $OH^{(j)}$ value may be configured differently.

For more specific example for the V2X service, in the case of PSSCH data transmission or reception, at least a first symbol is allocated for automatic gain control (AGC) and a last symbol is allocated as a gap symbol for gap measurement, so that the maximum number of OFDM symbols for data transmission and reception may actually be 12 (or less). In this case, the $OH^{(j)}$ value may have a specific value or greater regardless of a configuration of a physical sidelink feedback channel (PSFCH), for example, the value may be equal to or greater than 2/12. As a specific example, regardless of FR1/B6G and FR2/A6G, the $OH^{(j)}$ value may be configured to be values that are greater than 2/12 and include a specific value such as 0.21. Alternatively, in a resource pool configuration of a corresponding carrier, the $OH^{(j)}$ may be determined according to a ratio of slots in which a PSFCH resource is configured, or a periodicity of the PSFCH resource. In this case, as the ratio in which the PSFCH resource is configured increases, the $OH^{(j)}$ value may become high.

For example, when a value of a case where the PSFCH is configured for each slot is referred to as A, a value of a case where the PSFCH is configured for one slot in every two slots is referred to as B, and a value of a case where the PSFCH is configured for one slot in every four slots is referred to as C, a relationship of A>B>C may be configured. (e.g., A=0.42, B=0.32, and C=0.26) For reference, the ratio of slots in which the PSFCH resource is configured or the periodicity of the PSFCH resource may be determined based on parameter sl-PSFCH-Period in a PSFCH-related configuration.

One or more sidelink resource pools may be configured for the terminal for PSSCH transmission or reception, wherein the $OH^{(j)}$ value may be determined based on a parameter of a resource pool having a greatest bandwidth from among the configured sidelink resource pools according to a higher layer configuration.

In the standard for a data rate supportable by the terminal, which is determined via [Equation 2], a maximum value of the modulation order was 8, previously, but since a maximum value of the modulation order is 10 in the system to which 1024 QAM is applied, the maximum data rate by [Equation 2] may also be determined differently from the 5G NR system of Release-15.

In the wireless communication system, particularly, the 5G NR system, a data rate supportable by a terminal may be mutually agreed upon between a base station and the terminal. The data rate may be calculated using a maximum frequency band supported by the terminal, a maximum modulation order, the maximum number of layers, and the like. However, the calculated data rate may be different from a value calculated from a transmission time interval (TTI) length and a size TBS of a transport block (TB) used for actual data transmission.

Accordingly, there may be a case where the terminal is allocated with a TBS greater than a value corresponding to a data rate supported by the terminal. It may be necessary to minimize such a case, and define operations of the terminal in the case. In the current communication system defined in NR, in case that LBRM is applied, $TBS_{LBRM}$ is determined based on a modulation order supported by the terminal, wherein it is necessary to present a clear configuration method so that the determination procedure is not inefficient or a parameter configuration is not ambiguous. The following embodiments provide a method and a device for achieving these tasks.

First, in case that PDSCH-LBRM needs to be applied, a maximum modulation order configured for a serving cell is configured as follows.

[Modulation Order Configuration for PDSCH-LBRM]

A maximum modulation order for a DL-SCH is assumed as $Q_m=10$ in case that parameter mcs-Table included in higher layer signaling pdsch-Config for one or more BWPs of the serving cell is configured to gam1024 (or an indicator indicating 1024 QAM), the maximum modulation order of the DL-SCH is assumed as $Q_m=8$ in case that parameter mcs-Table included in higher layer signaling pdsch-Config for one or more BWPs of the serving cell is configured to gam256 (or an indicator indicating 256 QAM), and the maximum modulation order for the DL-SCH is assumed as $Q_m=6$ in other cases.

The case may also be expressed as:

> "if the higher layer parameter mcs-Table given by a pdsch-Config for at least one DL BWP of the serving cell is set to 'qam1024', maximum modulation order $Q_m=10$ is assumed for DL-SCH; else if the higher layer parameter mcs-Table given by a pdsch-Config for at least one DL BWP of the serving cell is set to 'qam256', maximum modulation order $Q_m=8$ is assumed for DL-SCH; otherwise a maximum modulation order $Q_m=6$ is assumed for DL-SCH"

Therefore, modified PDSCH-LBRM procedures may be summarized as follows:

The bit sequence after encoding $d_0, d_1, \ldots, d_{N-1}$ from Clause 5.3.2 is written into a circular buffer of length $N_{cb}$ for the r-th coded block, where N is defined in Clause 5.3.2.
For the r-th code block, let $N_{cb} = N$ if $I_{LBRM} = 0$ and $N_{cb} = \min(N, N_{ref})$ otherwise, where $$N_{ref} = \left\lfloor \frac{TBS_{LBRM}}{C \cdot R_{LBRM}} \right\rfloor, \quad R_{LBRM} = 2/3, \; TBS_{LBRM} \text{ is determined according to Clause 5.1.3.2}$$

in [TS 38.214] for DL-SCH PCH, assuming the following:
maximum number of layers for one TB for DL-SCH/PCH is given by the minimum of X and 4, where
if the higher layer parameter maxMIMO-Layers of PDSCH-ServingCellConfig of the -continued serving cell is configured, X is given by that parameter
otherwise, X is given by the maximum number of layers for PDSCH supported by the
UE for the serving cell
if the higher layer parameter mcs-Table given by a pdsch-Config for at least one DL BWP
of the serving cell is set to 'qam1024', maximum modulation order $Q_m = 10$ is assumed for
DL-SCH; else if the higher layer parameter mcs-Table given by a pdsch-Config for at least
one DL BWP of the serving cell is set to 'qam256', maximum modulation order $Q_m = 8$
is assumed for DL-SCH; otherwise a maximum modulation order $Q_m = 6$ is assumed for
DL-SCH;

If 1024 QAM is also allowed in uplink of the wireless communication system, a maximum modulation order configured for the serving cell for applying of PUSCH-LBRM is configured as follows.

[Modulation order configuration for PUSCH-LBRM]

A maximum modulation order for a UL-SCH is assumed as $Q_m=10$ in case that mcs-TableTransformPrecoder or parameter mcs-Table included in higher layer signaling pusch-Config or configuredGrantConfig for one or more BWPs of the serving cell is configured to gam1024, the maximum modulation order for the UL-SCH is assumed as $Q_m=8$ in case that mcs-TableTransformPrecoder or parameter mcs-Table included in higher layer signaling pusch-Config or configuredGrantConfig for one or more BWPs of the serving cell is configured to gam256, and the maximum modulation order for the DL-SCH is assumed as $Q_m=6$ in other cases.

The case may also be expressed as:

"if the higher layer parameter mcs-Table or mcs-TableTransformPrecoder given by pusch-Config or configuredGrantConfig for at least one UL BWP of the serving cell is set to 'qam1024', maximum modulation order $Q_m=$ 10 is assumed for UL-SCH; else if the higher layer parameter mcs-Table or mcs-TableTransformPrecoder given by pusch-Config or configuredGrantConfig for at least one UL BWP of the serving cell is set to 'qam256', maximum modulation order $Q_m=$ 8 is assumed for UL-SCH; otherwise a maximum modulation order $Q_m =$6 is assumed for UL-SCH"

Therefore, modified PUSCH-LBRM procedures may be summarized as follows:

Embodiment 8

If support of 1024 QAM is allowed in the 5G NR system, another example of an operation additionally required in a terminal or a base station may include receiving a phase tracking reference signal (PT-RS). The embodiment proposes a method for determining a PT-RS-related parameter by a base station and a terminal for PT-RS transmission and reception. In other words, the base station and the terminal determine PT-RS-related parameters, based on the methods of the embodiments, and perform an appropriate PT-RS transmission and reception operation based on the parameters.

The base station maps the PT-RS to physical resources via the following procedures to transmit a PT-RS for a PDSCH during initial transmission or retransmission.

First, for PT-RS mapping, the terminal assumes that the PT-RS exists only in a resource block used for the corresponding PDSCH (the same even for a PUSCH PT-RS). In case that the PT-RS exists, the terminal assumes that the The bit sequence after encoding $d_0, d_1, \ldots, d_{N-1}$ from Clause 5.3.2 is written into a circular
buffer of length $N_{cb}$ for the r-th coded block, where N is defined in Clause 5.3.2.
For the r-th code block, let $N_{cb} = N$ if $I_{LBRM} = 0$ and $N_{cb} = \min(N, N_{ref})$ otherwise, where $$N_{ref} = \left\lfloor \frac{TBS_{LBRM}}{C \cdot R_{LBRM}} \right\rfloor,$$   $R_{LBRM} = 2/3$, $TBS_{LBRM}$ is determined according to Clause 6.1.4.2 in [TS 38.214] for UL-SCH, assuming the following:
    maximum number of layers for one TB for UL-SCH is given by X, where
        if the higher layer parameter maxMIMO-Layers of PUSCH-ServingCellConfig of the
        serving cell is configured, X is given by that parameter
        elseif the higher layer parameter maxRank of pusch-Config of the serving cell is
        configured, X is given by the maximum value of maxRank across all BWPs of the
        serving cell
        otherwise, X is given by the maximumnumber of layers for PUSCH supported by the
        UE for the serving cell
    if the higher layer parameter mcs-Table or mcs-Table Transform Precoder given by pusch-
    Config or configuredGrantConfig for at least one UL BWP of the serving cell is set to
    'qam1024', maximum modulation order $Q_m = 10$ is assumed for UL-SCH; else if the
    higher layer parameter mcs-Table or mcs-TableTransformPrecoder given by pusch-Config
    or configuredGrantConfig for at least one UL BWP of the serving cell is set to 'qam256',
    maximum modulation order $Q_m = 8$ is assumed for UL-SCH; otherwise a maximum
    modulation order $Q_m = 6$ is assumed for UL-SCH PDSCH PT-RS is scaled by $\beta_{PT-RS,i}$. Here, $\beta_{PT-RS,i}$ refers to a factor for following a transmission power defined according to the standard in case that the PT-RS port associated with the corresponding PDSCH is scheduled (UE may assume the PDSCH PT-RS is scaled by a factor $\beta_{PT-RS,i}$ to conform with the transmission power specified in a standard (e.g., TS 38.214).), which is as follows.

If the UE is configured by higher layer parameter epre-Ratio, ratio $\beta_{PT-RS,i}$ of a PT-RS EPRE to a PDSCH EPRE per layer and per RE for the PT-RS port (the ratio of PT-RS EPRE to PDSCH EPRE per layer per RE for PT-RS port) is given as shown in [Table 34] according to an epre-Ratio value. In addition, PT-RS scaling factor $\beta_{PT-RS,i}$ is determined as $\beta_{PT-RS,i}=10^{\rho PTRS/20}$. (*EPRE: Energy per resource element)

If the UE is not configured by higher layer parameter epre-Ratio, the UE assumes the epre-Ratio value to be state "0", and determines $\rho_{FTRS}$ and $\beta_{PT-RS,i}$, based on Table 34

TABLE 34

PT-RS EPRE to PDSCH EPRE per layer per RE ($\rho_{PTRS}$)

| | The number of PDSCH layers | | | | | |
|---|---|---|---|---|---|---|
| epre-Ratio | 1 | 2 | 3 | 4 | 5 | 6 |
| 0 | 0 | 3 | 4.77 | 6 | 7 | 7.78 |
| 1 | 0 | 0 | 0 | 0 | 0 | 0 |
| 2 | | | | reserved | | |
| 3 | | | | reserved | | |

In case that the following two conditions (PT-RS condition 1) and (PT-RS condition 2) are satisfied, the PT-RS is mapped to resource element (k,l), based on the following relational expression:

$$a_{k,l}^{(p,\mu)} = \beta_{PT-RS,i} \cdot r_k = \beta_{PT-RS,i} \cdot r(2m+k').$$

However, $r_k$ indicates a PT-RS for subcarrier k and $r_k = r$ (2m+k'). In TS38.211 which is the 5G NR standard, r(2m+k) indicates a DM-RS for subcarrier k and position $l_0$.

(PT-RS condition 1): Value 1 corresponds to a value in OFDM symbols allocated for PDSCH transmission. (l is within the OFDM symbols allocated for the PDSCH transmission)

(PT-RS condition 2]: The resource element (k,l) is not used for a DM-RS, an NZP CSI-RS (however, an NZP CSI-RS configured for mobility measurement or in which parameter resourceType of corresponding higher layer signaling CSI-ResourceConfig is configured to "aperiodic" is excluded), a ZP CSI-RS, SS/PBCH blocks, and a detected PDCCH. Alternatively, the resource element may correspond to a resource element declared as "not available" according to the PDSCH resource mapping scheme of 3GPP standard TS 38.214.

A set of time indexes l relative to a start point of PDSCH allocation is defined as follows (for reference, if transform precoding is disabled, a set of time indices relative to a starting point of PUSCH allocation is also defined in the same way).

[Procedure of time index determination for PT-RS]

1. set i = 0 and $l_{ref}$
2. if any symbol in the interval max($l_{ref}$ + (i − 1)$L_{PT-RS}$ + 1,$l_{ref}$),...,$l_{ref}$ + i$L_{PT-RS}$ overlaps with a symbol used for DM-RS,
   - set i = 1,
   - set $l_{ref}$ to the symbol index of the DM-RS symbol in case of a single-symbol DM-RS and to the symbol index of the second DM-RS symbol in case of a double-symbol DM-RS.
   - repeat from step 2 as long as $l_{ref}$ + i$L_{PT-RS}$ is inside the PDSCH allocation
3. add $l_{ref}$ + i$L_{PT-RS}$ to the set of time indices for PT-RS.
4. increment i by one.
5. repeat from step 2 above as long as $l_{ref}$ + i$L_{PT-RS}$ is inside the PDSCH allocation.

where $L_{PT-RS} \in \{1, 2, 4\}$.

In the procedure, a $L_{FT-RS} \in \{1, 2, 4\}$ value may be determined by PT-RS transmission/reception to be described later.

For the purpose of PT-RS mapping, resource blocks allocated for PDSCH transmission are numbered from 0 to $N_{RB}$-1 from a lowest (ordered) scheduled resource block to a highest (ordered) scheduled resource block. In this set of resource blocks, corresponding subcarriers are numbered from 0 to $$N_{sc}^{RE} N_{RB} - 1$$

in an increasing order starting from a lowest (ordered) frequency. The subcarriers are determined by the following indexes, wherein the UE assumes that the PT-RS is mapped to the subcarriers (for reference, in case that transform precoding is disabled, PUSCH transmission is determined also in the same manner):

$$k = k_{ref}^{RE} + \left(i K_{PT-RS} + k_{ref}^{RB}\right) N_{sc}^{RB},$$

$$k_{ref}^{RB} = \begin{cases} n_{RNTI} \bmod K_{PT-RS} & \text{if } N_{RB} \bmod K_{PT-RS} = 0, \\ n_{RNTI} \bmod (N_{RB} \bmod K_{PT-RS}) & \text{otherwise.} \end{cases}$$

where, i=0, 1, 2, . . . .

$$k_{ref}^{RE}$$

is a value determined by [Table 35-1] for a DM-RS port related to the PT-RS port. However, in case that parameter resourceElementOffset of higher layer signaling PTRS-DownlinkConfig is not configured, values of a column corresponding to "offset00" in [Table 35-1] should be used.

$n_{RNTI}$ is an RNTI associated with DCI via which transmission has been scheduled using C-RNTI, CS-RNTI, MCS-C-RNTI, or SP-CSI-RNTI, or is CS-RNTI in a case of a configured grant.

$N_{RB}$ is the number of scheduled resource blocks.

$K_{PT-RS} \in \{2,4\}$, and this may be determined by PT-RS transmission/reception to be described later.

TABLE 35-1 parameter $k_{ref}^{RE}$

| DM-RS antenna port | DM-RS Configuration type 1 resourceElementOffset | | | | DM-RS Configuration type 2 resourceElementOffset2 | | | |
|---|---|---|---|---|---|---|---|---|
| p | offset00 | offset01 | offset10 | offset11 | offset00 | offset01 | offset10 | offset11 |
| 1000 | 0 | 2 | 6 | 8 | 0 | 1 | 6 | 7 |
| 1001 | 2 | 4 | 8 | 10 | 1 | 6 | 7 | 0 |
| 1002 | 1 | 3 | 7 | 9 | 2 | 3 | 8 | 9 |
| 1003 | 3 | 4 | 9 | 11 | 3 | 8 | 9 | 2 |
| 1004 | — | — | — | — | 4 | 5 | 10 | 11 |
| 1005 | — | — | — | — | 5 | 10 | 11 | 4 |

For reference, in case that transform precoding is disabled, [Table 35-2] is used for a $k_{ref}^{RE}$ value for PUSCH transmission.

If parameter timeDensity in higher layer signaling PTRS-DownlinkConfig is not configured, the UE assumes that $L_{PT-RS}=1$.

If parameter frequencyDensity in higher layer signaling PTRS-DownlinkConfig is not configured, the UE assumes that $K_{PT-RS}=2$.

TABLE 35-2 parameter $k_{ref}^{RE}$

| DM-RS antenna port ↓ | DM-RS Configuration type 1 resourceElementOffset | | | | DM-RS Configuration type 2 resourceElementOffset2 | | | |
|---|---|---|---|---|---|---|---|---|
| p̄ | offset00 | offset01 | offset10 | offset11 | offset00 | offset01 | offset10 | offset11 |
| 0 | 0 | 2 | 6 | 8 | 0 | 1 | 6 | 7 |
| 1 | 2 | 4 | 8 | 10 | 1 | 6 | 7 | 0 |
| 2 | 1 | 3 | 7 | 9 | 2 | 3 | 8 | 9 |
| 3 | 3 | 4 | 9 | 11 | 3 | 8 | 9 | 2 |
| 4 | — | — | — | — | 4 | 5 | 10 | 11 |
| 5 | — | — | — | — | 5 | 10 | 11 | 4 |

The UE needs to report, based on UE capability at a given carrier frequency during initial transmission or retransmission, a preferred MCS and frequency bandwidth thresholds to the base station with respect to each subcarrier spacing applicable to a data channel at the carrier frequency. In this case, an MCS table corresponding to a maximum modulation order reported to be supportable by the terminal is assumed.

In case that the UE is configured with parameter phaseTrackingRS in higher layer signaling DMRS-DownlinkConfig, 1) Parameters timeDensity and frequencyDensity in higher layer signaling PTRS-DownlinkConfig indicate thresholds ptrs-MCSi (i=1,2,3) and NRB,i (i=0,1) of [Table 36] and [Table 37], respectively.

2) in case that both or even one of additional higher layer parameters timeDensity and frequencyDensity is configured, and RNTI is MCS-C-RNTI, C-RNTI, or CS-RNTI, the UE assumes the presence and pattern of a PT-RS antenna port to be a function of a scheduled bandwidth in a corresponding BWP and a corresponding scheduled MCS of a corresponding codeword, as shown in [Table 36] and [Table 37].

TABLE 36

Time density of PT-RS as a function of scheduled MCS

| Scheduled MCS | Time density $(L_{PT-RS})$ |
|---|---|
| $I_{MCS} < ptrs\text{-}MCS_1$ | PT-RS is not present |
| $ptrs\text{-}MCS_1 \le I_{MCS} < ptrs\text{-}MCS_2$ | 4 |
| $ptrs\text{-}MCS_2 \le I_{MCS} < ptrs\text{-}MCS_3$ | 2 |
| $ptrs\text{-}MCS_3 \le I_{MCS} < ptrs\text{-}MCS_4$ | 1 |

TABLE 37

Frequency density of PT-RS as a function of scheduled bandwidth

| Scheduled bandwidth | Frequency density $(K_{PT-RS})$ |
|---|---|
| $N_{RB} < N_{RB0}$ | PT-RS is not present |
| $N_{RB0} \le N_{RB} < N_{RB1}$ | 2 |
| $N_{RB1} \le N_{RB}$ | 4 |

3) If both additional higher layer parameters timeDensity and frequencyDensity are not configured, and RNTI is MCS-C-RNTI, C-RNTI, or CS-RNTI, the UE assumes that the PT-RS is present with values of $L_{PT-RS}=1$ and $K_{PT-RS}=2$, wherein it is assumed that the PT-RS is not present in the following cases:

a case where an MCS index scheduled from the MCS table of [Table 12] is smaller than 10, a case where an MCS index scheduled from the MCS table of [Table 13] is smaller than 5, a case where an MCS index scheduled from the MCS table of [Table 14] is smaller than 15, a case where the number of scheduled RBs is less than 3, 4) Regardless of whether the additional higher layer parameters timeDensity and frequencyDensity are configured, if RNTI is RA-RNTI, [MsgB-RNTI], SI-RNTI, or P-RNTI, the UE assumes that no PT-RS has been provided.

In case that the system allows application of 1024 QAM, especially, if the MCS table in [Table 29] or [Table 30] is configured, a condition, such as an MCS index scheduled from the MCS table of [Table 29](or [Table 30]) is smaller than 5, may be added to the PT-RS configuration-related condition 3), if the MCS table in [Table 31] is configured, a condition, such as an MCS index scheduled from the MCS table of [Table 31] is smaller than 4, may be added to the condition 3).

In general, the added MCS table may be expressed with the following conditions:

a case where an MCS index scheduled from the MCS table is smaller than a smallest index value among indexes corresponding to modulation order 4

If the UE is not configured by parameter phaseTrackingRS in higher layer signaling DMRS-DownlinkConfig, and in case that at least one of PT-RS time density corresponding parameter $L_{PT-RS}$ of [Table 39] or frequency density corresponding parameter $K_{PT-RS}$ of [Table 40] indicates "PT-RS not present", the UE may consider that PT-RS is not provided.

For the higher layer parameter PTRS-DownlinkConfig, in providing of each parameter ptrs-MCSi, where (i=1,2,3), one value from 0 to 29 is determined in case that the MCS table of [Table 12] or [Table 14] is configured, one value from 0 to 28 is determined in case that the MCS table of [Table 13] is configured, and one value from 0 to 27 is determined in case that the MCS table of [Table 29] or [Table 31] including the 1024 QAM modulation scheme or modulation order 10 is configured. In general, a relationship in which ptrs-MCS$_1 \leq$ptrs-MCS$_2 \leq$ptrs-MCS$_3 \leq$(a lowest index value among reserved fields in the MCS table) is satisfied. However, with respect to [Table 39], a value of ptrs-MCS$_3$ is 29 in case that the MCS table of [Table 12] or [Table 14] is configured, the value of ptrs-MCS$_3$ is 28 in case that the MCS table of [Table 13] is configured, and an $I_{MCS}$ value satisfying a condition of ptrs-MCS$_3 \leq I_{Mcs} \leq$ptrs-MCS$_4$ is always an MCS index available only at retransmission in case that the value of ptrs-MCS$_3$ is 27 when the MCS table of [Table 29] to [Table 31] including the 1024 QAM modulation scheme or modulation order 10 is configured, so that it may be considered that a case where $L_{PT-RS}=1$ does not exist. (Depending on the system, $L_{PT-RS}=1$ may be configured for retransmission.) In the current 5G NR system, information on a value of ptrs-MCS$_4$ is not transferred via higher layer signaling, but, in general, 29 may be assumed and used in case that the MCS table of [Table 12] or [Table 14] is configured, 28 may be assumed and used if the MCS table of [Table 13] is configured, a value of 27 may be assumed and used in case that the MCS table of [Table 27]

to [Table 31] including the 1024 QAM modulation scheme or modulation order 10 is configured when application of 1024 QAM is allowed.

In case that higher layer parameter PTRS-DownlinkConfig indicates that ptrs-MCS$_i$=ptrs-MCS$_{1+i}$ in each time density-related parameter ptrs-MCS$_1$, (i=1,2,3), this indicates that time density value $L_{PT-RS}$ corresponding to ptrs-MCS$_1 < I_{MCS} <$ptrs-MCS$_{1+i}$ is unavailable or disabled. Similarly, higher layer parameter PTRS-DownlinkConfig is determined to be one of values from 1 to 276 in providing of each parameter N$_{RB}$,i (i=0,1), and a case of indicating N$_{RB}$,i=N$_{RB,i+1}$ indicates that frequency density value K$_{PT-RS}$ corresponding to N$_{RB,i} <$N$_{RB} <$N$_{RB,i+1}$ is unavailable or disabled.

In case that a value of L$_P$T-RS is configured to 2 or 4 when the UE receives a PDSCH having an allocation duration of 2 symbols, or in case that the value of $L_{PT-RS}$ is configured to 4 when the UE receives a PDSCH having an allocation duration of 4 symbols, it may be considered that no PT-RS being transmitted.

For configurations of the time density and the frequency density, the UE may apply different configurations according to frequency bands being used. In general, an FR2/A6G band has diffraction/propagation characteristics of frequency worse than those of FR1/B6G, and has relatively strong straightness, and may be thus more susceptible to a phase error. On the other hand, since an FR1/B6G band has better frequency characteristics compared to the FR2/A6G band, the FR1/B6G band may be relatively less sensitive to a phase error. Therefore, when the UE or base station is using the FR2/A6G band, it can be configured to provide higher time density and frequency density compared to FR1/B6G. For example, for the same MCS table configuration and the same MCS index $I_{MCS}$, when a value of $L_{PT-RS}$ configurable for the FR1/B6G band is referred to as $L_{PT-RS}$ (FR1/B6G, $I_{MCS}$), and a value of $L_{PT-RS}$ configurable for the FR2/A6G band is referred to as $L_{PT-RS}$ (FR2/A6G, $I_{MCS}$), ptrs-MCS$_1$, (i=1,2,3) may be configured so that an average value of $L_{PT-RS}$ (FR1/B6G, $I_{MCS}$) is greater than an average value of $L_{PT-RS}$ (FR2/A6G, $I_{MCS}$). In particular, ptrs-MCS$_1$, (i=1,2,3) may be configured so that $L_{PT-RS}$(FR1/B6G, $I_{MCS}$)>$L_{PT-RS}$(FR2/A6G, $I_{MCS}$) is satisfied for any MCS index, and $L_{PT-RS}$ (FR1/B6G, $I_{MCS}$)>$L_{PT-RS}$(FR2/A6G, $I_{MCS}$) is satisfied for at least one MCS index. For another example, ptrs-MCS$_1$, (i=1,2,3) may be configured so that "PT-RS is not present" in the FR1/B6G band, and the value of $L_{PT-RS}$ is configured to at least one of 1, 2, or 4 only for FR2/A6G. For reference, a value of $L_{PT-RS}$ may be determined according to an MCS index, but as described above, the value may also be determined according to configuration/non-configuration of higher layer signaling.

When the UE is receiving a PDSCH for retransmission, in case that the UE is scheduled or configured with an MCS index greater than V, an MCS for PT-RS time density determination may be obtained based on DCI received for the same TB scheduled or configured with an MCS index equal to or smaller than V in initial transmission. For a value of V herein, V=28 may be used in case that the MCS table of [Table 12] or [Table 14] is configured, V=27 may be used if the MCS table of [Table 13] is configured, and V=26 may be used in case that the MCS table of [Table 29] to [Table 31] including the 1024 QAM modulation scheme or modulation order 10 are configured.

In general, as a modulation order increases, a change in performance of a system due to a phase error may become more sensitive. In a case of insufficient performance in phase error tracking caused by an existing time density due to introduction of 1024 QAM, a case where a parameter corresponding to the time density is smaller than 1 (e.g., 0.5, indicating that more PT-RSs are allocated or a PT-RS is allocated more frequently compared to the time intensity of 1) may be additionally defined by introducing ptrs-MCS$_5$ as in [Table 38]. In this case, higher layer parameter PTRS-DownlinkConfig may provide each parameter ptrs-MCS$_1$, (i=1,2,3,4). The time density values in [Table 38] are merely an example, and it is possible to express the values in a more generalized relationship as shown in [Table 38-1], and in [Table 38-1], it may be possible that A, B, C, and D have positive integer values and have a relationship of A>B>C>D. Furthermore, in [Table 38], it may be possible that only at least one value of A, B, C, and D exists, and therefore it may be possible that only at least some values among ptrs-MCS1, ptrs-MCS2, ptrs-MCS3, ptrs-MCS4, and ptrs-MCS5 exist. As shown in [Table 38], in case that at least one of parameter values A, B, C, and D corresponding to the time density (or frequency density) is defined to be a value smaller than 1, since a value of $(i-1)L_{PT-RS}$ or $iL_{PT-RS}$ may not be an integer in [Procedure of time index determination for PT-RS], an additional operation for a PT-RS location may be required. For example, the additional operation may be realized via a method by which a frequency density is substantially increased.

TABLE 38

| Time density of PT-RS as a function of scheduled MCS | |
| --- | --- |
| Scheduled MCS | Time density ($L_{PT-RS}$) |
| $I_{MCS} <$ ptrs-MCS$_1$ | PT-RS is not present |
| ptrs-MCS$_1 \le I_{MCS} <$ ptrs-MCS$_2$ | 4 |
| ptrs-MCS$_2 \le I_{MCS} <$ ptrs-MCS$_3$ | 2 |
| ptrs-MCS$_3 \le I_{MCS} <$ ptrs-MCS$_4$ | 1 |
| ptrs-MCS$_4 \le I_{MCS} <$ ptrs-MCS$_5$ | 0.5 |

TABLE 38-1

| Time density of PT-RS as a function of scheduled MCS | |
| --- | --- |
| Scheduled MCS | Time density ($L_{PT-RS}$) |
| $I_{MCS} <$ ptrs-MCS$_1$ | PT-RS is not present |
| ptrs-MCS$_1 \le I_{MCS} <$ ptrs-MCS$_2$ | A |
| ptrs-MCS$_2 \le I_{MCS} <$ ptrs-MCS$_3$ | B |
| ptrs-MCS$_3 \le I_{MCS} <$ ptrs-MCS$_4$ | C |
| ptrs-MCS$_4 \le I_{MCS} <$ ptrs-MCS$_5$ | D |

In the description above, a PT-RS for a PDSCH has been described for convenience, but a similar operation may be applied to a PUSCH PT-RS. The embodiments of the disclosure may be similarly applied to not only a PDSCH but also a PUSCH, even without being specifically mentioned. However, in a case of PUSCH PT-RS, the above operations may be performed similarly based on parameter phaseTrackingRS in higher layer signaling DMRS-UplinkConfig, parameters timeDensity and frequencyDensity included in higher layer signaling PTRS-UplinkConfig, and whether transform precoding is enabled/not-enabled.

Unlike PDSCH PT-RS transmission/reception or PUSCH PT-RS transmission/reception of a case where transform precoding is disabled, a PUSCH PT-RS may require an additional operation when transform precoding is enabled.

In 5G NR, in case that transform precoding is enabled, a time density of a PUSCH PT-RS is configured to $L_{PT-RS}=2$ by higher layer parameter timeDensityTransformPrecoding, otherwise, the UE considers $L_{PT-RS}=1$. In addition, PT-RS $r_m$(m') to be mapped to position m before transform precoding is generated as follows (wherein, m is a value dependent on the number $$N_{group}^{PT-RS}$$

of PT-RS groups, the numbers $$M_{sc}^{PUSCH} \text{ and } N_{samp}^{group}$$

of samples per PT-RS group (Scheduled bandwidth for uplink transmission, expressed as a number of subcarriers)):

$$r_m(m') = w(k') \frac{\exp\left(i\frac{\pi}{2} * m \bmod 2\right)}{\sqrt{2}} [(1 - 2c(m')) + i(1 - 2c(m'))],$$

$$m' = N_{samp}^{group} s' + k', \; s' = 0, 1, \ldots, N_{group}^{PT-RS} - 1,$$

$$k' = 0, 1, \ldots, N_{samp}^{group} - 1$$

Here, c(i) indicates a pseudo-random sequence determined according to the standard, and w(i) indicates a value obtained from an orthogonal sequence as shown in Table 39.

TABLE 39

| Orthogonal sequence w(i) | | |
| --- | --- | --- |
| $n_{RNTI} \bmod N_{samp}^{group}$ | $N_{samp}^{group} = 2$ | $N_{samp}^{group} = 4$ |
| | ↓ | ↓ |
| | [w(0) : w(1)] | [w(0)  w(1)  w(2)  w(3)] |
| 0 | [+1 +1] | [+1 +1 +1 +1] |
| 1 | [+1 −1] | [+1 −1 +1 −1] |
| 2 | — | [+1 +1 −1 −1] |
| 3 | — | [+1 −1 −1 +1] |

Sequence $r_m$(m') generated as such is multiplied by scaling factor β', so as to be mapped to multiple $$N_{samp}^{group} N_{group}^{PT-RS}$$

symbols. Here, denotes a size ratio between one of outermost constellation points in a signal constellation for a given modulation scheme (or modulation order) for PUSCH and one of outermost constellation points in a signal constellation for π/2-BPSK. In case that transform precoding is enabled, and the UE is configured with parameter transform-PrecoderEnabled of higher layer signaling PTRS-UplinkConfig, the scaling factor β' is determined based on a scheduled modulation order (or modulation scheme) as shown in [Table 40] below.

TABLE 40

| Scheduled modulation | PT-RS scaling factor ($\beta'$) |
| --- | --- |
| π/2-BPSK | 1 |
| QPSK | 1 |
| 16QAM | $3/\sqrt{5}$ |
| 64QAM | $7/\sqrt{21}$ |
| 256QAM | $15/\sqrt{85}$ |
| 1024QAM | $31/\sqrt{341}$ |

Embodiment 9

Figure 10:
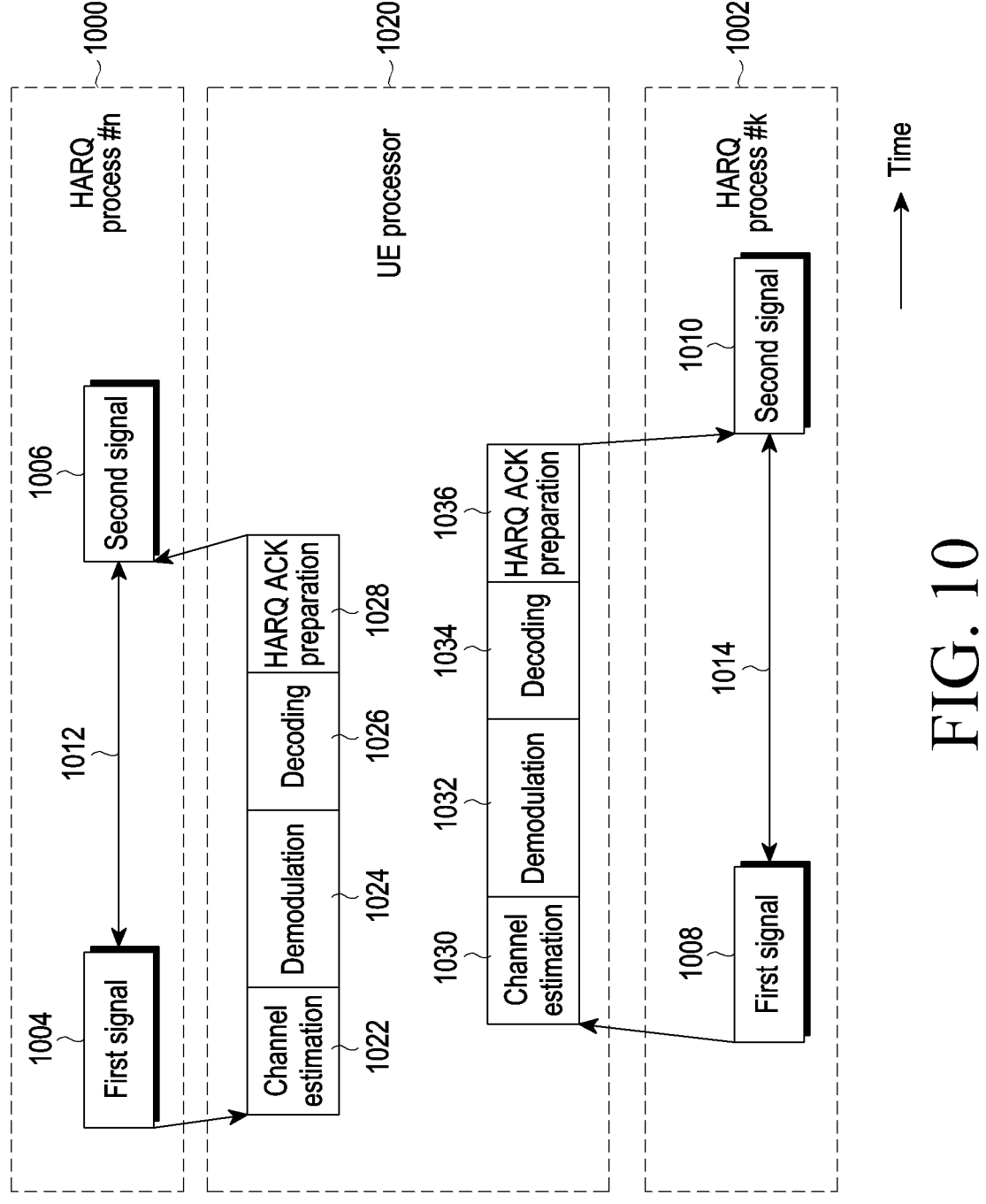
FIG. 10 illustrates processing of a terminal according to generation of multiple HARQ processes in a wireless communication system according to an embodiment of the disclosure.

FIG. 10 is a diagram illustrating terminal processing according to occurrence of multiple HARQ processes in case that a terminal receives a first signal and transmits a second signal corresponding to the first signal in the 5G or NR system according to Embodiment 9.

In particular, Embodiment 9 proposes a method for determining a processing time in case that support of 1024 QAM is allowed in the 5G or NR system.

Referring to FIG. 10, through an n-th HARQ process 1000, a base station and a terminal transmit or receive a first signal 1004, and the terminal and the base station transmit or receive a second signal 1006 corresponding thereto. More specifically, in case that a time interval 1012 between the first signal 1004 and the second signal 1006 is greater than or equal to $T_{proc,1}$ (or $T_{proc,2}$), the second signal is transmitted. Otherwise, the terminal may disregard second signal transmission or may perform invalid second signal transmission.

Through a k-th HARQ process 1002, the base station and the terminal transmit or receive a first signal 1008, and the terminal and the base station transmit or receive a second signal 1010 corresponding thereto. More specifically, in case that a time interval 1014 between the first signal 1008 and the second signal 1010 is greater than or equal to $T_{proc,1}$ (or $T_{proc,2}$), the second signal is transmitted. Otherwise, the terminal may disregard second signal transmission or may perform invalid second signal transmission.

Specifically, terminal processing is required for transmitting or receiving the first and second signals of the n-th and k-th HARQ processes within a terminal processor (UE processor) 1020. For example, a terminal processor necessary when the first signal is downlink data information and the second signal is HARQ-ACK information may include channel estimation, demodulation, decoding, and HARQ-ACK preparation blocks. It may be general for the terminal to use one of respective blocks regardless of the number of HARQ processes. In this situation, the terminal performs channel estimation 1022, demodulation 1024, decoding 1026, and HARQ-ACK preparation 1028 to process the first signal 1004 and the second signal 1006 corresponding thereof the n-th HARQ process. In addition, the terminal performs channel estimation 1030, demodulation 1032, decoding 1034, and HARQ-ACK preparation 1036 to process the first signal 1008 and the second signal 1010 corresponding thereto of the k-th HARQ process.

In the 5G or NR system, the terminal basically processes the first signal and the corresponding second signal in multiple HARQ processes in pipeline operations. That is, respective blocks constituting the terminal processor may operate in parallel for each HARQ process as shown in FIG. 4. However, in this case, channel estimation (or demodulation, decoding, or HARQ ACK preparation) for processing of the first signal 1008 of the k-th HARQ process may not be possible until the channel estimation (or demodulation, decoding, or HARQ ACK preparation) for processing of the first signal 1004 of the n-th HARQ process is completed. The terminal is capable of supporting multiple HARQ processes while using a small amount of resources (e.g., the number or performance of blocks constituting the processor, etc.) through a pipeline operation.

In the 5G or NR system, in case that the base station transmits a PDSCH including downlink data, a $K_1$ value which is a value corresponding to timing information for the terminal to transmit HARQ-ACK information of the PDSCH is indicated through DCI for scheduling the PDSCH. The terminal may transmit the HARQ-ACK information to the base station in case that the HARQ-ACK information having timing advance included therein is not indicated to be transmitted earlier than OFDM symbol $L_1$. That is, with the timing advance included, the HARQ-ACK information may be transmitted from the terminal to the base station at a time point identical to or later than that for OFDM symbol L1. In case that the HARQ-ACK information with the timing advance included therein is indicated to be transmitted earlier than OFDM symbol $L_1$, the HARQ-ACK information may not be valid HARQ-ACK information in the HARQ-ACK transmission from the terminal to the base station. OFDM symbol $L_1$ may be a first OFDM symbol in which cycle prefix (CP) starts after $T_{proc,1}$ from a last time point of a last OFDM symbol of the PDSCH. $T_{proc,1}$ may be calculated as in Equation 3 below.

$$T_{proc,1} = ((N_1 + d_{1,1} + (t_{1,2})(2048 + 144) \cdot \kappa 2^{-\mu}) \cdot T_C \qquad \text{Equation 3}$$

In the aforementioned [Equation 3], $N_1$, $d_{1,1}$, $d_{1,2}$, k, $\mu$, and $T_C$ may be defined as follows.

$N_1$ is based on a value of p presented in [Table 41] and [Table 42], and corresponds to $\mu$ that generates a largest $T_{proc,1}$ among ($\mu_{PDCCH}$, $\mu_{PDSCH}$, $\mu_{UL}$). That is, $\mu$=min ($\mu_{PDCCH}$, $\mu_{PDSCH}$, $\mu_{UL}$). In the aforementioned expressions, $\mu_{PDCCH}$ refers to subcarrier spacing applied to PDCCH scheduling. $\mu_{PDSCH}$ refers to subcarrier spacing applied to a scheduled PDSCH. $\mu_{UL}$ refers to subcarrier spacing of an uplink channel through which HARQ-ACK is transmitted.

In case that HARQ-ACK information is transmitted via a PUCCH (uplink control channel), $d_{1,1}$=0, and in case that HARQ-ACK information is transmitted via a PUSCH (uplink shared channel, data channel), $d_{1,1}$=1.

in case that the terminal is configured with carriers or multiple enabled configuration carriers, a maximum timing difference between carriers may be reflected in the second signal transmission.

For PDSCH mapping type A, that is, in case that a first DMRS OFDM symbol position is a third or a fourth OFDM symbol in a slot, if a position index i of the last OFDM symbol is smaller than 7, $d_{1,2}$=7−i. Otherwise, $d_{1,2}$=0.

For PDSCH mapping type B for UE processing capability 1, that is, in case that the first DMRS OFDM symbol position is the first OFDM symbol of the PDSCH, $d_{1,2}$=3 if the PDSCH has a length of 4 OFDM symbols, and $d_{1,2}$=3+d if the PDSCH has a length of 2 OFDM symbols, where d is the number of OFDM symbols in which the PDSCH and the PDCCH including a control signal for scheduling of the PDSCH overlap. Otherwise, $d_{1,2}$=0.

For PDSCH mapping type B for UE processing capability 2, that is, in case that the first DMRS OFDM symbol position is the first OFDM symbol of the PDSCH, if the PDSCH has a length of 2 or 4 OFDM symbols, $d_{1,2}$ is the number of OFDM symbols in which the PDSCH and the PDCCH including a control signal for scheduling of the PDSCH overlap. Otherwise, $d_{1,2}=0$.

$N_1$ is defined according to p as in [Table 41] or [Table 42] below. $\mu=0$, 1, 2, and 3 refer to subcarrier spacings of 15 kHz, 30 kHz, 60 kHz, and 120 kHz, respectively. [Table 41] shows a PDSCH processing time for UE processing capability 1 (PDSCH processing time for PDSCH processing capability 1), and [Table 42] shows a PDSCH processing time for the UE processing capability 2 (PDSCH processing time for PDSCH processing capability 2).

TABLE 41

| | PDSCH decoding time N1 [symbols] | |
|---|---|---|
| $\mu$ | No additional PDSCH DM-RS configured | Additional PDSCH DM-RS configured |
| 0 | 8 | 13 |
| 1 | 10 | 13 |
| 2 | 17 | 20 |
| 3 | 20 | 24 |

TABLE 42

| | PDSCH decoding time N1 [symbols] | |
|---|---|---|
| $\mu$ | No additional PDSCH DM-RS configured | Additional PDSCH DM-RS configured |
| 0 | 3 | 13 |
| 1 | 4.5 | 13 |
| 2 | 9 for FR 1 | 20 |

The $N_1$ values described above may be used as [Table 41] or [Table 42] according to UE capability.

$T_e=1/(\Delta f_{max} \cdot N_f)$, $\Delta f_{max}=4810^3$ Hz, $N_f=4096$, $\kappa=T_s/T_c=64$, $T_s=1/(\Delta_{ref} \cdot N_{f,ref})$, $\Delta f_{ref}=15 \cdot 10^3$ Hz, $N_{f,ref}=2048$ are defined respectively.

In the 5G or NR system, in case that the base station transmits control information including uplink scheduling approval, the terminal may indicate a $K_2$ value corresponding to timing information for uplink data or PUSCH transmission.

The terminal may transmit the PUSCH to the base station in case that the PUSCH having timing advance included therein is not indicated to be transmitted earlier than OFDM symbol $L_2$. That is, with the timing advance included, the PUSCH may be transmitted from the terminal to the base station at a time point identical to or later than that for OFDM symbol $L_2$. In case that the PUSCH having timing advance included therein is indicated to be transmitted earlier than OFDM symbol $L_2$, the terminal may disregard uplink scheduling grant control information from the base station. OFDM symbol $L_2$ may be a first OFDM symbol in which cycle prefix (CP) of a PUSCH OFDM symbol to be transmitted starts after $T_{proc,2}$ from the last time point of the last OFDM symbol of the PDCCH including a scheduling grant. $T_{proc,2}$ may be calculated as in Equation 4 below.

$$T_{proc,2} = \max\{((N_2 + d_{2,1} + d_{2,2})(2048 + 144) \cdot \kappa 2^{-\mu}) \cdot T_C, d_{2,3}\} \quad \text{Equation 4}$$

In the aforementioned [Equation 4], $N_2$, $d_{2,1}$, $d_{2,2}$, $d_{2,3}$, k, $\mu$, and Tc may be defined as follows.

$N_2$ is based on a value of p presented in [Table 43] and [Table 44], and corresponds to $\mu$ that generates a largest $T_{proc,1}$ among ($\mu_{DL}$, $\mu_{UL}$). That is, $\mu=\min(\mu_{DL}, \mu_{UL})$. In the aforementioned expressions, $\mu_{DL}$ refers to subcarrier spacing in which the PDSCH including DCI for scheduling the PUSCH is transmitted. $\mu_{UL}$ refers to subcarrier spacing of an uplink channel through which the PUSCH is transmitted.

in case that a first OFDM symbol among OFDM symbols allocated to the PUSCH includes only a DMRS, $d_{2,1}=0$, otherwise, $d_{2,1}=1$.

in case that HARQ-ACK is multiplexed in the PUSCH scheduled as described above, $d_{2,2}=1$, and otherwise, $d_{2,2}=0$.

in case that the terminal is configured with carriers or multiple enabled configuration carriers, a maximum timing difference between carriers may be reflected in the second signal transmission.

in case that DCI indicating bandwidth part (hereinafter, BWP) switching is scheduled, $d_{2,3}$ refers to a time required for the BWP switching. Otherwise, $d_{2,3}=0$.

$N_2$ is defined according to p as in [Table 43] or [Table 44] below. $\mu=0$, 1, 2, and 3 refer to subcarrier spacings of 15 kHz, 30 kHz, 60 kHz, and 120 kHz, respectively. [Table 43] is a PUSCH preparation time for UE processing capability 1, and [Table 44] is a PUSCH preparation time for UE processing capability 1 for UE processing capability 2.

TABLE 43

| $\mu$ | PUSCH preparation time (PUSCH preparation time) N2 [symbols] |
|---|---|
| 0 | 10 |
| 1 | 12 |
| 2 | 23 |
| 3 | 36 |

TABLE 44

| $\mu$ | PUSCH preparation time (PUSCH preparation time) N2 [symbols] |
|---|---|
| 0 | 3 |
| 1 | 4.5 |
| 2 | 9 for FR1 |

The $N_2$ values described above may be used as Table 43 or Table 44 according to UE capability.

$T_e=1/(\Delta f_{max} \cdot N_f)$, $\Delta f_{max}=48010^3$ Hz, $N_f=4096$, $\kappa=T_s/T_c=64$, $T_s=1/(\Delta f_{ref} \cdot N_{f,ref})$, $\Delta f_{ref}=15 \cdot 10^3$ Hz, $N_{f,ref}=2048$ are defined respectively.

Since a terminal supporting 1024 QAM needs to process a larger transport block size (TBS) than a terminal supporting 64 QAM or 256 QAM, a slightly more processing time than the minimum terminal processing of existing [Equation 3] or [Equation 4] may be required.

Therefore, [Equation 3] or [Equation 4] may be applied to a terminal supporting 1024 QAM with a modified equation as shown in the following Equation 5 or [Equation 6]

$$T_{proc,1} = ((N_1 + d_{1,1} + d_{1,2} + d_{1,3})(2048 + 144) \cdot \kappa 2^{-\mu}) \cdot T_C \quad \text{Equation 5}$$

$$T_{proc,2} = \quad \text{Equation 6}$$
$$\max\{((N_2 + d_{2,1} + d_{2,2} + d_{2,3})(2048 + 144) \cdot \kappa 2^{-\mu}) \cdot T_C, d_{2,3}\}$$

Most of the variables included in [Equation 5] or [Equation 6] are the same as those described in [Equation 3] or [Equation 4]. In [Equation 5] or [Equation 6], $d_{1,3}$ and $d_{2,3}$ may have 0 or positive integer value d'. As for positive integer value d', a specific value or a set of values may be determined according to terminal capability.

For example, in case that the terminal reports a value of 1 as the UE capability, $d_{1,3}$ or $d_{2,3}$ may have a value of 1. For the terminal capability, $d_{1,3}$ and $d_{2,3}$ may be indicated separately or simultaneously. For values of $d_{1,3}$ and $d_{2,3}$, positive integer values determined according to the UE capability report may always be applied regardless of scheduling, or may be applied only in case that a specific MCS table is applied or a specific MCS value is applied. Alternatively, at least a portion of the combinations thereof may be applied.

For example, in case that an MCS table indicated by a DCI format includes 1024 QAM, the terminal considers $d_{1,3}$ or $d_{2,3}$ to be a positive integer value and in case that an MCS table indicated by a DCI format does not include 1024 QAM, the terminal considers $d_{1,3}$ or $d_{2,3}$ to be 0.

For another example, in case that an MCS value indicated by a DCI format corresponds to 1024 QAM, the terminal considers $d_{1,3}$ or $d_{2,3}$ to be a positive integer value and in case that an MCS value indicated by a DCI format does not correspond to 1024 QAM, the terminal considers $d_{1,3}$ or $d_{2,3}$ to be 0. 1024 QAM is merely an example, and other values having different modulation orders are also sufficiently applicable.

A DCI format for determining $d_{1,3}$ is a DCI format for scheduling of a PDSCH, and a DCI format for determining $d_{2,3}$ is a DCI format for scheduling of a PUSCH. It may be possible that UE capabilities for determining values of $d_{1,3}$ and $d_{2,3}$ exist separately. It may be possible that higher signals for determining values of $d_{1,3}$ and $d_{2,3}$ exist separately. $d_{1,3}$ and $d_{2,3}$ may be applied only if $N_1$ and $N_2$ are configured to respective specific UE processing capability values.

For example, in case that $N_j$ is configured to UE processing capability 2, the terminal applies [Equation 5] including $d_{1,3}$ to a PDSCH processing time, and in case that $N_1$ is not configured to UE processing capability 2, the terminal applies [Equation 3], which is not included in $d_{1,3}$, to the PDSCH processing time, or considers the value of $d_{1,3}$ to be 0 in [Equation 5]. For example, in case that $N_2$ is configured to UE processing capability 2, the terminal applies [Equation 6] including $d_{2,3}$, to a PUSCH preparation time, and in case that $N_2$ is not configured to UE processing capability 2, the terminal applies [Equation 4], which is not included in $d_{2,3}$, to the PUSCH preparation time, or considers the value of $d_{2,3}$ to be 0 in [Equation 6].

Alternatively, limited to [Equation 3] or [Equation 4], in a situation where values of $N_1$ or $N_2$ are configured to UE processing capability 2 by respective higher signals, in case that the MCS table included in the DCI format for scheduling of the PDSCH or PUSCH corresponds to 1024 QAM, or in case that the MCS index indicated by the DCI format is 1024 QAM, the terminal may consider that the values of $N_1$ or $N_2$ fall back to a value associated with UE processing capability 1 rather than a value associated with UE processing capability 2. Alternatively, limited to [Equation 3] or [Equation 4], in a situation where values of $N_1$ or $N_2$ are configured to UE processing capability 2 by respective higher signals, in case that the MCS table configured to the DCI format for scheduling of the PDSCH or PUSCH corresponds to 1024 QAM, the terminal may consider that the values of $N_1$ or $N_2$ fall back to a value associated with UE processing capability 1 rather than a value associated with UE processing capability 2. 1024 QAM is merely an example, and the disclosure is sufficiently applicable to other different modulation order values. For example, in a situation where $\mu=0$, and the terminal has been configured with processing capability 2 for the PDSCH, the terminal considers a value of $N_2$ for calculation of a minimum PDSCH processing time to be 3 as shown in [Table 41]. However, in case that the MCS index value indicated by the DCI format for scheduling of the PDSCH indicates 1024 QAM, the terminal may consider the value of $N_2$ for calculation of the minimum PDSCH processing time to be 8 as shown in [Table 41]. An operation, in which values of $N_1$ or $N_2$ fall back from processing capability 2 to processing capability 1, may be applied by, in addition to the MCS index described above, an MCS table, the size of a scheduled frequency resource area, the size of a scheduled time resource area, an MCS index threshold value, CQI table configuration information, or other specific value in a field within a DCI format, or it may be sufficiently possible that the fallback operation occurs by at least some combinations of the contents described above.

Otherwise, fall back is not performed. Some of the aforementioned variables in [Equation 3] to [Equation 6] may not exist or may be applied by being replaced with other terms. In summary, regardless of UE processing time capability according to an MCS index value or an MCS index table indicated by a higher signal or a DCI format (or limited to specific UE processing time capability), it may be possible that the terminal considers or does not consider a processing time margin value, such as $d_{1,3}$. and $d_{2,3}$, as shown in [Equation 5] or [Equation 6]. The processing time margin value may be a value previously reported by the UE capability or may always be considered to be a fixed value, such as 1.

Alternatively, limited to UE processing time capability according to an MCS index value or an MCS index table indicated by a higher signal or a DCI format, it may be possible that the terminal considers or does not consider a processing time margin value, such as $d_{1,3}$ and $d_{2,3}$, as shown in [Equation 5] or [Equation 6]. The processing time margin value may be a value previously reported by the UE capability or may always be considered to be a fixed value, such as 1.

Based on Embodiment 9, the terminal may have different processing times according to different MCS tables or MCS values having different modulation or code rates. As such, the base station may provide the terminal with an appropriate processing preparation time.

Embodiment 10

The embodiment proposes a method for determining a TBS in case that 1024 QAM is applied to a wireless communication system.

As for j-th serving cell, in case that parameter processingType2Enabled of higher layer signaling PDSCH- ServingCellConfig is configured to be "enabled" or an MCA table corresponding to 1024 QAM is configured and at least one MCS index $I_{MCS}$ for a specific PDSCH is indicated to be larger than 26, a UE may not handle PDSCH transmission corresponding thereto if the following conditions are not satisfied:

$$\frac{\sum_{m=0}^{M-1}}{L \times T_s^\mu} \le DataRateCC$$

Here, L indicates the number of symbols assigned to the corresponding PDSCH, M indicates $$T_s^\mu = \frac{10^{-3}}{2^\mu \cdot N_{symb}^{slot}}$$

which is the number of TS(s) in the corresponding PDSCH (m: numerology of the corresponding PDSCH), and $$V_{im} = C' \cdot \left\lfloor \frac{A}{C} \right\rfloor$$

for m-th TB is a value determined by the number A of bits included in the corresponding TB, the number C of code blocks corresponding to the corresponding TB, and the number C' or code blocks scheduled for the corresponding TB. In addition, DataRateCC [Mbps] is a value obtained by calculating the maximum data rate for one carrier in the frequency band of the serving cell for any signaled band combination and feature set consistent with the serving cell, and a value thereof is determined based on [Equation 2] and a scaling factor f(i).

In other words, in case that the number of TBS or PDSCH symbols is configured to be higher than the maximum data rate that may be calculated according to a predetermined method, there is a high possibility that data decoding fails due to too high coding rate, and this means that the UE may omit the demodulation process or perform the demodulation process on the corresponding received signal but a part or all of the data recovery process may be omitted, such as omitting the data decoding process such as LDPC decoding. However, in [Equation 2], although it is configured that Rmax=948/1024, decodable code rate may be different according to the basic graph (or basic matrix) BG(1) and BG(2) used for LDPC encoding and decoding in 5G NR, and thus as for the Rmax=948/1024 value, different values according to BG(1) and BG(2) may be applied depending on the system. (For example, the Rmax value for BG(1) may be configured to be higher than the Rmax value for BG(2).)

The (approximated) maximum data rate for the serving cell may be determined as the maximum value of the (approximated) maximum data rate calculated using [Equation 2] according to each supported band or band combination. In addition, with respect to a single carrier-based 5G NR standalone (SA) operation, the UE may configure each parameter so that the data rate for the carrier is J=1 CC and a value of $$v_{Layers}^{(j)} \cdot Q_m^{(j)} \cdot f^{(j)}$$

is not less than 4 so as not to be less than the data rate calculated through [Equation 2].

However, if the maximum modulation order that may be supported in the wireless communication system is 8 (that is, $$Q_m^{(j)} = 8$$

), in case that the scaling factor $f^{(j)}$ is configured to be 0.4, a case in which $$v_{Layers}^{(j)}$$

is 2 or more satisfies the conditions when considering $$v_{Layers}^{(j)} \cdot Q_m^{(j)} \cdot f^{(j)} = v_{Layers}^{(j)} \times 3.2 \ge 4.$$

That is, the wireless communication system does not need to support any PDSCH or PUSCH data transmission/reception corresponding to a combination of $$\left( v_{Layers}^{(j)}, f^{(j)} \right) = (1, 0.4),$$

or does not need to support any PDSCH or PUSCH data transmission/reception for supporting data rates determined based on a combination of $$\left( v_{Layers}^{(j)}, f^{(j)} \right) = (1, 0.4).$$

However, even if $f^{(j)}$ is configured to be 0.4 in the system supporting 1024 QAM, it is possible to support $$v_{Layers}^{(j)} = 1 \text{ from } v_{Layers}^{(j)} \cdot Q_m^{(j)} \cdot f^{(j)} = v_{Layers}^{(j)} \times 10 \times 0.4 \ge 4,$$

and therefore, in case that CQI or MCS tables capable of supporting 1024 QAM, such as the CQI tables of [Table 30] and the MCS tables of [Table 31] to [Table 34] are configured, there exists a case in which PDSCH or PUSCH data transmission/reception supports the combination of $$\left( v_{Layers}^{(j)}, f^{(j)} \right) = (1, 0.4)$$

or data rates larger than or equal to the (maximum) data rate determined based on the combination.

More specifically, with respect to the single carrier-based 5G NR standalone (SA) operation, the terminal and the base station may transmit or receive PDSCH or PUSCH data corresponding to a $$\left( v_{Layers}^{(j)}, Q_m^{(j)}, f^{(j)} \right) = (1, 10, 0.4)$$

combination or transmit or receive PDSCH or PUSCH data supporting a data rate larger than or equal to a data rate determined based on a $$\left(v_{Layers}^{(j)}, Q_m^{(j)}, f^{(j)}\right) = (1, 10, 0.4)$$

combination.

Of course, a case that the wireless communication system supports 1024 QAM (or a case that an MCS table supporting 1024 QAM is configured) means a special situation in which the channel environment is very good and it is possible to configure different conditions for the $$v_{Layers}^{(j)}, Q_m^{(j)}, f^{(j)}$$

value. For example, in the system allowing a case in which the $$Q_m^{(j)}$$

value is 10, a base value of 4 or greater is configured to the $$v_{Layers}^{(j)} \cdot Q_m^{(j)} \cdot f^{(j)} \text{ value or } v_{Layers}^{(j)} \text{ or } f^{(j)}$$

values may be delimited. For example, it may delimit not to configure a combination such as $$\left(v_{Layers}^{(j)}, f^{(j)}\right) = (1, 0.4).$$

In the wireless communication system, by transmitting a TB having an appropriate TBS in a range that does not exceed the maximum data rate supportable for each UE as described above, the decoding success rate probability may be increased and as a result, unnecessary retransmission may be minimized.

In case that the higher layer maxNrofCodeWordsScheduledByDC indicates that two code word transmission is "enabled", if one of two TBs is configured with (IMCS=26, rvid=1) by DCI format 1_1, the corresponding TB is "disabled". As such, excluding the case in which the TB is "disabled" by DCI format 1_1, a TBS needs to be determined for data transmission/reception through a PDSCH allocated by a PDCCH with DCI format 1_0, format 1_1, or format 1_2 corresponding to a CRC scrambled by C-RNTI, MCS-C-RNTI, TC-RNTI, CS-RNTI, or SI-RNTI.

The TBS is determined based on $N_{RE}$ which is the total number of REs allocated to the PDSCH or PUSCH, Qm determined from MCS information of initial transmission, R, v which is the number of layers to be used. Accordingly, limited to the cases in which the maximum modulation order has an IMCS value of 0 or more and 28 or less when the CQI or MCS table corresponding to 64QAM is configured, the maximum modulation order has an IMCS value of 0 or more and 27 or less when the CQI or MCS table corresponding to 256QAM is configured, and the maximum modulation order as shown in [Tables 31] to [Table 34] has an IMCS value of 0 or more and 26 or less when the CQI or MCS table corresponding to 1024QAM is configured, the TBS is determined based on QM and R values corresponding to the MCS index First, the base station or the terminal determine the number $$N_{RE}'$$

of REs allocated with respect to a PDSCH (or PUSCH) in one PRB to be $$N_{RE}' = N_{sc}^{RB} \cdot N_{symb}^{sh} - N_{DMRS}^{PRB} - N_{oh}^{PRB}.$$

(Here, $$N_{sc}^{RB}$$

indicates the number (e.g., 12) of subcarriers included in one RB, $$N_{symb}^{sh}$$

indicates the number of OFDM symbols allocated to a PDSCH (or PUSCH), $$N_{DMRS}^{PRB}$$

indicates the number of REs in one PRB, which are occupied by a demodulation reference signal (DMRS) of a code division multiplexing (CDM) group, and $$N_{oh}^{PRB}$$

indicates the number (e.g., configured to one of 0, 6, 12, 18) of REs occupied by overhead in one PRB configured by higher signaling (e.g., xOverhead in PDSCH-ServingCellConfig or xOverhead in PUSCH-ServingCellConfig). Thereafter, $N_{RE}$, the total number of REs allocated to the PDSCH (or PUSCH) is determined as follows:

$$N_{RE} = \min(156, N_{RE}') \cdot n_{PRB} \cdot n_{PRB}$$

indicates the number of PRB allocated to the terminal. The TBS value is determined based on the temporary information bit number $N_{info} = N_{RB} \cdot Q_m \cdot R \cdot v$.

In case that the maximum modulation order is configured to have an IMCS value of 27 or more and 31 or less when the CQI or MCS table corresponding to 1024 QAM is configured as shown in [Tables 31] to [Table 34], the TBS may be determined based on the DCI transported in the latest PDCCH with respect to the same TB in which IMCS values are configured to be 0 to 26. In case that a PDCCH for the same TB configured with a value of 0 to 26 or less does not exist and an initial PDSCH for the same TB is semi-persistently scheduled, the TBS is determined based on the most recent semi-persistent scheduling assignment PDCCH.

Similarly, in case that the maximum modulation order is configured with an IMCS value of 28 or more and 31 or less when the CQI or MCS table with 256 AQM is configured, and the maximum modulation order is configured with an IMCS value of 29 or more and 31 or less when the CQI table or MCS table with 646 QAM is configured, the TBS for each case may be determined based on the DCI transported in the latest PDCCH with respect to the same TB configured with an IMCS value of 0 to 27 or less or the same TB configured with an IMCS value of 0 to 28 or less. In case that a PDCCH for the same TB configured with a value of 0 to 27 or less or 0 to 28 or less does not exist and an initial PDSCH for the same TB is semi-persistently scheduled, the TBS is determined based on the most recent semi-persistent scheduling assignment PDCCH.

Embodiment 11

In case that a wireless communication system supports 1024 QAM, it needs to be indicated whether a UE is capable of supporting 1024 QAM. For example, in 5G NR, by using parameter pdsch-1024QAM-FR1 only for FR1 for each UE of Phy-Parameters among physical layer parameters, it is possible to indicate whether the UE supports 1024 QAM for a PDSCH for the FR1. In addition, by using the parameter pdsch-1024QAM-FR2 only for FR2 for each band of the BandNR parameters, it is possible to indicate whether the UE supports 1024QAM for the PDSCH for FR2.

By using parameter supportedModulationOrderDL for each FSPC of FeatureSetDownlinkPerCC, it is possible to indicate the maximum modulation order to be applied to downlink with respect to a carrier for calculating a (approximated) maximum data rate based on [Equation 2] and [Embodiment 10]. In case that the parameter is included, in the corresponding serving cell, a modulation order larger than (or equal to or larger than) the indicated value in this field may be applied. (Limited to a case in which the UE supports the corresponding modulation order for downlink.)

In case that the parameter is not included,

For FR1, the network may use the modulation order indicated in pdsch-256QAM-FR1 or pdsch-1024QAM-FR1.

For FR2, the network may use a modulation order indicated for each band. Here, the modulation order indicated for each band means the value when pdsch-256QAM-FR2 or pdsch-1024QAM-FR2 is signaled, and modulation order 6, that is, 64-QAM is used when it is not signaled in a given band.

As for the PUSCH, in case that 1024 QAM is supported, indication may be performed by using parameter pusch-1024QAM for each band of BandNR parameters in the same manner. Furthermore, by using parameter supportedModulationOrderUL for each FSPC of FeatureSetUplinkPerCC, it is possible to indicate the maximum modulation order to be applied to uplink with respect to a carrier for calculating a (approximated) maximum data rate based on [Equation 2] and [Embodiment 10]. In case that the parameter is included, in the corresponding serving cell, a modulation order larger than (or equal to or larger than) the indicated value in this field may be applied. (Limited to a case in which the UE supports the corresponding modulation order for uplink.)

In case that the parameter is not included,

For FR1/FR2, the network may use a modulation order indicated for each band. Here, the modulation order indicated for each band means the value when pusch- 256QAM or pusch-1024QAM is signaled, and modulation order 6, that is, 64-QAM is used when it is not signaled in a given band.

For reference, FSPC indicates that it is signaled per feature set and per component carrier (per CC per band per band combination).

FIG. 8 illustrates a flowchart of a method for a terminal to calculate a transport block size (TBS) by using a CQI and MCS table according to an embodiment of the disclosure. FIG. 8 exemplifies an operation method of the terminal 120 shown in FIG. 1 and in FIG. 3.

Referring to FIG. 8, a base station (e.g., the base station 110 shown in FIG. 1 and FIG. 2) may perform radio resource control (RRC) signaling for a terminal in consideration of a service to be provided to the terminal (that is, the base station transmits an RRC message to the terminal).

Referring to FIG. 8, in step 801, the terminal may receive (or process) an RRC configuration based on the RRC signaling provided from the base station. In step 803, the terminal may acquire a code rate and a modulation order as references, based on the RRC configuration received (or processed) in step 801.

In step 805, the terminal may adjust the code rate in case that a service defined in the RRC configuration is different from a service as a reference. In this case, although, information itself for adjusting the code rate may be indicated as RRC signaling, a BLER value or other parameters differentiated according to services may be indicated. A specific method for obtaining (or determining) a code rate and a modulation order, and a method for adjusting a code rate follows various embodiments (Embodiments 1 to 9) of the disclosure.

In step 807, the terminal may calculate the TBS using the code rate adjusted in step S805.

FIG. 9 illustrates a flowchart of another method for a terminal to calculate a transport block size (TBS) by using a CQI and MCS table according to an embodiment of the disclosure. FIG. 9 exemplifies an operation method of the terminal 120 shown in FIG. 1 and in FIG. 3.

Referring to FIG. 9, a base station (e.g., the base station 110 shown in FIG. 1 and FIG. 2) may perform radio resource control (RRC) signaling for a terminal in consideration of a service to be provided to the terminal (that is, the base station transmits an RRC message to the terminal).

Referring to FIG. 9, in step 901, the terminal may receive (or process) an RRC configuration based on the RRC signaling provided from the base station. In step 903, the terminal may acquire (or determine) a code rate and a modulation order as references, based on the RRC configuration received (or processed) in step 901.

In step 905, the terminal may adjust the code rate in case that a service defined in the RRC configuration is different from a service as a reference. In this case, although, information itself for adjusting the code rate may be indicated as RRC signaling, a BLER value or other parameters differentiated according to services may be indicated.

A specific method for obtaining (or determining) a code rate and a modulation order, and a method for adjusting a code rate follows various embodiments (Embodiments 1 to 9) of the disclosure.

In step 907, the terminal may feedback a channel state based on the code rate adjusted in step 905.

In some embodiments, the base station 110 and the terminal 120 may perform communication by using at least one of wireless communication and wired communication.

Figure 11:
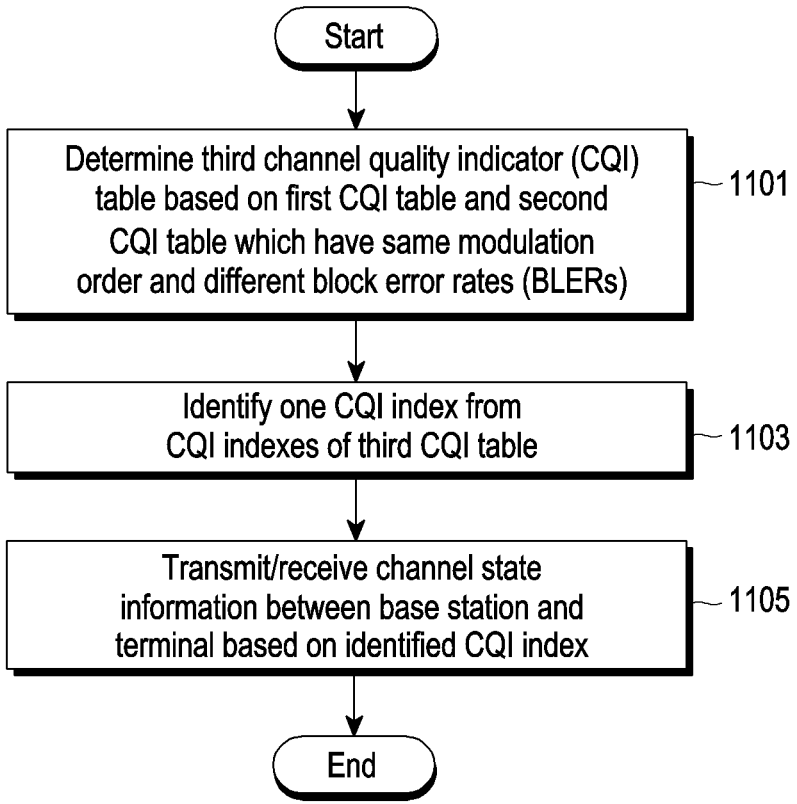
FIG. 11 illustrates a method for transmitting and receiving channel state information between a terminal and a base station in a wireless communication system according to an embodiment of the disclosure.

FIG. 11 illustrates a method for transmitting and receiving channel state information between a terminal and a base station in a wireless communication system according to an embodiment of the disclosure.

Referring to FIG. 11, in step 1101, the base station and the terminal may determine (or generate) a third channel quality indicator (CQI) table based a first CQI table and a second CQI table that have the same modulation order and different block error rates (BLER).

In step 1103, the base station or the terminal may identify one CQI index from among the CQI indexes of the third CQI table.

In step 1105, the base station and the terminal may transmit and receive channel state information between the base station and the terminal based on the identified CQI index.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, it will be apparent that various modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method for a user equipment (UE) to receive a phase tracking reference signal (PT-RS) in a wireless communication system, the method comprising:

determining, through higher layer signaling, whether at least one of a first parameter related to a time density of the PT-RS and a second parameter related to a frequency density of the PT-RS is configured for the UE, wherein the first parameter indicates three threshold values for a PTRS-modulation and coding scheme (MCS) and the second parameter indicates two threshold values for a bandwidth;

in case that the first parameter is configured through the higher layer signaling, determining that the PT-RS is not present or a first value corresponding to the time density based on at least one of the first parameter, a highest threshold value for the PTRS-MCS, and a scheduled MCS;

in case that the second parameter is configured through the higher layer signaling, determining that the PT-RS is not present or a second value corresponding to the frequency density based on the second parameter and a scheduled bandwidth;

and in case that neither the first parameter nor the second parameter is configured for the UE, 1024 QAM is applied to the wireless communication system, and a scheduled MCS is smaller than a smallest index value among indexes corresponding to modulation order 4 in an MCS table, determining that a base station does not transmit the PT-RS, wherein the highest threshold value for the PTRS-MCS is assumed to be 27 in case that the 1024 QAM is applied to the wireless communication system.

2. The method of claim 1, further comprising:

receiving, from the base station through the higher layer signaling, PT-RS downlink configuration information (PTRS-DownlinkConfig) comprising the first parameter and the second parameter.

3. The method of claim 2, wherein the PT-RS downlink configuration information comprises a plurality of parameters related to the time density of the PT-RS, and in case that the MCS table corresponding to the 1024 QAM is configured, each of the plurality of parameters is configured to be an integer value from 0 to 27.

4. The method of claim 1, in case that an MCS scheduled based on the first parameter belongs to a first range, the first value corresponding to the first range is determined, and in case that a bandwidth scheduled based on the second parameter belongs to a second range, the second value corresponding to the second range is determined.

5. The method of claim 1, wherein the MCS table corresponding to the 1024 QAM comprises modulation and code rate combinations of (1024QAM, 805.5/1024), (1024QAM, 853/1024), (1024QAM, 900.5/1024), and (1024QAM, 948/1024).

6. The method of claim 1, further comprising:

in case that the first parameter and the second parameter are not configured for the UE, identifying a third value corresponding to a preconfigured time density and a fourth value corresponding to a preconfigured frequency density; and receiving the PT-RS from the base station based on at least one of the third value and the fourth value.

7. A method for a base station to transmit a phase tracking reference signal (PT-RS) in a wireless communication system, the method comprising:

determining whether to configure at least one of a first parameter related to a time density of the PT-RS and a second parameter related to a frequency density of the PT-RS to a UE through higher layer signaling, wherein the first parameter indicates three threshold values for a PTRS-modulation and coding scheme (MCS) and the second parameter indicates two threshold values for a bandwidth; and transmitting the PT-RS to the UE based on at least one of a first value corresponding to the time density, a presence of the PT-RS, and a second value corresponding to the frequency density, wherein the PT-RS is not present, or the first value is determined based on at least one of the first parameter, a highest threshold value for the PTRS-MCS, and a scheduled MCS, and wherein the PT-RS is not present, or the second value is determined based on the second parameter and a scheduled bandwidth, wherein in case that neither the first parameter nor the second parameter is configured for the UE, 1024 QAM is applied to the wireless communication system, and a scheduled MCS is smaller than a smallest index value among indexes corresponding to modulation order 4 in an MCS table, the base station does not transmit the PT-RS, and wherein the highest threshold value for the PTRS-MCS is assumed to be 27 in case that the 1024 QAM is applied to the wireless communication system.

8. The method of claim 7, further comprising:

transmitting, to the UE through the higher layer signaling, PT-RS downlink configuration information (PTRS-DownlinkConfig) comprising the first parameter and the second parameter.

9. The method of claim 8, wherein the PT-RS downlink configuration information comprises a plurality of parameters related to the time density of the PT-RS, and in case that the MCS table corresponding to the 1024 QAM is configured, each of the plurality of parameters is configured to be an integer value from 0 to 27.

10. The method of claim 7, wherein the MCS table corresponding to the 1024 QAM comprises modulation and code rate combinations of (1024QAM, 805.5/1024), (1024QAM, 853/1024), (1024QAM, 900.5/1024), and (1024QAM, 948/1024).

11. A user equipment (UE) configured to receive a phase tracking reference signal (PT-RS) in a wireless communication system, the UE comprising:

a transceiver; and a controller coupled with the transceiver and configured to control the transceiver, wherein the controller is configured to:

determine, through higher layer signaling, whether at least one of a first parameter related to a time density of the PT-RS and a second parameter related to a frequency density of the PT-RS is configured for the UE, wherein the first parameter indicates three threshold values for a PTRS-modulation and coding scheme (MCS) and the second parameter indicates two threshold values for a bandwidth;

in case that the first parameter is configured through the higher layer signaling, determine that the PT-RS is not present or a first value corresponding to the time density based on at least one of the first parameter, a highest threshold value for the PTRS-MCS, and a scheduled MCS;

in case that the second parameter is configured through the higher layer signaling, determine that the PT-RS is not present or a second value corresponding to the frequency density based on the second parameter and a scheduled bandwidth; and in case that neither the first parameter nor the second parameter is configured for the UE, 1024 QAM is applied to the wireless communication system, and a scheduled MCS is smaller than a smallest index value among indexes corresponding to modulation order 4 in an MCS table, determine that a base station does not transmit the PT-RS, and wherein the highest threshold value for the PTRS-MCS is assumed to be 27 in case that the 1024 QAM is applied to the wireless communication system.

12. The UE of claim 11, wherein the controller is configured to control to:

receive, from the base station through the higher layer signaling, PT-RS downlink configuration information (PTRS-DownlinkConfig) comprising the first parameter and the second parameter.

13. A base station configured to transmit a phase tracking reference signal (PT-RS) in a wireless communication system, the base station comprising:

a transceiver: and a controller coupled with the transceiver and configured to control the transceiver, wherein the controller is configured to:

determine whether to configure at least one of a first parameter related to a time density of the PT-RS and a second parameter related to a frequency density of the PT-RS for a UE through higher layer signaling, wherein the first parameter indicates three threshold values for a PTRS-modulation and coding scheme (MCS) and the second parameter indicates two threshold values for a bandwidth; and transmit the PT-RS to the UE based on at least one of a first value corresponding to the time density, a presence of the PT-RS, and a second value corresponding to the frequency density, wherein the PT-RS is not present, or the first value is determined based on at least one of the first parameter, a highest threshold value for the PTRS-MCS, and a scheduled MCS, and wherein the PT-RS is not present, or the second value is determined based on the second parameter and a scheduled bandwidth, wherein in case that neither the first parameter nor the second parameter is configured for the UE, 1024 QAM is applied to the wireless communication system, and a scheduled MCS is smaller than a smallest index value among indexes corresponding to modulation order 4 in an MCS table, the base station does not transmit the PT-RS, and wherein the highest threshold value for the PTRS-MCS is assumed to be 27 in case that the 1024 QAM is applied to the wireless communication system.

* * * * *